US009031097B2

(12) United States Patent
Walton et al.

(10) Patent No.: US 9,031,097 B2
(45) Date of Patent: May 12, 2015

(54) MIMO SYSTEM WITH MULTIPLE SPATIAL MULTIPLEXING MODES

(75) Inventors: J. Rodney Walton, Carlisle, MA (US); John W. Ketchum, Harvard, MA (US); Mark S. Wallace, Bedford, MA (US); Steven J. Howard, Ashland, MA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 12/649,040

(22) Filed: Dec. 29, 2009

(65) Prior Publication Data

US 2010/0119001 A1      May 13, 2010

Related U.S. Application Data

(63) Continuation of application No. 10/693,429, filed on Oct. 23, 2003.

(60) Provisional application No. 60/421,309, filed on Oct. 25, 2002.

(51) Int. Cl.
*H04J 11/00* (2006.01)
*H04B 7/14* (2006.01)
(Continued)

(52) U.S. Cl.
CPC ............. *H04B 7/0417* (2013.01); *H04J 11/003* (2013.01); *H04J 11/0053* (2013.01);
(Continued)

(58) Field of Classification Search
None
See application file for complete search history.

(56) References Cited

U.S. PATENT DOCUMENTS 4,736,371 A   4/1988   Tejima et al.
4,750,198 A   6/1988   Harper
(Continued)

FOREIGN PATENT DOCUMENTS

AU   2002259221   11/2002
CA   2690245 A1   10/2001
(Continued)

OTHER PUBLICATIONS

G. Bauch, J. Hagenauer, "Smart Versus Dumb Antennas—Capacities and FEC Performance," IEEE Communications Letters, vol. 6, No. 2, pp. 55-57, Feb. 2002.*

(Continued)

*Primary Examiner* — Faruk Hamza
*Assistant Examiner* — Andrew Oh
(74) *Attorney, Agent, or Firm* — QUALCOMM IP Department; James Hunt Yancey, Jr.

(57) ABSTRACT

A MIMO system supports multiple spatial multiplexing modes for improved performance and greater flexibility. These modes may include (1) a single-user steered mode that transmits multiple data streams on orthogonal spatial channels to a single receiver, (2) a single-user non-steered mode that transmits multiple data streams from multiple antennas to a single receiver without spatial processing at a transmitter, (3) a multi-user steered mode that transmits multiple data streams simultaneously to multiple receivers with spatial processing at a transmitter, and (4) a multi-user non-steered mode that transmits multiple data streams from multiple antennas (co-located or non co-located) without spatial processing at the transmitter(s) to receiver(s) having multiple antennas. For each set of user terminal(s) selected for data transmission on the downlink and/or uplink, a spatial multiplexing mode is selected for the user terminal set from among the multiple spatial multiplexing modes supported by the system.

44 Claims, 13 Drawing Sheets

(51) Int. Cl.
*H04B 7/04* (2006.01)
*H04L 25/02* (2006.01)
*H04B 7/06* (2006.01)
*H04B 7/08* (2006.01)
*H04L 1/00* (2006.01)
*H04L 1/06* (2006.01)
*H04W 74/04* (2009.01)
*H04W 72/04* (2009.01)
*H04L 5/00* (2006.01)
*H04L 27/26* (2006.01)
*H04L 25/03* (2006.01)
*H04W 16/28* (2009.01)
*H04W 52/50* (2009.01)

(52) U.S. Cl.
CPC ........... *H04W 72/046* (2013.01); *H04L 5/0073* (2013.01); *H04L 27/2675* (2013.01); *H04L 25/03891* (2013.01); *H04L 25/0248* (2013.01); *H04B 7/043* (2013.01); *H04B 7/0421* (2013.01); *H04B 7/0434* (2013.01); *H04B 7/0452* (2013.01); *H04B 7/0628* (2013.01); *H04B 7/0669* (2013.01); *H04B 7/0689* (2013.01); *H04B 7/0697* (2013.01); *H04B 7/0854* (2013.01); *H04B 7/0871* (2013.01); *H04L 1/0001* (2013.01); *H04L 1/0003* (2013.01); *H04L 1/0009* (2013.01); *H04L 1/0017* (2013.01); *H04L 1/06* (2013.01); *H04L 25/0224* (2013.01); *H04L 25/0226* (2013.01); *H04L 25/0242* (2013.01); *H04L 25/03343* (2013.01); *H04L 27/2601* (2013.01); *H04L 27/2602* (2013.01); *H04L 27/261* (2013.01); *H04L 27/2647* (2013.01); *H04W 16/28* (2013.01); *H04W 52/50* (2013.01); *H04W 74/04* (2013.01)

(56) References Cited

U.S. PATENT DOCUMENTS

| | | | |
|---|---|---|---|
| 4,797,879 A | 1/1989 | Habbab et al. | |
| 5,239,677 A | 8/1993 | Jasinski | |
| 5,241,544 A | 8/1993 | Jasper et al. | |
| 5,295,159 A | 3/1994 | Kerpez | |
| 5,404,355 A | 4/1995 | Raith | |
| 5,422,733 A | 6/1995 | Merchant et al. | |
| 5,471,647 A | 11/1995 | Gerlach et al. | |
| 5,479,447 A | 12/1995 | Chow et al. | |
| 5,491,837 A | 2/1996 | Haartsen | |
| 5,493,712 A | 2/1996 | Ramesh et al. | |
| 5,506,861 A | 4/1996 | Bottomley | |
| 5,509,003 A | 4/1996 | Snijders et al. | |
| 5,528,581 A | 6/1996 | De Bot | |
| 5,606,729 A | 2/1997 | D'Amico et al. | |
| 5,638,369 A | 6/1997 | Ayerst et al. | |
| 5,677,909 A | 10/1997 | Heide | |
| 5,729,542 A | 3/1998 | Dupont | |
| 5,790,550 A | 8/1998 | Peeters et al. | |
| 5,799,005 A * | 8/1998 | Soliman | 370/335 |
| 5,818,813 A | 10/1998 | Saito et al. | |
| 5,822,374 A | 10/1998 | Levin | |
| 5,832,387 A | 11/1998 | Bae et al. | |
| 5,859,875 A | 1/1999 | Kato et al. | |
| 5,867,478 A | 2/1999 | Baum et al. | |
| 5,867,539 A | 2/1999 | Koslov | |
| 5,883,887 A | 3/1999 | Take et al. | |
| 5,886,988 A * | 3/1999 | Yun et al. | 370/329 |
| 5,929,810 A * | 7/1999 | Koutsoudis et al. | 342/373 |
| 5,959,965 A | 9/1999 | Ohkubo et al. | |
| 5,963,589 A * | 10/1999 | Nagano et al. | 375/224 |
| 5,973,638 A | 10/1999 | Robbins et al. | |
| 5,982,327 A | 11/1999 | Vook et al. | |
| 6,005,876 A | 12/1999 | Cimini, Jr. et al. | |
| 6,011,963 A | 1/2000 | Ogoro | |
| 6,049,548 A | 4/2000 | Bruno et al. | |
| 6,067,290 A | 5/2000 | Paulraj et al. | |
| 6,072,779 A | 6/2000 | Tzannes et al. | |
| 6,084,915 A | 7/2000 | Williams | |
| 6,097,771 A | 8/2000 | Foschini | |
| 6,115,354 A | 9/2000 | Weck | |
| 6,122,247 A | 9/2000 | Levin et al. | |
| 6,131,016 A | 10/2000 | Greenstein et al. | |
| 6,141,388 A | 10/2000 | Servais et al. | |
| 6,141,542 A | 10/2000 | Kotzin et al. | |
| 6,141,555 A * | 10/2000 | Sato | 455/437 |
| 6,141,567 A | 10/2000 | Youssefmir et al. | |
| 6,144,711 A | 11/2000 | Raleigh et al. | |
| 6,154,661 A * | 11/2000 | Goldburg | 455/562.1 |
| 6,163,296 A | 12/2000 | Lier et al. | |
| 6,167,031 A | 12/2000 | Olofsson et al. | |
| 6,175,588 B1 | 1/2001 | Visotsky et al. | |
| 6,178,196 B1 | 1/2001 | Naguib et al. | |
| 6,192,256 B1 | 2/2001 | Whinnett | |
| 6,205,410 B1 | 3/2001 | Cai | |
| 6,222,888 B1 | 4/2001 | Kao et al. | |
| 6,232,918 B1 | 5/2001 | Wax et al. | |
| 6,266,528 B1 | 7/2001 | Farzaneh | |
| 6,272,354 B1 * | 8/2001 | Saario | 455/522 |
| 6,275,543 B1 | 8/2001 | Petrus et al. | |
| 6,278,726 B1 | 8/2001 | Mesecher et al. | |
| 6,292,917 B1 | 9/2001 | Sinha et al. | |
| 6,298,035 B1 | 10/2001 | Heiskala | |
| 6,298,092 B1 | 10/2001 | Heath, Jr. et al. | |
| 6,308,080 B1 | 10/2001 | Burt et al. | |
| 6,310,704 B1 * | 10/2001 | Dogan et al. | 398/9 |
| 6,314,113 B1 | 11/2001 | Guemas | |
| 6,314,289 B1 | 11/2001 | Eberlein et al. | |
| 6,317,467 B1 * | 11/2001 | Cox et al. | 375/267 |
| 6,317,612 B1 | 11/2001 | Farsakh | |
| 6,330,277 B1 | 12/2001 | Gelblum et al. | |
| 6,330,293 B1 | 12/2001 | Klank et al. | |
| 6,330,462 B1 | 12/2001 | Chen | |
| 6,333,953 B1 | 12/2001 | Bottomley et al. | |
| 6,339,399 B1 | 1/2002 | Andersson et al. | |
| 6,345,036 B1 | 2/2002 | Sudo et al. | |
| 6,346,910 B1 | 2/2002 | Ito | |
| 6,347,217 B1 * | 2/2002 | Bengtsson et al. | 455/67.7 |
| 6,347,234 B1 | 2/2002 | Scherzer | |
| 6,348,036 B1 | 2/2002 | Looney et al. | |
| 6,351,499 B1 | 2/2002 | Paulraj et al. | |
| 6,363,267 B1 | 3/2002 | Lindskog et al. | |
| 6,369,758 B1 * | 4/2002 | Zhang | 342/383 |
| 6,377,812 B1 | 4/2002 | Rashid-Farrokhi et al. | |
| 6,385,264 B1 | 5/2002 | Terasawa et al. | |
| 6,389,056 B1 * | 5/2002 | Kanterakis et al. | 375/130 |
| 6,426,971 B1 | 7/2002 | Wu et al. | |
| 6,452,981 B1 | 9/2002 | Raleigh et al. | |
| 6,463,290 B1 | 10/2002 | Stilp et al. | |
| 6,473,467 B1 | 10/2002 | Wallace et al. | |
| 6,478,422 B1 | 11/2002 | Hansen | |
| 6,492,942 B1 | 12/2002 | Kezys | |
| 6,510,184 B1 | 1/2003 | Okamura | |
| 6,512,737 B1 * | 1/2003 | Agee | 370/208 |
| 6,515,617 B1 | 2/2003 | Demers et al. | |
| 6,532,225 B1 | 3/2003 | Chang et al. | |
| 6,532,255 B1 | 3/2003 | Gunzelmann et al. | |
| 6,532,562 B1 | 3/2003 | Chou et al. | |
| 6,545,997 B1 | 4/2003 | Bohnke et al. | |
| 6,574,211 B2 | 6/2003 | Padovani et al. | |
| 6,574,267 B1 | 6/2003 | Kanterakis et al. | |
| 6,574,271 B2 | 6/2003 | Mesecher et al. | |
| 6,590,883 B1 * | 7/2003 | Kitade et al. | 370/337 |
| 6,594,473 B1 | 7/2003 | Dabak et al. | |
| 6,594,798 B1 | 7/2003 | Chou et al. | |
| 6,597,682 B1 | 7/2003 | Kari | |
| 6,608,874 B1 | 8/2003 | Beidas et al. | |
| 6,611,231 B2 | 8/2003 | Crilly, Jr. et al. | |
| 6,615,024 B1 | 9/2003 | Boros et al. | |
| 6,631,121 B1 | 10/2003 | Yoon | |
| 6,636,496 B1 | 10/2003 | Cho et al. | |
| 6,636,568 B2 | 10/2003 | Kadous | |

(56) References Cited

U.S. PATENT DOCUMENTS

| | | | |
|---|---|---|---|
| 6,654,590 B2 | 11/2003 | Boros et al. | |
| 6,654,613 B1 | 11/2003 | Maeng et al. | |
| 6,668,161 B2 | 12/2003 | Boros et al. | |
| 6,683,916 B1 | 1/2004 | Sartori et al. | |
| 6,690,660 B2 | 2/2004 | Kim et al. | |
| 6,693,992 B2 | 2/2004 | Jones et al. | |
| 6,694,155 B1 * | 2/2004 | Chin et al. | 455/562.1 |
| 6,697,346 B1 | 2/2004 | Halton et al. | |
| 6,711,121 B1 | 3/2004 | Gerakoulis et al. | |
| 6,728,233 B1 | 4/2004 | Park et al. | |
| 6,731,668 B2 | 5/2004 | Ketchum | |
| 6,735,188 B1 | 5/2004 | Becker et al. | |
| 6,738,020 B1 | 5/2004 | Lindskog et al. | |
| 6,744,811 B1 | 6/2004 | Kantschuk | |
| 6,751,187 B2 | 6/2004 | Walton et al. | |
| 6,751,444 B1 | 6/2004 | Meiyappan | |
| 6,751,480 B2 | 6/2004 | Kogiantis et al. | |
| 6,757,263 B1 | 6/2004 | Olds | |
| 6,760,313 B1 | 7/2004 | Sindhushayana et al. | |
| 6,760,388 B2 | 7/2004 | Ketchum et al. | |
| 6,760,882 B1 | 7/2004 | Gesbert et al. | |
| 6,763,244 B2 | 7/2004 | Chen et al. | |
| 6,768,727 B1 | 7/2004 | Sourour et al. | |
| 6,771,706 B2 | 8/2004 | Ling et al. | |
| 6,785,341 B2 | 8/2004 | Walton et al. | |
| 6,785,513 B1 | 8/2004 | Sivaprakasam | |
| 6,788,948 B2 | 9/2004 | Lindskog et al. | |
| 6,792,041 B1 | 9/2004 | Kim et al. | |
| 6,795,424 B1 | 9/2004 | Kapoor et al. | |
| 6,798,738 B1 | 9/2004 | Do et al. | |
| 6,801,790 B2 | 10/2004 | Rudrapatna | |
| 6,802,035 B2 | 10/2004 | Catreux et al. | |
| 6,804,191 B2 | 10/2004 | Richardson | |
| 6,821,535 B2 | 11/2004 | Nurmi et al. | |
| 6,842,460 B1 | 1/2005 | Olkkonen et al. | |
| 6,847,828 B2 | 1/2005 | Miyoshi et al. | |
| 6,850,252 B1 | 2/2005 | Hoffberg | |
| 6,850,498 B2 | 2/2005 | Heath et al. | |
| 6,859,503 B2 | 2/2005 | Pautler et al. | |
| 6,862,271 B2 | 3/2005 | Medvedev et al. | |
| 6,862,440 B2 | 3/2005 | Sampath | |
| 6,868,079 B1 | 3/2005 | Hunt | |
| 6,873,651 B2 | 3/2005 | Tesfai et al. | |
| 6,879,578 B2 | 4/2005 | Pan et al. | |
| 6,879,579 B1 | 4/2005 | Myles et al. | |
| 6,882,868 B1 * | 4/2005 | Shattil | 455/562.1 |
| 6,885,708 B2 | 4/2005 | Thomas et al. | |
| 6,888,809 B1 | 5/2005 | Foschini et al. | |
| 6,888,899 B2 | 5/2005 | Raleigh et al. | |
| 6,891,858 B1 | 5/2005 | Mahesh et al. | |
| 6,920,192 B1 | 7/2005 | Laroia et al. | |
| 6,920,194 B2 | 7/2005 | Stopler et al. | |
| 6,927,728 B2 | 8/2005 | Vook et al. | |
| 6,937,592 B1 | 8/2005 | Heath, Jr. et al. | |
| 6,940,917 B2 | 9/2005 | Menon et al. | |
| 6,950,632 B1 | 9/2005 | Yun et al. | |
| 6,952,426 B2 | 10/2005 | Wu et al. | |
| 6,952,454 B1 * | 10/2005 | Jalali et al. | 375/260 |
| 6,956,813 B2 | 10/2005 | Fukuda | |
| 6,956,897 B1 * | 10/2005 | Honig | 375/232 |
| 6,956,906 B2 | 10/2005 | Tager et al. | |
| 6,959,171 B2 | 10/2005 | Tsien et al. | |
| 6,963,741 B2 * | 11/2005 | Johansson et al. | 455/423 |
| 6,963,742 B2 | 11/2005 | Boros et al. | |
| 6,965,762 B2 | 11/2005 | Sugar et al. | |
| 6,970,722 B1 * | 11/2005 | Lewis | 455/562.1 |
| 6,980,601 B2 | 12/2005 | Jones | |
| 6,980,800 B2 | 12/2005 | Noerpel et al. | |
| 6,985,434 B2 | 1/2006 | Wu et al. | |
| 6,985,534 B1 | 1/2006 | Meister | |
| 6,987,819 B2 | 1/2006 | Thomas et al. | |
| 6,990,059 B1 | 1/2006 | Anikhindi et al. | |
| 6,992,972 B2 | 1/2006 | Van Nee | |
| 6,996,380 B2 | 2/2006 | Dent | |
| 7,002,900 B2 | 2/2006 | Walton et al. | |
| 7,003,044 B2 | 2/2006 | Subramanian et al. | |
| 7,006,464 B1 | 2/2006 | Gopalakrishnan et al. | |
| 7,006,483 B2 | 2/2006 | Nelson, Jr. et al. | |
| 7,006,848 B2 | 2/2006 | Ling et al. | |
| 7,009,931 B2 | 3/2006 | Ma et al. | |
| 7,012,978 B2 | 3/2006 | Talwar | |
| 7,020,110 B2 | 3/2006 | Walton et al. | |
| 7,020,482 B2 | 3/2006 | Medvedev et al. | |
| 7,020,490 B2 | 3/2006 | Khatri | |
| 7,023,826 B2 | 4/2006 | Sjoberg et al. | |
| 7,024,163 B1 * | 4/2006 | Barratt et al. | 455/69 |
| 7,031,671 B2 | 4/2006 | Mottier | |
| 7,035,359 B2 | 4/2006 | Molnar | |
| 7,039,125 B2 | 5/2006 | Friedman | |
| 7,039,363 B1 * | 5/2006 | Kasapi et al. | 455/67.11 |
| 7,042,858 B1 | 5/2006 | Ma et al. | |
| 7,043,259 B1 * | 5/2006 | Trott | 455/458 |
| 7,054,378 B2 | 5/2006 | Walton et al. | |
| 7,058,367 B1 | 6/2006 | Luo et al. | |
| 7,062,294 B1 * | 6/2006 | Rogard et al. | 455/562.1 |
| 7,068,628 B2 | 6/2006 | Li et al. | |
| 7,072,381 B2 | 7/2006 | Atarashi et al. | |
| 7,072,410 B1 | 7/2006 | Monsen | |
| 7,072,413 B2 | 7/2006 | Walton et al. | |
| 7,088,671 B1 | 8/2006 | Monsen | |
| 7,095,709 B2 | 8/2006 | Walton et al. | |
| 7,095,722 B1 | 8/2006 | Walke et al. | |
| 7,099,377 B2 | 8/2006 | Berens et al. | |
| 7,103,325 B1 | 9/2006 | Jia et al. | |
| 7,110,378 B2 | 9/2006 | Onggosanusi et al. | |
| 7,110,463 B2 | 9/2006 | Wallace et al. | |
| 7,113,499 B2 | 9/2006 | Nafie et al. | |
| 7,116,652 B2 | 10/2006 | Lozano | |
| 7,120,199 B2 | 10/2006 | Thielecke et al. | |
| 7,120,657 B2 * | 10/2006 | Ricks et al. | 708/322 |
| 7,127,009 B2 | 10/2006 | Berthet et al. | |
| 7,130,362 B2 | 10/2006 | Girardeau et al. | |
| 7,133,459 B2 | 11/2006 | Onggosanusi et al. | |
| 7,137,047 B2 | 11/2006 | Mitlin et al. | |
| 7,149,190 B1 * | 12/2006 | Li et al. | 370/278 |
| 7,149,239 B2 | 12/2006 | Hudson | |
| 7,149,254 B2 | 12/2006 | Sampath | |
| 7,155,171 B2 | 12/2006 | Ebert et al. | |
| 7,158,563 B2 | 1/2007 | Ginis et al. | |
| 7,164,649 B2 | 1/2007 | Walton et al. | |
| 7,164,669 B2 | 1/2007 | Li et al. | |
| 7,184,713 B2 | 2/2007 | Kadous et al. | |
| 7,187,646 B2 | 3/2007 | Schramm | |
| 7,190,749 B2 | 3/2007 | Levin et al. | |
| 7,191,381 B2 | 3/2007 | Gesbert et al. | |
| 7,194,237 B2 | 3/2007 | Sugar et al. | |
| 7,197,084 B2 | 3/2007 | Ketchum et al. | |
| 7,200,404 B2 | 4/2007 | Panasik et al. | |
| 7,206,354 B2 | 4/2007 | Wallace et al. | |
| 7,218,684 B2 | 5/2007 | Bolourchi et al. | |
| 7,221,956 B2 | 5/2007 | Medvedev et al. | |
| 7,224,704 B2 | 5/2007 | Lu et al. | |
| 7,231,184 B2 | 6/2007 | Eilts et al. | |
| 7,233,625 B2 | 6/2007 | Ma et al. | |
| 7,238,508 B2 | 7/2007 | Lin et al. | |
| 7,242,727 B2 | 7/2007 | Liu et al. | |
| 7,248,638 B1 | 7/2007 | Banister | |
| 7,248,841 B2 | 7/2007 | Agee et al. | |
| 7,254,171 B2 | 8/2007 | Hudson | |
| 7,260,153 B2 | 8/2007 | Nissani | |
| 7,260,366 B2 | 8/2007 | Lee et al. | |
| 7,263,119 B1 | 8/2007 | Hsu et al. | |
| 7,274,734 B2 | 9/2007 | Tsatsanis | |
| 7,277,679 B1 * | 10/2007 | Barratt et al. | 455/101 |
| 7,280,467 B2 | 10/2007 | Smee et al. | |
| 7,280,625 B2 | 10/2007 | Ketchum et al. | |
| 7,283,508 B2 | 10/2007 | Choi et al. | |
| 7,289,570 B2 | 10/2007 | Schmidl et al. | |
| 7,292,854 B2 | 11/2007 | Das et al. | |
| 7,298,778 B2 | 11/2007 | Visoz et al. | |
| 7,298,805 B2 | 11/2007 | Walton et al. | |
| 7,308,035 B2 | 12/2007 | Rouquette et al. | |
| 7,317,750 B2 | 1/2008 | Shattil | |
| 7,324,429 B2 | 1/2008 | Walton et al. | |

(56) References Cited

U.S. PATENT DOCUMENTS

| | | | |
|---|---|---|---|
| 7,327,800 B2 | 2/2008 | Oprea et al. | |
| 7,333,556 B2 | 2/2008 | Maltsev et al. | |
| 7,342,912 B1 | 3/2008 | Kerr et al. | |
| 7,356,004 B2 | 4/2008 | Yano et al. | |
| 7,356,089 B2 | 4/2008 | Jia et al. | |
| 7,379,492 B2 | 5/2008 | Hwang | |
| 7,386,076 B2 | 6/2008 | Onggosanusi et al. | |
| 7,392,014 B2 | 6/2008 | Baker et al. | |
| 7,403,748 B1 | 7/2008 | Keskitalo et al. | |
| 7,421,039 B2 | 9/2008 | Malaender et al. | |
| 7,453,844 B1 | 11/2008 | Lee et al. | |
| 7,466,749 B2 | 12/2008 | Medvedev et al. | |
| 7,480,278 B2 | 1/2009 | Pedersen et al. | |
| 7,492,737 B1 | 2/2009 | Fong et al. | |
| 7,508,748 B2 | 3/2009 | Kadous | |
| 7,548,506 B2 | 6/2009 | Ma et al. | |
| 7,551,546 B2 | 6/2009 | Ma et al. | |
| 7,551,580 B2 | 6/2009 | Du Crest et al. | |
| 7,573,805 B2 | 8/2009 | Zhuang et al. | |
| 7,599,443 B2 | 10/2009 | Ionescu et al. | |
| 7,603,141 B2 | 10/2009 | Dravida | |
| 7,606,296 B1 | 10/2009 | Hsu et al. | |
| 7,606,319 B2 | 10/2009 | Zhang et al. | |
| 7,616,698 B2 | 11/2009 | Sun et al. | |
| 7,623,871 B2 | 11/2009 | Sheynblat | |
| 7,636,573 B2 | 12/2009 | Walton et al. | |
| 7,646,747 B2 * | 1/2010 | Atarashi et al. | 370/329 |
| 7,653,142 B2 | 1/2010 | Ketchum et al. | |
| 7,653,415 B2 | 1/2010 | Van Rooyen | |
| 7,656,967 B2 * | 2/2010 | Tiirola et al. | 375/316 |
| 7,778,337 B2 | 8/2010 | Tong et al. | |
| 7,822,140 B2 | 10/2010 | Catreux et al. | |
| 7,843,972 B2 | 11/2010 | Nakahara et al. | |
| 7,885,228 B2 | 2/2011 | Walton et al. | |
| 8,145,179 B2 | 3/2012 | Walton et al. | |
| 8,170,513 B2 | 5/2012 | Walton et al. | |
| 8,203,978 B2 | 6/2012 | Walton et al. | |
| 8,218,609 B2 | 7/2012 | Walton et al. | |
| 8,254,246 B2 | 8/2012 | Ma et al. | |
| 8,260,210 B2 | 9/2012 | Esteve Asensio et al. | |
| 8,325,836 B2 | 12/2012 | Tong et al. | |
| 8,355,313 B2 | 1/2013 | Walton et al. | |
| 8,358,714 B2 | 1/2013 | Walton et al. | |
| 8,406,118 B2 | 3/2013 | Ma et al. | |
| 8,462,643 B2 | 6/2013 | Walton et al. | |
| 8,483,188 B2 | 7/2013 | Walton et al. | |
| 2001/0017881 A1 | 8/2001 | Bhatoolaul et al. | |
| 2001/0031621 A1 | 10/2001 | Schmutz | |
| 2001/0033623 A1 | 10/2001 | Hosur | |
| 2001/0046205 A1 | 11/2001 | Easton et al. | |
| 2002/0003774 A1 | 1/2002 | Wang et al. | |
| 2002/0004920 A1 | 1/2002 | Cho et al. | |
| 2002/0018310 A1 | 2/2002 | Hung | |
| 2002/0018453 A1 | 2/2002 | Yu et al. | |
| 2002/0027951 A1 | 3/2002 | Gormley et al. | |
| 2002/0041632 A1 | 4/2002 | Sato et al. | |
| 2002/0044591 A1 | 4/2002 | Lee et al. | |
| 2002/0044610 A1 | 4/2002 | Jones | |
| 2002/0057659 A1 | 5/2002 | Ozluturk et al. | |
| 2002/0062472 A1 * | 5/2002 | Medlock et al. | 716/1 |
| 2002/0064214 A1 | 5/2002 | Hattori et al. | |
| 2002/0072336 A1 | 6/2002 | Mottier | |
| 2002/0075830 A1 | 6/2002 | Hartman, Jr. | |
| 2002/0080735 A1 | 6/2002 | Heath et al. | |
| 2002/0085620 A1 | 7/2002 | Mesecher | |
| 2002/0085641 A1 | 7/2002 | Baum | |
| 2002/0098872 A1 | 7/2002 | Judson | |
| 2002/0105928 A1 | 8/2002 | Kapoor et al. | |
| 2002/0115467 A1 * | 8/2002 | Hamabe | 455/522 |
| 2002/0115473 A1 | 8/2002 | Hwang et al. | |
| 2002/0118781 A1 * | 8/2002 | Thomas et al. | 375/347 |
| 2002/0122381 A1 | 9/2002 | Wu et al. | |
| 2002/0122393 A1 | 9/2002 | Caldwell et al. | |
| 2002/0127978 A1 * | 9/2002 | Khatri | 455/103 |
| 2002/0136271 A1 * | 9/2002 | Hiramatsu et al. | 375/141 |
| 2002/0147032 A1 * | 10/2002 | Yoon et al. | 455/562 |
| 2002/0147953 A1 * | 10/2002 | Catreux et al. | 714/746 |
| 2002/0150182 A1 * | 10/2002 | Dogan et al. | 375/343 |
| 2002/0152253 A1 * | 10/2002 | Ricks et al. | 708/520 |
| 2002/0154705 A1 * | 10/2002 | Walton et al. | 375/267 |
| 2002/0177447 A1 * | 11/2002 | Walton et al. | 455/452 |
| 2002/0181390 A1 | 12/2002 | Mody et al. | |
| 2002/0183010 A1 | 12/2002 | Catreux et al. | |
| 2002/0184453 A1 | 12/2002 | Hughes et al. | |
| 2002/0191535 A1 | 12/2002 | Sugiyama et al. | |
| 2002/0193146 A1 | 12/2002 | Wallace et al. | |
| 2002/0196842 A1 | 12/2002 | Onggosanusi et al. | |
| 2003/0002450 A1 * | 1/2003 | Jalali et al. | 370/294 |
| 2003/0003863 A1 * | 1/2003 | Thielecke et al. | 455/39 |
| 2003/0007463 A1 | 1/2003 | Li et al. | |
| 2003/0012308 A1 | 1/2003 | Sampath et al. | |
| 2003/0039217 A1 * | 2/2003 | Seo et al. | 370/318 |
| 2003/0039317 A1 | 2/2003 | Taylor et al. | |
| 2003/0045288 A1 | 3/2003 | Luschi et al. | |
| 2003/0045318 A1 * | 3/2003 | Subrahmanya | 455/522 |
| 2003/0048856 A1 | 3/2003 | Ketchum et al. | |
| 2003/0050069 A1 * | 3/2003 | Kogiantis et al. | 455/450 |
| 2003/0072382 A1 * | 4/2003 | Raleigh et al. | 375/267 |
| 2003/0072395 A1 * | 4/2003 | Jia et al. | 375/341 |
| 2003/0073409 A1 * | 4/2003 | Nobukiyo et al. | 455/67.1 |
| 2003/0076812 A1 | 4/2003 | Benedittis | |
| 2003/0078024 A1 | 4/2003 | Magee et al. | |
| 2003/0095197 A1 | 5/2003 | Wheeler et al. | |
| 2003/0099306 A1 | 5/2003 | Nilsson et al. | |
| 2003/0103584 A1 | 6/2003 | Bjerke et al. | |
| 2003/0112745 A1 | 6/2003 | Zhuang et al. | |
| 2003/0117989 A1 * | 6/2003 | Kim | 370/342 |
| 2003/0119452 A1 | 6/2003 | Kim et al. | |
| 2003/0123389 A1 | 7/2003 | Russell et al. | |
| 2003/0125040 A1 * | 7/2003 | Walton et al. | 455/454 |
| 2003/0128656 A1 | 7/2003 | Scarpa | |
| 2003/0128658 A1 * | 7/2003 | Walton et al. | 370/208 |
| 2003/0139194 A1 | 7/2003 | Onggosanusi et al. | |
| 2003/0142732 A1 | 7/2003 | Moshavi et al. | |
| 2003/0153345 A1 * | 8/2003 | Cramer, III | 455/522 |
| 2003/0153360 A1 | 8/2003 | Burke et al. | |
| 2003/0157954 A1 | 8/2003 | Medvedev et al. | |
| 2003/0162519 A1 | 8/2003 | Smith et al. | |
| 2003/0174676 A1 * | 9/2003 | Willenegger et al. | 370/335 |
| 2003/0174686 A1 * | 9/2003 | Willenegger et al. | 370/342 |
| 2003/0185310 A1 * | 10/2003 | Ketchum et al. | 375/259 |
| 2003/0185311 A1 | 10/2003 | Kim | |
| 2003/0186650 A1 * | 10/2003 | Liu | 455/25 |
| 2003/0190897 A1 * | 10/2003 | Lei et al. | 455/101 |
| 2003/0202492 A1 | 10/2003 | Akella et al. | |
| 2003/0202612 A1 | 10/2003 | Halder et al. | |
| 2003/0206558 A1 | 11/2003 | Parkkinen et al. | |
| 2003/0210606 A1 * | 11/2003 | Malladi et al. | 370/335 |
| 2003/0235147 A1 * | 12/2003 | Walton et al. | 370/204 |
| 2003/0235149 A1 | 12/2003 | Chan et al. | |
| 2003/0235255 A1 * | 12/2003 | Ketchum et al. | 375/285 |
| 2004/0005887 A1 | 1/2004 | Bahrenburg et al. | |
| 2004/0013103 A1 * | 1/2004 | Zhang et al. | 370/345 |
| 2004/0017785 A1 | 1/2004 | Zelst | |
| 2004/0037257 A1 | 2/2004 | Ngo | |
| 2004/0042439 A1 * | 3/2004 | Menon et al. | 370/343 |
| 2004/0042556 A1 | 3/2004 | Medvedev et al. | |
| 2004/0047284 A1 | 3/2004 | Eidson | |
| 2004/0047292 A1 | 3/2004 | Du Crest et al. | |
| 2004/0052228 A1 | 3/2004 | Tellado et al. | |
| 2004/0062192 A1 | 4/2004 | Liu et al. | |
| 2004/0071104 A1 | 4/2004 | Boesel et al. | |
| 2004/0071107 A1 | 4/2004 | Kats et al. | |
| 2004/0076224 A1 | 4/2004 | Onggosanusi et al. | |
| 2004/0081131 A1 | 4/2004 | Walton et al. | |
| 2004/0082356 A1 | 4/2004 | Walton et al. | |
| 2004/0085939 A1 | 5/2004 | Wallace et al. | |
| 2004/0087324 A1 | 5/2004 | Ketchum et al. | |
| 2004/0095907 A1 * | 5/2004 | Agee et al. | 370/334 |
| 2004/0121730 A1 | 6/2004 | Kadous et al. | |
| 2004/0136349 A1 | 7/2004 | Walton et al. | |
| 2004/0151108 A1 | 8/2004 | Blasco Claret et al. | |
| 2004/0151122 A1 | 8/2004 | Lau et al. | |
| 2004/0156328 A1 | 8/2004 | Walton et al. | |

(56) References Cited

U.S. PATENT DOCUMENTS

| | | |
|---|---|---|
| 2004/0160921 A1 | 8/2004 | Kaipainen et al. |
| 2004/0160987 A1 | 8/2004 | Sudo et al. |
| 2004/0176097 A1 | 9/2004 | Wilson et al. |
| 2004/0179627 A1 | 9/2004 | Ketchum et al. |
| 2004/0198276 A1 | 10/2004 | Tellado et al. |
| 2004/0252632 A1 | 12/2004 | Bourdoux et al. |
| 2005/0002326 A1 | 1/2005 | Ling et al. |
| 2005/0047384 A1 | 3/2005 | Wax et al. |
| 2005/0047515 A1 | 3/2005 | Walton et al. |
| 2005/0099974 A1 | 5/2005 | Kats et al. |
| 2005/0111599 A1 | 5/2005 | Walton et al. |
| 2005/0120097 A1 | 6/2005 | Walton et al. |
| 2005/0128953 A1 | 6/2005 | Wallace et al. |
| 2005/0135284 A1 | 6/2005 | Nanda et al. |
| 2005/0135295 A1 | 6/2005 | Walton et al. |
| 2005/0135308 A1 | 6/2005 | Vijayan et al. |
| 2005/0135318 A1 | 6/2005 | Walton et al. |
| 2005/0147177 A1 | 7/2005 | Seo et al. |
| 2005/0174981 A1 | 8/2005 | Heath et al. |
| 2005/0185575 A1 | 8/2005 | Hansen et al. |
| 2005/0195915 A1 | 9/2005 | Raleigh et al. |
| 2005/0208959 A1 | 9/2005 | Chen et al. |
| 2005/0220211 A1 | 10/2005 | Shim et al. |
| 2005/0227628 A1 | 10/2005 | Inanoglu |
| 2005/0245264 A1 | 11/2005 | Laroia et al. |
| 2005/0276343 A1 | 12/2005 | Jones |
| 2006/0018247 A1 | 1/2006 | Driesen et al. |
| 2006/0018395 A1 | 1/2006 | Tzannes |
| 2006/0039275 A1 | 2/2006 | Walton et al. |
| 2006/0067417 A1 | 3/2006 | Park et al. |
| 2006/0072649 A1 | 4/2006 | Chang et al. |
| 2006/0077935 A1 | 4/2006 | Hamalainen et al. |
| 2006/0104196 A1 | 5/2006 | Wu et al. |
| 2006/0104340 A1 | 5/2006 | Walton et al. |
| 2006/0114858 A1 | 6/2006 | Walton et al. |
| 2006/0153237 A1 | 7/2006 | Hwang et al. |
| 2006/0159120 A1 | 7/2006 | Kim |
| 2006/0176968 A1 | 8/2006 | Keaney et al. |
| 2006/0183497 A1 | 8/2006 | Paranchych et al. |
| 2006/0209894 A1 | 9/2006 | Tzannes et al. |
| 2006/0209937 A1 | 9/2006 | Tanaka et al. |
| 2007/0086536 A1 | 4/2007 | Ketchum et al. |
| 2007/0177681 A1 | 8/2007 | Choi et al. |
| 2007/0274278 A1 | 11/2007 | Choi et al. |
| 2008/0267138 A1 | 10/2008 | Walton et al. |
| 2008/0285488 A1 | 11/2008 | Walton et al. |
| 2008/0285669 A1 | 11/2008 | Walton et al. |
| 2008/0285670 A1 | 11/2008 | Walton et al. |
| 2009/0129454 A1 | 5/2009 | Medvedev et al. |
| 2009/0161613 A1 | 6/2009 | Kent et al. |
| 2009/0291642 A1 | 11/2009 | Cozzo et al. |
| 2010/0067401 A1 | 3/2010 | Medvedev et al. |
| 2010/0142636 A1 | 6/2010 | Heath, Jr. et al. |
| 2010/0183088 A1 | 7/2010 | Inanoglu |
| 2010/0208841 A1 | 8/2010 | Walton et al. |
| 2010/0220825 A1 | 9/2010 | Dubuc et al. |
| 2010/0260060 A1 | 10/2010 | Abraham et al. |
| 2010/0271930 A1 | 10/2010 | Tong et al. |
| 2011/0096751 A1 | 4/2011 | Ma et al. |
| 2011/0235744 A1 | 9/2011 | Ketchum et al. |
| 2012/0140664 A1 | 6/2012 | Walton et al. |
| 2012/0176928 A1 | 7/2012 | Wallace et al. |
| 2012/0219093 A1 | 8/2012 | Jia et al. |
| 2013/0040682 A1 | 2/2013 | Chang et al. |
| 2013/0235825 A1 | 9/2013 | Walton et al. |
| 2013/0279614 A1 | 10/2013 | Walton et al. |
| 2014/0036823 A1 | 2/2014 | Ma et al. |

FOREIGN PATENT DOCUMENTS

| | | |
|---|---|---|
| CA | 2690247 | 10/2001 |
| CN | 1086061 | 4/1994 |
| CN | 1234661 | 11/1999 |
| CN | 1298266 A | 6/2001 |
| CN | 1308794 | 8/2001 |
| CN | 1314037 A | 9/2001 |
| CN | 1325198 | 12/2001 |
| CN | 1325243 A | 12/2001 |
| CN | 1339885 A | 3/2002 |
| CN | 1347609 A | 5/2002 |
| CN | 1469662 | 1/2004 |
| CN | 1489836 A | 4/2004 |
| CN | 1537371 | 10/2004 |
| DE | 19951525 A1 | 6/2001 |
| EP | 0755090 A1 | 1/1997 |
| EP | 0762701 | 3/1997 |
| EP | 0772329 | 5/1997 |
| EP | 0805568 A1 | 11/1997 |
| EP | 0869647 A2 | 10/1998 |
| EP | 0895387 | 2/1999 |
| EP | 0929172 A1 | 7/1999 |
| EP | 0951091 A2 | 10/1999 |
| EP | 0991221 A2 | 4/2000 |
| EP | 0993211 | 4/2000 |
| EP | 1061446 | 12/2000 |
| EP | 1075093 | 2/2001 |
| EP | 1087545 A1 | 3/2001 |
| EP | 1117197 A2 | 7/2001 |
| EP | 1126673 A2 | 8/2001 |
| EP | 1133070 | 9/2001 |
| EP | 1137217 | 9/2001 |
| EP | 1143754 | 10/2001 |
| EP | 1170879 A1 | 1/2002 |
| EP | 1175022 A2 | 1/2002 |
| EP | 1182799 | 2/2002 |
| EP | 1185001 | 3/2002 |
| EP | 1185015 | 3/2002 |
| EP | 1185048 | 3/2002 |
| EP | 1207635 A1 | 5/2002 |
| EP | 1207645 A1 | 5/2002 |
| EP | 1223702 A1 | 7/2002 |
| EP | 1241824 A1 | 9/2002 |
| EP | 1265411 | 12/2002 |
| EP | 1315311 A1 | 5/2003 |
| EP | 1379020 | 1/2004 |
| EP | 1387545 | 2/2004 |
| EP | 1416688 A1 | 5/2004 |
| EP | 1447934 A1 | 8/2004 |
| EP | 1556984 A2 | 7/2005 |
| GB | 2300337 | 10/1996 |
| GB | 2373973 A | 10/2002 |
| JP | 1132027 | 5/1989 |
| JP | 03104430 | 5/1991 |
| JP | 06003956 | 1/1994 |
| JP | 6501139 T | 1/1994 |
| JP | 8274756 | 10/1996 |
| JP | 9135230 | 5/1997 |
| JP | 9266466 | 10/1997 |
| JP | 9307526 A | 11/1997 |
| JP | 09327073 | 12/1997 |
| JP | 9512156 | 12/1997 |
| JP | 10028077 | 1/1998 |
| JP | 10051402 A | 2/1998 |
| JP | 10084324 | 3/1998 |
| JP | 10209956 A | 8/1998 |
| JP | 10303794 A | 11/1998 |
| JP | 10327126 | 12/1998 |
| JP | 1141159 | 2/1999 |
| JP | 2991167 | 3/1999 |
| JP | 11069431 A | 3/1999 |
| JP | 11074863 A | 3/1999 |
| JP | 11163823 A | 6/1999 |
| JP | 11205273 | 7/1999 |
| JP | 11252037 A | 9/1999 |
| JP | 11317723 A | 11/1999 |
| JP | 2000068975 A | 3/2000 |
| JP | 2000078105 | 3/2000 |
| JP | 2000092009 A | 3/2000 |
| JP | 2001044930 A | 2/2001 |
| JP | 200186045 | 3/2001 |
| JP | 2001103034 A | 4/2001 |
| JP | 2001186051 A | 7/2001 |
| JP | 2001510668 A | 7/2001 |

(56) References Cited

FOREIGN PATENT DOCUMENTS

| | | |
|---|---|---|
| JP | 2001217896 | 8/2001 |
| JP | 2001231074 | 8/2001 |
| JP | 2001237751 A | 8/2001 |
| JP | 200264879 | 2/2002 |
| JP | 2002504283 | 2/2002 |
| JP | 200277098 | 3/2002 |
| JP | 200277104 | 3/2002 |
| JP | 2002111627 | 4/2002 |
| JP | 2002118534 A | 4/2002 |
| JP | 2002510932 A | 4/2002 |
| JP | 2002514033 A | 5/2002 |
| JP | 2002164814 | 6/2002 |
| JP | 2002176379 | 6/2002 |
| JP | 2002204217 | 7/2002 |
| JP | 2002232943 A | 8/2002 |
| JP | 2003504941 | 2/2003 |
| JP | 2003198442 A | 7/2003 |
| JP | 2003530010 | 10/2003 |
| JP | 2004266586 | 9/2004 |
| JP | 2004297172 | 10/2004 |
| JP | 2006504336 A | 2/2006 |
| KR | 200011799 | 2/2000 |
| KR | 20010098861 | 11/2001 |
| KR | 1020020003370 | 1/2002 |
| KR | 20060095576 A | 8/2006 |
| RU | 2015281 | 6/1994 |
| RU | 2111619 C1 | 5/1998 |
| RU | 2134489 | 8/1999 |
| RU | 2141168 | 11/1999 |
| RU | 2149509 | 5/2000 |
| RU | 2152132 C1 | 6/2000 |
| RU | 2157592 | 10/2000 |
| RU | 2158479 C2 | 10/2000 |
| RU | 2168277 | 5/2001 |
| RU | 2168278 | 5/2001 |
| RU | 2197781 C2 | 1/2003 |
| RU | 2201034 C2 | 3/2003 |
| RU | 2335852 C2 | 10/2008 |
| TW | 419912 | 1/2001 |
| TW | 496620 | 7/2002 |
| TW | 503347 | 9/2002 |
| TW | 545006 B | 8/2003 |
| TW | 567689 | 12/2003 |
| TW | 567701 | 12/2003 |
| TW | 583842 B | 4/2004 |
| TW | I263449 | 10/2006 |
| TW | I267251 B | 11/2006 |
| WO | 86007223 | 12/1986 |
| WO | 9307684 A1 | 4/1993 |
| WO | WO-9516319 A1 | 6/1995 |
| WO | 9521501 A1 | 8/1995 |
| WO | WO9530316 A1 | 11/1995 |
| WO | WO9532567 A1 | 11/1995 |
| WO | WO9622662 A1 | 7/1996 |
| WO | WO9635268 | 11/1996 |
| WO | 9702667 | 1/1997 |
| WO | WO9719525 A1 | 5/1997 |
| WO | 9736377 A1 | 10/1997 |
| WO | WO9809381 | 3/1998 |
| WO | WO9809395 | 3/1998 |
| WO | WO9824192 A1 | 6/1998 |
| WO | WO9826523 | 6/1998 |
| WO | WO9830047 | 7/1998 |
| WO | 9857472 | 12/1998 |
| WO | WO9903224 A1 | 1/1999 |
| WO | 9914878 | 3/1999 |
| WO | WO99016214 | 4/1999 |
| WO | 9929049 A2 | 6/1999 |
| WO | WO9944379 A1 | 9/1999 |
| WO | 9952224 A1 | 10/1999 |
| WO | WO9957820 | 11/1999 |
| WO | WO0011823 A1 | 3/2000 |
| WO | WO0036764 A2 | 6/2000 |
| WO | WO0062456 | 10/2000 |
| WO | WO0105067 A1 | 1/2001 |
| WO | WO0126269 | 4/2001 |
| WO | 0163775 A2 | 8/2001 |
| WO | WO0169801 | 9/2001 |
| WO | WO0171928 | 9/2001 |
| WO | WO0176110 | 10/2001 |
| WO | WO0180510 A1 | 10/2001 |
| WO | WO0182521 A2 | 11/2001 |
| WO | 0195531 A2 | 12/2001 |
| WO | WO0197400 A2 | 12/2001 |
| WO | WO0201732 A2 | 1/2002 |
| WO | WO0203557 | 1/2002 |
| WO | WO-0205506 | 1/2002 |
| WO | 0251433 | 2/2002 |
| WO | WO0215433 A1 | 2/2002 |
| WO | WO0225853 A2 | 3/2002 |
| WO | WO02060138 A2 | 8/2002 |
| WO | WO02062002 A1 | 8/2002 |
| WO | WO02065664 | 8/2002 |
| WO | WO02069523 | 9/2002 |
| WO | WO02069590 A1 | 9/2002 |
| WO | WO02073869 A1 | 9/2002 |
| WO | WO02078211 A2 | 10/2002 |
| WO | WO02082689 A2 | 10/2002 |
| WO | WO02088656 | 11/2002 |
| WO | WO02099992 | 12/2002 |
| WO | 03010994 A1 | 2/2003 |
| WO | WO03010984 A1 | 2/2003 |
| WO | WO03019984 A1 | 3/2003 |
| WO | WO03028153 | 4/2003 |
| WO | WO03034646 A2 | 4/2003 |
| WO | WO03047140 A1 | 6/2003 |
| WO | WO04002011 | 12/2003 |
| WO | WO04002047 | 12/2003 |
| WO | WO2004039011 A2 | 5/2004 |
| WO | WO2004039022 | 5/2004 |

OTHER PUBLICATIONS

European Search Report—EP10173988—Search Authority—Munich—Mar. 15, 2011.
Translation of Office Action in Canadian Application 2501634 corresponding to U.S. Appl. No. 10/610,446, citing CA2690247 dated Feb. 25, 2011.
Translation of Office Action in Japanese Application 2005-501686 corresponding to U.S. Appl. No. 10/375,162, citing JP09135230 dated Feb. 15, 2011.
Chung, J. et al: "Multiple antenna systems for 802.16 systems." IEEE 802.16 Broadband Wireless Access Working Group <http://ieee802.org/I6>, IEEE 802.16abc-01/31, Sep. 7, 2001.
Gore D. A., et al: "Selecting an optimal set of transmit antennas for a low rank matrix channel," 2000 IEEE International Conference on Acoustics, Speech, and Signal Processing. Proceedings. (ICASSP). Istanbul, Turkey, Jun. 5-9, 2000, New York, NY; IEEE, US, vol. 5 of 6, Jun. 5, 2000, pp. 2785-2788, XP001035763, abstract.
Diggavi, S. et al., "Intercarrier interference in MIMO OFDM," IEEE International Conference on Communications, (Aug. 2002), vol. 1, pp. 485-489, doi: 10.1109/ICC.2002.996901.
European Search Report—EP08012143.7, Search Authority—Munich Patent Office, Jan. 19. 2011.
Lebrun G., et al., "MIMO transmission over a time varying TDD channel using SVD," Electronics Letters, 2001, vol. 37, pp. 1363-1364.
Li, Ye et. al., "Simplified Channel Estimation for OFDM Systems with Multiple Transmit Antennas," IEEE Transactions on Wireless Communications, Jan. 2002, vol. 1, No. 1, pp. 67-75.
Iserte, P., et al.,"Joint beamforming strategies in OFDM-MIMO systems," Acoustics, Speech, and Signal Processing, 1993. ICASSP-93., 1993 IEEE International Conference on , vol. 3, sections 2-3, Apr. 27-30, 1993, doi: 10.1109/ICASSP.2002.1005279.
Sampath, H., et al., "Joint transmit and receive optimization for high data rate wireless communication using multiple antennas," Signals, Systems, and Computers, 1999. Conference Record of the Thirty-Third Asilomar Conference, Oct. 24, 1999, XP010373976, pp. 215-219, IEEE, Piscataway, NJ, US.
The Authoritative Dictionary of IEEE Standards Terms, Seventh Edition, IEEE Press: New York (Dec. 2000), p. 902.

(56) References Cited

OTHER PUBLICATIONS

Wong, Cheong. et al., "Multiuser OFDM with Adaptive Subcarrier, Bit and Power Allocation," Oct. 1999, IEEE Journal on Selected Areas in Communications, vol. 17, No. 10, pp. 1747-1758.

Wong K. K., et al., "Optimizing time and space MIMO antenna system for frequency selective fading channels," IEEE Journal on Selected Areas in Communications, vol. 19, No. 7, Jul. 2001, Sections II and III and V, 1396, pp. 1395-1406.

International Search Report, PCT/US03/034519—International Search Authority—European Patent Office—Jul. 8, 2004.

International Preliminary Examination Report—PCT/US03/034519, IPEA/US—Aug. 31, 2004.

3GPP2 TIA/EIA/IS-2000-2-A, "Physical Layer Standard for cdma2000 Spread Spectrum Systems", (Nov. 19, 1999).

Alamouti, S.M., "A Simple Transmit Diversity Technique for Wireless Communications," IEEE Journal on Select Areas in Communications, vol. 16, No. 8, Oct. 1998, pp. 1451-1458.

B. Hassibi, et al. "High-Rate Codes that are Linear in Space and Time," Lucent Technologies, Murray Hill, NY (USA), Aug. 22, 2000, (pp. 1-54).

Chen, K.C. et al., "Novel Space-Time Processing of DS/CDMA Multipath Signal," IEEE 49th, Vehicular Technology Conference, Houston, Texas, May 16-20, 1999, pp. 1809-1813.

Choi, R. et al., "MIMO Transmit Optimization for Wireless Communication Systems," Proceedings of the First IEEE International workshops on Electronic Design, pp. 1-6, Piscataway, New Jersey, Jan. 29-31, 2002.

ETSI TS 101 761-1 v1.3.1, "Broadband Radio Access Networks (BRAN); Hiperlan Type 2; Data Link Control (DLC) Layer; Part 1: Basic Data Transport Functions," ETSI Standards, European Telecommunications Standards Institute BR (V131), pp. 1-88 (Dec. 2001).

Fujii, M.: "Pseudo-Orthogonal Multibeam-Time Transmit Diversity for OFDM-CDMA" pp. 222-226 (2002).

Gao, et al. "On implementation of Bit-Loading Algorithms for OFDM Systems with Multiple-Input Multiple Output," VTC 2002-Fall. 2002 IEEE 56th. Vehicular Technology Conference Proceedings. Vancouver, Canada, Sep. 24-28, 2002, IEEE Vehicular Technology Con.

Haustein, T. et al.: "Performance of MIMO Systems with Channel Inversion," IEEE 55th Vehicular Technology Conference, Birmingham, Alabama, May 6-9, 2002, pp. 35-39.

Hayashi, K, A New Spatio-Temporal Equalization Method Based on Estimated Channel Response, Sep. 2001, IEEE Transaction on Vehicular Technology, vol. 50, Issue 5, pp. 1250-1259.

Hong, D. K. et al.: "Robust Frequency Offset Estimation for Pilot Symbol Assisted Packet CDMA with MIMO Antenna Systems," IEEE Communications Letters, vol. 6, No. 6, pp. 262-264 (Jun. 2002).

IEEE Std 802.11a-1999 (Supplement to IEEE Std 801.11-1999) "Part 11: Wireless LAN Medium Access Control (MAC) and Phyiscal Layer (PHY) specifications: High-Speed physical Layer in the 5GHZ Band", pp. 1-90, Sep. 1999.

Joham, M. et al.: "Symbol Rate Processing for the Downlink of DS-CDMA Systems", IEEE Journal on Selected Areas in Communications, vol. 19, No. 1, paragraphs 1, 2; IEEE Service Center, Piscataway, US, (Jan. 1, 2001), XP011055296, ISSN: 0733-8716.

John A.C. Bingham, "Multicarrier Modulation for Data Transmission: An Idea Whose Time Has Come," IEEE Communications Magazines, May 1990 (pp. 5-13).

Jongren et al., "Utilizing Quantized Feedback Information in Orthogonal Space-Time Block Coding," 2000 IEEE Global Telecommunications Conference, 2(4): 995-999, Nov. 27, 2000.

Kiessling, et al., "Short-Term and Long Term Diagonalization of Correlated MIMO Channels with Adaptive Modulation," IEEE Conference, vol. 2, (Sep. 15, 2002), pp. 593-597.

L. Deneire, et al. "A Low Complexity ML Channel Estimator for OFDM," Proc IEEE ICC Jun. 2001 pp. 1461-1465.

Li Lihua, et al., "A Practical Space-Frequency Block Coded OFDM Scheme for Fast Fading Broadband Channels" 13th IEEE International Symposium on Personal Indoor and Mobile Radio Communications. PIMRC 2002. Sep. 15-18, 2002, pp. 212-216, vol. 1, XP002280831.

M.A. Kousa, et al., "Multichannel adaptive system," IEE Proceedings—I, vol. 140, No. 5, Oct. 1993, rages 357-364.

Miyashita, et al., "High Data-Rate Transmission with Eigenbeam-Space Division Multiplexing (E-SDM) in a MIMO Channel," VTC 2002-Fall. 2002 IEEE 56th. Vehicular Technology Conference Proceedings. Vancouver, Canada, Sep. 24-28, 2002, IEEE Vehicular Technology.

P.W. Wolniansky, et al. "V-BLAST: An Architecture for Realizing Very High Data Rates Over the Rich-Scattering Wireless Channel," Lucent Technologies, Holmdel, NJ.

Pautler, J. et al.: "On Application of Multiple-Input Multiple-Output Antennas to CDMA Cellular Systems," IEEE 54th Vehicular Technology Conference Proceedings, Atlantic City, New Jersey, Oct. 7-11, 2001, pp. 1508-1512.

Tarighat, A. et al. "Performance Analysis of Different Algorithms for cdma2000 Antenna Array System and a New Multi User Beamforming (MUB) Algorithm", Wireless Communications and Networking Conference, vol. 1, pp. 409-414, Sep. 23, 2000.

Theon, S. et al.: "Improved Adaptive Downlink for OFDM/SDMA-Based Wireless Networks," IEEE VTS 53rd Vehicular Technology Conference, pp. 707-711, Rhodes, Greece, May 6-9, 2001.

Tujkovic, D.: "High bandwidth efficiency space-time turbo coded modulation", Institute of Electrical and Electronics Engineers, ICC 2001. 2001 IEEE International Conference on Communications, Conference Record, pp. 1104-1109, Helsinky, Finland, Jun. 11-14, 2001.

Van Zelst, A. et al.: "Space Division Multiplexing (SDM) for OFDM Systems," IEEE 51st Vehicular Technology Conference Proceedings, pp. 1070-1074, Tokyo, Japan, May 15-18, 2000.

Warner, W. et al.: "OFDM/FM Frame Synchronization for Mobile Radio Data Communication", IEEE Transactions on Vehicular Technology, vol. 42, No. 3, pp. 302-313.

Yoshiki, T., et al., "A Study on Subcarrier Adaptive Demodulation System using Multilevel Transmission Power Control for OFDM/FDD System," The Institute of Electronics, Information and Communications Engineers general meeting, lecture collection, Japan, Mar. 7, 2000, Communication 1, p. 400.

Dae-Ko Hong, Young-Jo Lee, Daesik Hong, and Chang-Eon Kang. "Robust frequency offset estimation for pilot symbol assisted packet CDMA with MIMO antenna systems." Communications Letters. IEEE. Jun. 2002.

S.W. Wales, A MIMO technique within the UTRA TDD standard Jun. 22, 2005.

3 rd Generation Partnership Project (3GPP); Technical Specification Group (TSG); Radio Access Network (RAN); RF requirements f o r 1.28Mcps UTRA TDD option, 3GPP Standard; 3G TR 25.945, 3rd Generation Partnership Project (3GPP), Mobile Competence Centre ; 650, Route Des Lucioles ; F-06921 Sophia-Antipolis Cedex; France, No. V2.0.0, Dec. 20, 2000, pp. 1-144, XP050400193, [retreived on Dec. 20, 2000], p. 126.

3rd Generation Partnership Project ; Technical Specification Group Radio Access Network; Radio Resource Control (RRC); Protocol Spefifiation (Release 5 ) , 3GPP Standard; 3GPP TS 25.331, 3rd Generation Partnership Project (3GPP), Mobile Competence Centre ; 650, Route Des Lucioles ; F-06921 Sophia-Antipolis Cedex; France, No. V5.2.0, Sep. 1, 2002, pp. 1-938, XP050367950, pp. 124, 358-p. 370.

"3rd Generation Partnership Project ; Technical Specification Group Radio Access 6-18, Network; Physical channels and mapping of 21-24 transport channels onto physical channels (TDD) (Release 5 )", 3GPP Standard; 3GPP TS 25.221, 3rd Generation Partnership Project (3GPP), Mobile Competence Centre ; 650, Route Des Lucioles ; F-06921 Sophia-Antipolis Cedex ; France, No. V5.2.0, Sep. 1, 2002, pp. 1-97, XP050366967.

Catreux S., et al., "Simulation results for an interference-limited multiple input multiple output cellular system"., Global Telecommmunications letters . IEEE: U.S.A. Nov. 2000. vol. 4(11), pp. 334-336.

Coleri, S. et al: "Channel Estimation Techniques Based on Pilot Arrangement in OFDM Systems," IEEE Transactions on Broadcast-

(56) References Cited

OTHER PUBLICATIONS ing, Sep. 1, 2002, pp. 223-229, vol. 48, No. 3, IEEE Service Center, XP011070267, ISSN: 0018-9316.
Co-pending U.S. Appl. No. 07/624,118, filed Dec. 7, 1990.
Co-pending U.S. Appl. No. 08/118,473, filed Sep. 8, 1993.
Editor: 3GPP Draft; 3rd Generation Partnership Project (3GPP), Technical Specification Group (TSG) Radio Access Network (RAN); Working Group 4(WG4); base Station conformance and testing", TS 25.141 V0.1.1 (May 1999)", R4-99349, Mobile Competence Centre; 650, Route Des Lucioles; F-06921 Sophia-Antipolis Cedex; France, vol. RAN WG4, no.Miami; 20011024, Oct. 24, 2001, XP050166323.
EPO Communication pursuant to Article 94(3) EPC issued by the European Patent Orifice for Application No. 10174926.5 dated Aug. 1, 2013.
EPO Communication pursuant to Article 94(3) EPC issued by the European Patent Orifice for Application No. 10174932.3 dated Jul. 30, 2013.
European Search Report—EP10174919—Search Authority—Munich—Apr. 11, 2012.
Grunheid, R. et al., "Adaptive Modulation and Multiple Access for the OFDM Transmission Technique," Wireless Personal Communications 13: May 13, 2000, 2000 Kluwer Academic Publishers, pp. 4-13, XP000894156.
Harada H., et al., "An OFDM-Based Wireless ATM Transmission System Assisted by a Cyclically ExtendedPN Sequence for Future Broad-BandMobile Multimedia Communications", IEEE Transactions on Vehicular Technology, IEEE Service Center, Piscataway, NJ, US, vol. 50, No. 6, Nov. 1, 2001, XP011064321, ISSN: 0018-9545.
Heath et al., "Multiuser diversity for MIMO wireless systems with linear receivers", Conference Record of the 35th Asilomar Conference on Signals, Systems, & Computers, Nov. 4, 2001, pp. 1194-1199, vol. 2, IEEE, XP010582229, DOI: 10.1109/ACSSC.2001.987680, ISBN: 9780-7803-7147-7.
Lal D et al: "A novel MAC layer protocol for space division multiple access in wireless ad hoc networks", Computer Communications and Networks, 2002 Proceedings, Eleventh International Conference on Oct. 14, 2002, pp. 614-619.
Le Goff, S. et al: "Turbo-codes and high spectral efficiency modulation," IEEE International Conference on Communications, 1994. ICC "94, SUPERCOMM/ICC" 94, Conference Record, 'Serving Humanity Through Communications.' pp. 645-649, vol. 2, May 1-5, 1994, XP010126658, doi: 10.1109/ICC.1994.368804.
Louvigne J.C., et al., "Experimental study of a real-time calibration procedure of a CDMA/TDD multiple antenna terminal," IEEE Antennas and Propagation Society International Symposium, 2002 Digest.APS.San Antonio, TX, Jun. 16-21, 2002,vol. 2, Jun. 16, 2002, pp. 644-647, XP010591780, DOI: 10.1109/APS.2002.1016729, ISBN: 978-0-7803-7330-3.
Nogueroles R., et al., "Performance of a random OFDMA system for mobile communications", Broadband Communications, 1998. Accessing, Transmission, Networking. Proceedings. 1998 International Zurich Seminar on Zurich, Switzerland Feb. 17-19, 1998, New York, NY, USA, IEEE, US, Feb. 17, 1998, pp. 37-43, XP010277032, DOI : 10.1109/IZSBC.1998.670242 ISBN: 978-0-7803-3893-7, p. 1-p. 2.
Sakaguchi et al, "Comprehensive Calibration for MIMO System", International Symposium on Wireless Personal Multimedia Communications, IEEE, vol. 2, Oct. 27, 2002, pp. 440-443.
Sampath et al., "A Fourth-Generation MIMO-OFDM Broadband Wireless System: Design, Performance and Field Trial Results", IEEE Communications Magazine, Sep. 1, 2002, pp. 143-149, vol. 40, No. 9, IEEE Service Center, XP011092922, ISSN: 0163-6804, DOI: 10.1109/MCOM.2002.1031841.
Song, Bong-Gee et al., "Prefilter design using the singular value decomposition for MIMO equalization," 1996 Conference Record of the Thirtieth Asilomar Conference on Signals, Systems and Computers, vol. 1, pp. 34-38, Nov. 3-6, 1996, XP010231388, DOI : 10.1109/ACSSC.1996.600812, p. 35, col. 2, paragraph 4 through p. 36, col. 1.
Technical Search Report issued by the Taiwan Patent Office for TW Application No. 098143050, dated Aug. 2, 2013.
Varanasi M.K, et al., "Optimum decision feedback multiuser equalization with successive decoding achieves the total capacity of the Gaussian multiple-access channel", Signals, Systems & Computers, 1997. Conference Record of the Thirty-First Asilomar Conference on Pacific Grove, CA, USA Nov. 2-5, 1997, Los Alamitos, CA, USA,IEEE Comput. SOC, US, vol. 2, Nov. 2, 1997, pp. 1405-1409, XP010280667, DOI: 10.1109/ACSSC.1997 . 679134 ISBN : 978-0-8186-8316-9 pp. 1,3,5; figures 1,3.
Vook, F. W. et al., "Adaptive antennas for OFDM", Vehicular Technology Conference, vol. 1, May 18-21, 1998, pp. 606-610, XP010287858, New York, NY, USA, IEEE, US DOI: 10.1109/VETEC.1998.686646 ISBN: 978-0-7803-4320-7.
Wyglinski, Alexander. "Physical Layer Loading Algorithms for Indoor Wireless Multicarrier Systems," Thesis Paper, McGill University, Montreal, Canada, Nov. 2004, p. 109.
Yamamura, T et al., "High Mobility OFDM transmission system by a new channel estimation and ISI cancellation scheme using characteristics of pilot symbol inserted OFDM signal"., Vehicular Technology Conference, vol. 1, Sep. 19, 1999-Sep. 22, 1999, pp. 319-323, XP010352958 IEEE, Piscataway, NJ, USA, ISBN: 0-7803-5435-4.
Taiwan Search Report—TW099105740—TIPO—Apr. 22, 2014.

* cited by examiner

MIMO SYSTEM WITH MULTIPLE SPATIAL MULTIPLEXING MODES

CLAIM OF PRIORITY

This application for patent is a continuation of, and claims the benefit of priority from, U.S. patent application Ser. No. 10/693,429, entitled "MIMO System with Multiple Spatial Multiplexing Modes" and filed on Oct. 23, 2003, which claims the benefit of priority from U.S. Provisional Patent Application Ser. No. 60/421,309, entitled "MIMO WLAN System" and filed Oct. 25, 2002, both of which are assigned to the assignee of this application for patent and are fully incorporated herein by reference for all purposes.

BACKGROUND

1. Field

The present invention relates generally to communication, and more specifically to a multiple-input multiple-output (MIMO) communication system with multiple transmission modes.

2. Background

A MIMO system employs multiple ($N_T$) transmit antennas and multiple ($N_R$) receive antennas for data transmission and is denoted as an ($N_T$, $N_R$) system. A MIMO channel formed by the $N_T$ transmit and $N_R$ receive antennas may be decomposed into $N_S$ spatial channels, where $N_S \leq \min\{N_T, N_R\}$. The $N_S$ spatial channels may be used to transmit $N_S$ independent data streams to achieve greater overall throughput. In general, spatial processing may or may not be performed at a transmitter and is normally performed at a receiver to simultaneously transmit and recover multiple data streams.

A conventional MIMO system typically uses a specific transmission scheme to simultaneously transmit multiple data streams. This transmission scheme may be selected based on a trade-off of various factors such as the requirements of the system, the amount of feedback from the receiver to the transmitter, the capabilities of the transmitter and receiver, and so on. The transmitter, receiver, and system are then designed to support and operate in accordance with the selected transmission scheme. This transmission scheme typically has favorable features as well as unfavorable ones, which can impact system performance.

There is therefore a need in the art for a MIMO system capable of achieving improved performance.

SUMMARY

A MIMO system that supports multiple spatial multiplexing modes for improved performance and greater flexibility is described herein. Spatial multiplexing refers to the transmission of multiple data streams simultaneously via multiple spatial channels of a MIMO channel. The multiple spatial multiplexing modes may include (1) a single-user steered mode that transmits multiple data streams on orthogonal spatial channels to a single receiver, (2) a single-user non-steered mode that transmits multiple data streams from multiple antennas to a single receiver without spatial processing at a transmitter, (3) a multi-user steered mode that transmits multiple data streams simultaneously to multiple receivers with spatial processing at a transmitter, and (4) a multi-user non-steered mode that transmits multiple data streams from multiple antennas (co-located or non co-located) without spatial processing at the transmitter(s) to receiver(s) having multiple antennas.

A set of at least one user terminal is selected for data transmission on the downlink and/or uplink. A spatial multiplexing mode is selected for the user terminal set from among the multiple spatial multiplexing modes supported by the system. Multiple rates are also selected for multiple data streams to be transmitted via multiple spatial channels of a MIMO channel for the user terminal set. The user terminal set is scheduled for data transmission on the downlink and/or uplink with the selected rates and the selected spatial multiplexing mode. Thereafter, multiple data streams are processed (e.g., coded, interleaved, and modulated) in accordance with the selected rates and further spatially processed in accordance with the selected spatial multiplexing mode for transmission via multiple spatial channels.

Various aspects and embodiments of the invention are described in further detail below.

DETAILED DESCRIPTION

Figure 1:
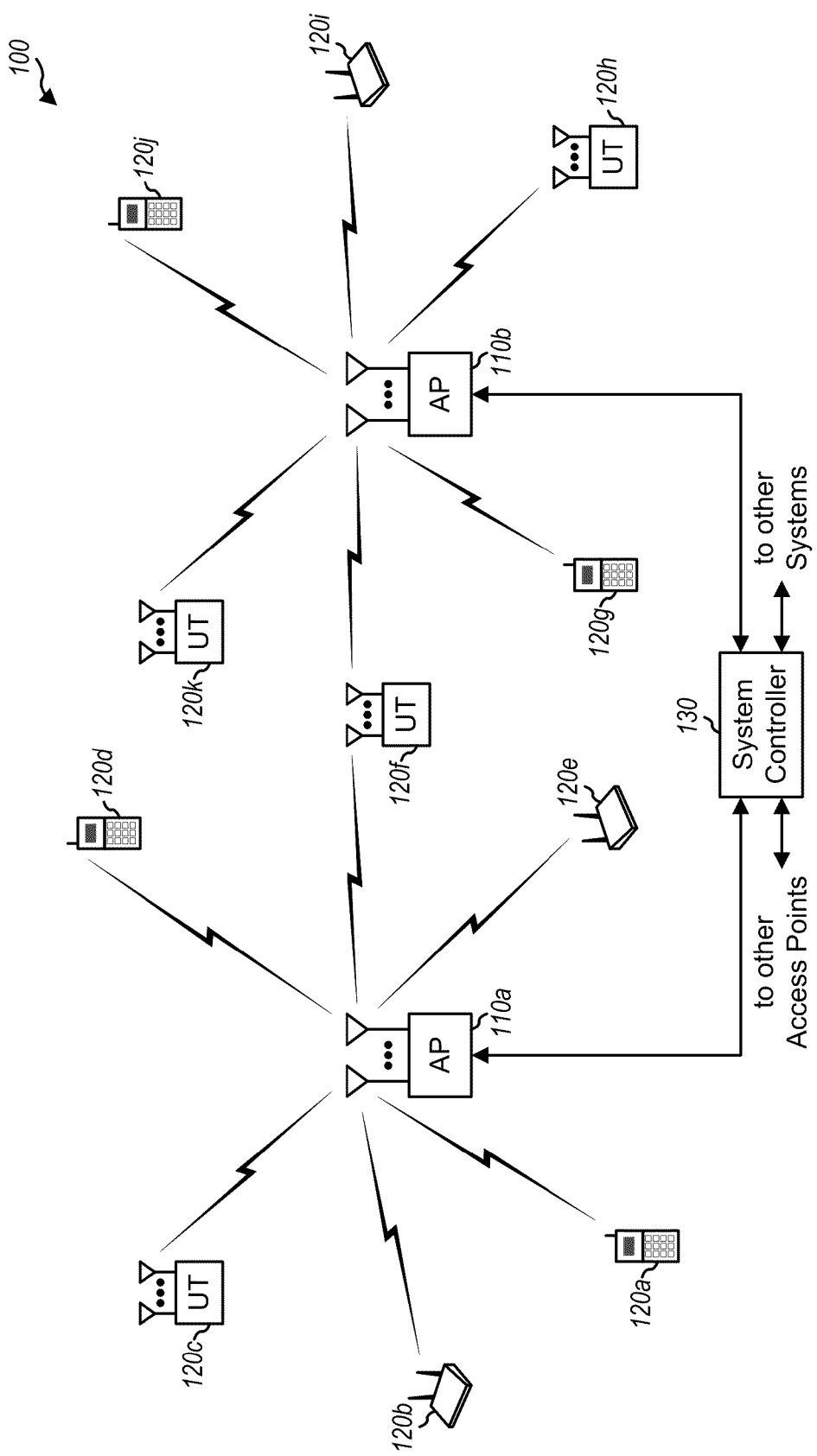
FIG. 1 shows a multiple-access MIMO system.

The word "exemplary" is used herein to mean "serving as an example, instance, or illustration." Any embodiment described herein as "exemplary" is not necessarily to be construed as preferred or advantageous over other embodiments.

A MIMO system may utilize a single carrier or multiple carriers for data transmission. Multiple carriers may be provided by orthogonal frequency division multiplexing (OFDM), other multi-carrier modulation techniques, or some other constructs. OFDM effectively partitions the overall system bandwidth into multiple ($N_F$) orthogonal subbands, which are also commonly referred to as tones, bins, carriers, and frequency channels. With OFDM, each subband is associated with a respective carrier that may be modulated with data. The following description is for a MIMO system that utilizes OFDM. However, the concepts described herein are equally applicable for a single carrier MIMO system.

The MIMO system supports multiple spatial multiplexing modes for improved performance and greater flexibility. Table 1 lists the supported spatial multiplexing modes and their short descriptions.

TABLE 1

| Spatial Multiplexing Mode | Description |
| --- | --- |
| Single-User Steered | Multiple data streams are transmitted on orthogonal spatial channels to a single receiver. |
| Single-User Non-Steered | Multiple data streams are transmitted from multiple antennas to a single receiver without spatial processing at a transmitter. |
| Multi-User Steered | Multiple data streams are transmitted simultaneously (1) from a single transmitter to multiple receivers or (2) from multiple transmitters to a single receiver, both with spatial processing at the transmitter(s). |
| Multi-User Non-Steered | Multiple data streams are transmitted simultaneously (1) from multiple transmitters to a single receiver or (2) from a single transmitter to multiple receivers, both without spatial processing at the transmitter(s). |

The MIMO system may also support other and/or different spatial multiplexing modes, and this is within the scope of the invention.

Each spatial multiplexing mode has different capabilities and requirements. The steered spatial multiplexing modes can typically achieve better performance but can only be used if the transmitter has sufficient channel state information to orthogonalize the spatial channels via decomposition or some other technique, as described below. The non-steered spatial multiplexing modes require very little information to simultaneously transmit multiple data streams, but performance may not be quite as good as the steered spatial multiplexing modes. A suitable spatial multiplexing mode may be selected for use depending on the available channel state information, the capabilities of the transmitter and receiver, system requirements, and so on. Each of these spatial multiplexing modes is described below.

Single-User Steered Spatial Multiplexing Mode

A frequency-selective MIMO channel formed by $N_T$ transmit antennas and $N_R$ receive antennas may be characterized by $N_F$ frequency-domain channel response matrices $\underline{H}(k)$, for $k=1 \ldots N_F$, each with dimensions of $N_R \times N_T$. The channel response matrix for each subband may be expressed as:

$$\underline{H}(k) = \begin{bmatrix} h_{1,1}(k) & h_{1,2}(k) & \ldots & h_{1,N_T}(k) \\ h_{2,1}(k) & h_{2,2}(k) & \ldots & h_{2,N_T}(k) \\ \vdots & \vdots & \ddots & \vdots \\ h_{N_R,1}(k) & h_{N_R,2}(k) & \ldots & h_{N_R,N_T}(k) \end{bmatrix}, \quad \text{Eq. (1)}$$

where entry $h_{i,j}(k)$, for $i=1 \ldots N_R$, $j=1 \ldots N_T$, and $k=1 \ldots N_F$, is the coupling (i.e., complex gain) between transmit antenna j and receive antenna i for subband k.

The channel response matrix $\underline{H}(k)$ for each subband may be "diagonalized" to obtain $N_S$ eigenmodes for that subband. This diagonalization may be achieved by performing either singular value decomposition of the channel response matrix $\underline{H}(k)$ or eigenvalue decomposition of a correlation matrix of $\underline{H}(k)$, which is $\underline{R}(k)=\underline{H}^H(k)\underline{H}(k)$, where "$H$" denotes the conjugate transpose.

The singular value decomposition of the channel response matrix $\underline{H}(k)$ for each subband may be expressed as:

$$\underline{H}(k) = \underline{U}(k)\underline{\Sigma}(k)\underline{V}^H(k), \quad \text{Eq. (2)}$$

where $\underline{U}(k)$ is an $(N_R \times N_R)$ unitary matrix of left eigenvectors of $\underline{H}(k)$;

$\underline{\Sigma}(k)$ is an $(N_R \times N_T)$ diagonal matrix of singular values of $\underline{H}(k)$; and $\underline{V}(k)$ is an $(N_T \times N_T)$ unitary matrix of right eigenvectors of $\underline{H}(k)$.

A unitary matrix $\underline{M}$ is characterized by the property $\underline{M}^H\underline{M}=\underline{I}$, where $\underline{I}$ is the identity matrix. The columns of a unitary matrix are orthogonal to one another.

The eigenvalue decomposition of the correlation matrix of $\underline{H}(k)$ for each subband may be expressed as:

$$\underline{R}(k) = \underline{H}^H(k)\underline{H}(k) = \underline{V}(k)\underline{\Lambda}(k)\underline{V}^H(k), \quad \text{Eq. (3)}$$

where $\underline{\Lambda}(k)$ is an $(N_T \times N_T)$ diagonal matrix of eigenvalues of $\underline{R}(k)$. As shown in equations (2) and (3), the columns of $\underline{V}(k)$ are eigenvectors of $\underline{R}(k)$ as well as right eigenvectors of $\underline{H}(k)$.

Singular value decomposition and eigenvalue decomposition are described by Gilbert Strang in a book entitled "Linear Algebra and Its Applications," Second Edition, Academic Press, 1980. The single-user steered spatial multiplexing mode may be implemented with either singular value decomposition or eigenvalue decomposition. For clarity, singular value decomposition is used for the following description.

The right eigenvectors of $\underline{H}(k)$ are also referred to as "steering" vectors and may be used for spatial processing by a transmitter to transmit data on the $N_S$ eigenmodes of $\underline{H}(k)$. The left eigenvectors of $\underline{H}(k)$ may be used for spatial processing by a receiver to recover the data transmitted on the $N_S$ eigenmodes. The eigenmodes may be viewed as orthogonal spatial channels obtained through decomposition. The diagonal matrix $\underline{\Sigma}(k)$ contains non-negative real values along the diagonal and zeros elsewhere. These diagonal entries are referred to as the singular values of $\underline{H}(k)$ and represent the channel gains for the $N_S$ eigenmodes of $\underline{H}(k)$. The singular values of $\underline{H}(k)$, $\{\sigma_1(k)\ \sigma_2(k) \ldots \sigma_{N_S}(k)\}$, are also the square roots of the eigenvalues of $\underline{R}(k)$, $\{\lambda_1(k)\ \lambda_2(k) \ldots \lambda_{N_S}(k)\}$, where $\sigma_i(k)=\sqrt{\lambda_i(k)}$. Singular value decomposition may be performed independently on the channel response matrix $\underline{H}(k)$ for each of the $N_F$ subbands to determine the $N_S$ eigenmodes for that subband.

For each subband, the singular values in the matrix $\underline{\Sigma}(k)$ may be ordered from largest to smallest, and the eigenvectors in the matrices $\underline{V}(k)$ and $\underline{U}(k)$ may be ordered correspondingly. A "wideband" eigenmode may be defined as the set of same-order eigenmodes of all $N_F$ subbands after the ordering (i.e., wideband eigenmode m includes eigenmode m of all subbands). In general, all or fewer than $N_F$ subbands may be used for transmission, with the unused subbands being filled with signal values of zero. For simplicity, the following description assumes that all $N_F$ subbands are used for transmission.

The single-user steered spatial multiplexing mode (or simply, the "single-user steered mode") transmits $N_S$ data symbol streams on the $N_S$ eigenmodes of the MIMO channel. This requires spatial processing by both the transmitter and the receiver.

The spatial processing at the transmitter for each subband for the single-user steered mode may be expressed as:

$$\underline{x}_{su-s}(k)=\underline{V}(k)\underline{s}(k), \qquad \text{Eq. (4)}$$

where
$\underline{s}(k)$ is an ($N_T \times 1$) vector with $N_S$ non-zero entries for $N_S$ data symbols to be transmitted on the $N_S$ eigenmodes for subband k; and
$\underline{x}_{su-s}(k)$ is an ($N_T \times 1$) vector with NT entries for NT transmit symbols to be sent from the NT transmit antennas for subband k.

The NS entries of $\underline{s}(k)$ can represent NS data symbol streams and the remaining entries of $\underline{s}(k)$, if any, are filled with zeros.

The received symbols obtained by the receiver for each subband may be expressed as:

$$\underline{r}_{su-s}(k)=\underline{H}(k)\underline{x}_{su-s}(k)+\underline{n}(k)=\underline{H}(k)\underline{V}(k)\underline{s}(k)+\underline{n}(k), \qquad \text{Eq. (5)}$$

where
$\underline{r}_{su-s}(k)$ is an ($N_R \times 1$) vector with $N_R$ entries for $N_R$ received symbols obtained via the $N_R$ receive antennas for subband k; and
$\underline{n}(k)$ is a noise vector for subband k.

The spatial processing at the receiver to recover the data vector $\underline{s}(k)$ for each subband may be expressed as:

$$\begin{aligned}\hat{\underline{s}}_{su-s}(k) &= \underline{\Sigma}^{-1}(k)\underline{U}^H(k)\underline{r}_{su-s}(k), \qquad \text{Eq. (6)}\\ &= \underline{\Sigma}^{-1}(k)\underline{U}^H(k)(\underline{H}(k)\underline{V}(k)\underline{s}(k)+\underline{n}(k)),\\ &= \underline{\Sigma}^{-1}(k)\underline{U}^H(k)(\underline{U}(k)\underline{\Sigma}(k)\underline{V}^H(k)\underline{V}(k)\underline{s}(k)+\underline{n}(k)),\\ &= \underline{s}(k)+\underline{n}_{su-s}(k),\end{aligned}$$

or $$\tilde{\underline{s}}_{su-s}(k)=\underline{U}^H(k)\underline{r}_{su-s}(k) \text{ and } \hat{\underline{s}}_{su-s}(k)=\underline{\Sigma}^{-1}(k)\tilde{\underline{s}}_{su-s}(k),$$

where
$\tilde{\underline{s}}_{su-s}(k)$ is an ($N_T \times 1$) vector with $N_S$ detected data symbols for subband k;
$\hat{\underline{s}}_{su-s}(k)$ is an ($N_T \times 1$) vector with $N_S$ recovered data symbols for subband k; and
$\underline{n}_{su-s}(k)$ is a vector of post-processed noise for subband k.

The vector $\tilde{\underline{s}}_{su-s}(k)$ is an unnormalized estimate of the data vector $\underline{s}(k)$, and the vector $\hat{\underline{s}}_{su-s}(k)$ is a normalized estimate of $\underline{s}(k)$. The multiplication by $\underline{\Sigma}^{-1}(k)$ in equation (6) accounts for the (possibly different) gains of the $N_S$ spatial channels and normalizes the output of the receiver spatial processing so that recovered data symbols with the proper magnitude are provided to a subsequent processing unit.

For the single-user steered mode, the matrix $\underline{F}_{su-s}(k)$ of steering vectors used by the transmitter for each subband may be expressed as:

$$\underline{F}_{su-s}(k)=\underline{V}(k). \qquad \text{Eq. (7)}$$

The spatial filter matrix used by the receiver for each subband may be expressed as:

$$\underline{M}_{su-s}(k)=\underline{U}^H(k). \qquad \text{Eq. (8)}$$

The single-user steered mode may be used if the transmitter has channel state information for either the channel response matrix $\underline{H}(k)$ or the matrix $\underline{V}(k)$ of right eigenvectors of $\underline{H}(k)$, for k=1 ... $N_F$. The transmitter can estimate $\underline{H}(k)$ or $\underline{V}(k)$ for each subband based on a pilot transmitted by the receiver, as described below, or may be provided with this information by the receiver via a feedback channel. The receiver can typically obtain $\underline{H}(k)$ or $\underline{U}^H(k)$ for each subband based on a pilot transmitted by the transmitter. Equation (6) indicates that the $N_S$ data symbol streams $\underline{s}(k)$, distorted only by post-processed channel noise $\underline{n}_{su-s}(k)$, may be obtained for the single-user steered mode with the proper spatial processing at both the transmitter and the receiver.

The signal-to-noise-and-interference ratio (SNR) for the single-user steered mode may be expressed as:

$$\gamma_{su-s,m}(k) = \frac{P_m(k)\lambda_m(k)}{\sigma^2}, m = 1 \ldots N_S, \qquad \text{Eq. (9)}$$

where
$P_m(k)$ is the transmit power used for the data symbol transmitted on subband k of wideband eigenmode m;
$\lambda_m(k)$ is the eigenvalue for subband k of wideband eigenmode m, which is the m-th diagonal element of $\underline{\Lambda}(k)$; and
$\gamma_{su-s,m}(k)$ is the SNR for subband k of wideband eigenmode m.

Single-User Non-Steered Spatial Multiplexing Mode

The single-user non-steered spatial multiplexing mode (or simply, the "single-user non-steered mode") may be used if the transmitter does have not sufficient channel state information or if the single-user steered mode cannot be supported for any reasons. The single-user non-steered mode transmits $N_S$ data symbol streams from $N_T$ transmit antennas without any spatial processing at the transmitter.

For the single-user non-steered mode, the matrix $\underline{F}_{ns}(k)$ of steering vectors used by the transmitter for each subband may be expressed as:

$$\underline{F}_{ns}(k)=\underline{I}. \qquad \text{Eq. (10)}$$

The spatial processing at the transmitter for each subband may be expressed as:

$$\underline{x}_{ns}(k)=\underline{s}(k), \qquad \text{Eq. (11)}$$

where $\underline{x}_s(k)$ is the transmit symbol vector for the single-user non-steered mode. A "wideband" spatial channel for this mode may be defined as the spatial channel corresponding to a given transmit antenna (i.e., wideband spatial channel m for the single-user non-steered mode includes all subbands of transmit antenna m).

The received symbols obtained by the receiver for each subband may be expressed as:

$$\underline{r}_{ns}(k)=\underline{H}(k)\underline{x}_{ns}(k)+\underline{n}(k)=\underline{H}(k)\underline{s}(k)+\underline{n}(k). \qquad \text{Eq. (12)}$$

The receiver can recover the data vector $\underline{s}(k)$ using various receiver processing techniques such as a channel correlation matrix inversion (CCMI) technique (which is also commonly referred to as a zero-forcing technique), a minimum mean square error (MMSE) technique, a decision feedback equalizer (DFE), a successive interference cancellation (SIC) technique, and so on.

CCMI Spatial Processing

The receiver can use the CCMI technique to separate out the data symbol streams. A CCMI receiver utilizes a spatial filter having a response of $\underline{M}_{ccmi}(k)$, for k=1 ... $N_F$, which can be expressed as:

$$\underline{M}_{ccmi}(k)=[\underline{H}^H(k)\underline{H}(k)]^{-1}\underline{H}^H(k)=\underline{R}^{-1}(k)\underline{H}(k). \qquad \text{Eq. (13)}$$

The spatial processing by the CCMI receiver for the single-user non-steered mode may be expressed as:

$$\hat{\underline{s}}_{ccmi}(k) = \underline{M}_{ccmi}(k)\underline{r}_{ns}(k), \quad \text{Eq. (14)}$$
$$= \underline{R}^{-1}(k)\underline{H}^H(k)(\underline{H}(k)\underline{s}(k) + \underline{n}(k)),$$
$$= \underline{s}(k) + \underline{n}_{ccmi}(k),$$

where $\hat{\underline{s}}_{ccmi}(k)$ is an ($N_T \times 1$) vector with $N_S$ recovered data symbols for subband k; and $\underline{n}_{ccmi}(k) = \underline{M}_{ccmi}(k)\underline{n}(k)$ is the CCMI filtered noise for subband k.

An autocovariance matrix $\underline{\phi}_{ccmi}(k)$ of the CCMI filtered noise for each subband may be expressed as:

$$\underline{\varphi}_{ccmi}(k) = E[\underline{n}_{ccmi}(k)\underline{n}_{ccmi}^H(k)], \quad \text{Eq. (15)}$$
$$= \underline{M}_{ccmi}(k)\underline{\varphi}_{nn}(k)\underline{M}_{ccmi}^H(k),$$
$$= \sigma^2 \underline{R}^{-1}(k),$$

where E[x] is the expected value of x. The last equality in equation (15) assumes that the noise $\underline{n}(k)$ is additive white Gaussian noise (AWGN) with zero mean, a variance of $\sigma^2$, and an autocovariance matrix of $\underline{\phi}_{nn}(k) = E[\underline{n}(k)\underline{n}^H(k)] = \sigma^2 \underline{I}$. In this case, the SNR for the CCMI receiver may be expressed as:

$$\gamma_{ccmi,m}(k) = \frac{P_m(k)}{r_{mm}(k)\sigma^2}, \quad m = 1 \ldots N_S, \quad \text{Eq. (16)}$$

where $P_m(k)$ is the transmit power used for the data symbol transmitted on subband k of wideband spatial channel m;

$r_{mm}(k)$ is the m-th diagonal element of $\underline{R}(k)$ for subband k; and $\gamma_{ccmi,m}(k)$ is the SNR for subband k of wideband spatial channel m.

Due to the structure of $\underline{R}(k)$, the CCMI technique may amplify the noise.

MMSE Spatial Processing

The receiver can use the MMSE technique to suppress crosstalk between the data symbol streams and maximize the SNRs of the recovered data symbol streams. An MMSE receiver utilizes a spatial filter having a response of $\underline{M}_{mmse}(k)$, for $k=1 \ldots N_F$, which is derived such that the mean square error between the estimated data vector from the spatial filter and the data vector $\underline{s}(k)$ is minimized. This MMSE criterion may be expressed as:

$$\min_{(\underline{M}_{mmse}(k))} E[(\underline{M}_{mmse}(k)\underline{r}_{ns}(k) - \underline{s}(k))^H (\underline{M}_{mmse}(k)\underline{r}_{ns}(k) - \underline{s}(k))]. \quad \text{Eq. (17)}$$

The solution to the optimization problem posed in equation (17) may be obtained in various manners. In one exemplary method, the MMSE spatial filter matrix $\underline{M}_{mmse}(k)$ for each subband may be expressed as:

$$\underline{M}_{mmse}(k) = \underline{H}^H(k)\left[\underline{H}(k)\underline{H}^H(k) + \underline{\varphi}_{nn}(k)\right]^{-1}, \quad \text{Eq. (18)}$$
$$= \underline{H}^H(k)[\underline{H}(k)\underline{H}^H(k) + \sigma^2 \underline{I}]^{-1}.$$

The second equality in equation (18) assumes that the noise vector $\underline{n}(k)$ is AWGN with zero mean and variance of $\sigma^2$.

The spatial processing by the MMSE receiver for the single-user non-steered mode is composed of two steps. In the first step, the MMSE receiver multiplies the vector $\underline{r}_{ns}(k)$ for the $N_R$ received symbol streams with the MMSE spatial filter matrix $\underline{M}_{mmse}(k)$ to obtain a vector $\tilde{\underline{s}}_{mmse}(k)$ for $N_S$ detected symbol streams, as follows:

$$\tilde{\underline{s}}_{mmse}(k) = \underline{M}_{mmse}(k)\underline{r}_{ns}(k), \quad \text{Eq. (19)}$$
$$= \underline{M}_{mmse}(k)(\underline{H}(k)\underline{s}(k) + \underline{n}(k)),$$
$$= \underline{Q}(k)\underline{s}(k) + \underline{n}_{mmse}(k),$$

where $\underline{n}_{mmse}(k) = \underline{M}_{mmse}(k)\underline{n}(k)$ is the MMSE filtered noise and $\underline{Q}(k) = \underline{M}_{mmse}(k)\underline{H}(k)$.

The $N_S$ detected symbol streams are unnormalized estimates of the $N_S$ data symbol streams.

In the second step, the MMSE receiver multiplies the vector $\tilde{\underline{s}}_{mmse}(k)$ with a scaling matrix $\underline{D}_{mmse}^{-1}(k)$ to obtain a vector $\hat{\underline{s}}_{mmse}(k)$ for the $N_S$ recovered data symbol streams, as follows:

$$\hat{\underline{s}}_{mmse}(k)\underline{D}_{mmse}^{-1}(k)\tilde{\underline{s}}_{mmse}(k) \quad \text{Eq. (20)}$$

where $\underline{D}_{mmse}(k)$ is a diagonal matrix whose diagonal elements are the diagonal elements of $\underline{Q}(k)$, i.e., $\underline{D}_{mmse}(k) = \text{diag}[\underline{Q}(k)]$. The $N_S$ recovered data symbol streams are normalized estimates of the $N_S$ data symbol streams.

Using the matrix inverse identity, the matrix $\underline{Q}(k)$ can be rewritten as:

$$\underline{Q}(k) = \underline{H}^H(k)\underline{\varphi}_{nn}^{-1}(k)\underline{H}(k)\left[\underline{H}^H(k)\underline{\varphi}_{nn}^{-1}(k)\underline{H}(k) + \underline{I}\right]^{-1}, \quad \text{Eq. (21)}$$
$$= \underline{H}^H(k)\underline{H}(k)[\underline{H}^H(k)\underline{H}(k) + \sigma^2 \underline{I}]^{-1}.$$

The second equality in equation (21) assumes that the noise is AWGN with zero mean and variance of $\sigma^2$.

The SNR for the MMSE receiver may be expressed as:

$$\gamma_{mmse,m}(k) = \frac{q_{mm}(k)}{1 - q_{mm}(k)} P_m(k), \quad m = 1 \ldots N_S, \quad \text{Eq. (22)}$$

where $q_{mm}(k)$ is the m-th diagonal element of $\underline{Q}(k)$ for subband k; and $\gamma_{mmse,m}(k)$ is the SNR for subband k of wideband spatial channel m.

Successive Interference Cancellation Receiver Processing

The receiver can process the $N_R$ received symbol streams using the SIC technique to recover the $N_S$ data symbol streams. For the SIC technique, the receiver initially performs spatial processing on the $N_R$ received symbol streams (e.g., using CCMI, MMSE, or some other technique) and obtains one recovered data symbol stream. The receiver further processes (e.g., demodulates, deinterleaves, and decodes) this recovered data symbol stream to obtain a decoded data stream. The receiver then estimates the interference this stream causes to the other $N_S-1$ data symbol streams and cancels the estimated interference from the $N_R$ received symbol streams to obtain $N_R$ modified symbol streams. The receiver then repeats the same processing on the $N_R$ modified symbol streams to recover another data symbol stream.

For a SIC receiver, the input (i.e., received or modified) symbol streams for stage $\ell$, where $\ell = 1 \ldots N_S$, may be expressed as:

$$\underline{r}_{sic}^{\ell}(k) = \underline{r}_{sic}^{\ell}(k)\underline{x}_{ns}^{\ell}(k) + \underline{n}(k) = \underline{r}_{sic}^{\ell}(k)\underline{s}^{\ell}(k) + \underline{n}(k), \quad \text{Eq. (23)}$$

where $\underline{r}_{sic}^{\ell}(k)$ is a vector of $N_R$ modified symbols for subband k in stage $\ell$, and $\underline{r}_{sic}^{1}(k) = r_{ns}(k)$ for the first stage;

$\underline{s}^{\ell}(k)$ is a vector of $(N_T - \ell + 1)$ data symbols not yet recovered for subband k in stage $\ell$; and $\underline{H}^{\ell}(k)$ is an $N_R \times (N_T - \ell + 1)$ reduced channel response matrix for subband k in stage $\ell$.

Equation (23) assumes that the data symbol streams recovered in the $(\ell -1)$ prior stages are canceled. The dimensionality of the channel response matrix $\underline{H}(k)$ successively reduces by one column for each stage as a data symbol stream is recovered and canceled. For stage $\ell$, the reduced channel response matrix $\underline{r}_{sic}^{\ell}(k)$ is obtained by removing $(\ell -1)$ columns in the original matrix $\underline{H}(k)$ corresponding to the $(\ell -1)$ data symbol streams previously recovered, i.e., $\underline{r}_{sic}^{\ell}(k) = [\underline{h}_{j_\ell}(k) \underline{h}_{j_{\ell-1}}(k) \ldots \underline{h}_{j_{N_T}}(k)]$, where $\underline{h}_{j_n}(k)$ is an $N_R \times 1$ vector for the channel response between transmit antenna $j_n$ and the $N_R$ receive antennas. For stage $\ell$, the $(\ell -1)$ data symbol streams recovered in the prior stages are given indices of $\{j_1 j_2 \ldots j_{\ell-1}\}$, and the $(N_T - \ell + 1)$ data symbol streams not yet recovered are given indices of $\{j_\ell \; j_{\ell+1} \ldots j_{N_T}\}$.

For stage $\ell$, the SIC receiver derives a spatial filter matrix $\underline{M}_{sic}^{\ell}(k)$, for $k = 1 \ldots N_F$, based on the reduced channel response matrix $\underline{H}^{\ell}(k)$ (instead of the original matrix $\underline{H}(k)$) using the CCMI technique as shown in equation (13), the MMSE technique as shown in equation (18), or some other technique. The matrix $\underline{M}_{sic}^{\ell}(k)$ has dimensionality of $(N_T - \ell + 1) \times N_R$. Since $\underline{H}^{\ell}(k)$ is different for each stage, the spatial filter matrix $\underline{M}_{sic}^{\ell}(k)$ is also different for each stage.

The SIC receiver multiplies the vector $\underline{r}_{sic}^{\ell}(k)$ for the $N_R$ modified symbol streams with the spatial filter matrix $\underline{M}_{sic}^{\ell}(k)$ to obtain a vector $\underline{\tilde{s}}_{sic}^{\ell}(k)$ for $(N_T - \ell + 1)$ detected symbol streams, as follows:

$$\begin{aligned}\underline{\tilde{s}}_{sic}^{\ell}(k) &= \underline{M}_{sic}^{\ell}(k)\underline{r}_{sic}^{\ell}(k), \quad \text{Eq. (24)}\\ &= \underline{M}_{sic}^{\ell}(k)(\underline{H}^{\ell}(k)\underline{s}^{\ell}(k) + \underline{n}^{\ell}(k)),\\ &= \underline{Q}_{sic}^{\ell}(k)\underline{s}^{\ell}(k) + \underline{n}_{sic}^{\ell}(k),\end{aligned}$$

where $\underline{n}_{sic}^{\ell}(k) = \underline{M}_{sic}^{\ell}(k)\underline{n}^{\ell}(k)$ is the filtered noise for subband k of stage $\ell$, $\underline{n}^{\ell}(k)$ is a reduced vector of $\underline{n}(k)$, and $\underline{Q}_{sic}^{\ell}(k) = \underline{M}_{sic}^{\ell}(k)\underline{H}^{\ell}(k)$.

The SIC receiver then selects one of the detected symbol streams for recovery. Since only one data symbol stream is recovered in each stage, the SIC receiver can simply derive one $(1 \times N_R)$ spatial filter row vector $\underline{m}_{j_\ell}^{\ell}(k)$ for the data symbol stream $\{s_{j_\ell}\}$ to be recovered in stage $\ell$. The row vector $\underline{m}_{j_\ell}^{\ell}(k)$ is one row of the matrix $\underline{M}_{sic}^{\ell}(k)$. In this case, the spatial processing for stage $\ell$ to recover the data symbol stream $\{s_{j_\ell}\}$ may be expressed as:

$$\tilde{s}_{j_\ell}(k) = \underline{m}_{j_\ell}^{\ell}(k)\underline{r}_{sic}^{\ell}(k) = \underline{q}_{j_\ell}^{\ell}(k)\underline{s}^{\ell}(k) + \underline{m}_{j_\ell}^{\ell}(k)\underline{n}(k), \quad \text{Eq. (25)}$$

where $\underline{q}_{j_\ell}^{\ell}(k)$ is the row of $\underline{Q}_{sic}^{\ell}(k)$ corresponding to data symbol stream $\{s_{j_\ell}\}$.

In any case, the receiver scales the detected symbol stream $\{\tilde{s}_{j_\ell}\}$ to obtain a recovered data symbol stream $\{\hat{s}_{j_\ell}\}$ and further processes (e.g., demodulates, deinterleaves, and decodes) the stream $\{\hat{s}_{j_\ell}\}$ to obtain a decoded data stream $\{\hat{a}_{j_\ell}\}$. The receiver also forms an estimate of the interference this stream causes to the other data symbol streams not yet recovered. To estimate the interference, the receiver re-encodes, interleaves, and symbol maps the decoded data stream $\{\hat{a}_{j_\ell}\}$ in the same manner as performed at the transmitter and obtains a stream of "remodulated" symbols $\underline{i}_{j_\ell}(k)$, which is an estimate of the data symbol stream just recovered. The receiver then convolves the remodulated symbol stream with each of $N_R$ elements in the channel response vector $\underline{h}_{j_\ell}(k)$ for stream $\{s_{j_\ell}\}$ to obtain $N_R$ interference components $\{\tilde{v}_{j_\ell}\}$ caused by this stream. The $N_R$ interference components are then subtracted from the $N_R$ modified symbol streams $\underline{r}_{sic}^{\ell}(k)$ for stage $\ell$ to obtain $N_R$ modified symbol streams $\underline{r}_{sic}^{\ell+1}(k)$ for the next stage $\underline{r}_{sic}^{\ell}+1$, i.e., $\underline{r}_{sic}^{\ell+1}(k) = \underline{r}_{sic}^{\ell}(k) - \underline{i}_{j_\ell}(k)$. The modified symbol streams $\underline{r}^{\ell}(k)$ represent the streams that would have been received if the data symbol stream $\{s_{j_\ell}\}$ had not been transmitted (i.e., assuming that the interference cancellation was effectively performed).

The SIC receiver processes the $N_R$ received symbol streams in $N_S$ successive stages. For each stage, the SIC receiver (1) performs spatial processing on either the $N_R$ received symbol streams or the $N_R$ modified symbol streams from the preceding stage to obtain one recovered data symbol stream, (2) decodes this recovered data symbol stream to obtain a corresponding decoded data stream, (3) estimates and cancels the interference due to this stream, and (4) obtains $N_R$ modified symbol streams for the next stage. If the interference due to each data stream can be accurately estimated and canceled, then later recovered data streams experience less interference and may be able to achieve higher SNRs.

For the SIC technique, the SNR of each recovered data symbol stream is dependent on (1) the spatial processing technique (e.g., CCMI or MMSE) used for each stage, (2) the specific stage in which the data symbol stream is recovered, and (3) the amount of interference due to data symbol streams recovered in later stages. The SNR for the SIC receiver with CCMI may be expressed as:

$$\gamma_{sic-ccmi,m}(k) = \frac{P_m(k)}{r_{mm}^{\ell}(k)\sigma^2}, \; m = 1 \ldots N_S, \quad \text{Eq. (26)}$$

where $r_{mm}^{\ell}(k)$ is the m-th diagonal element of $[\underline{R}^{\ell}(k)]^{-1}$ for subband k, where $\underline{R}^{\ell}(k) = [\underline{H}^{\ell}(k)]^H \underline{H}^{\ell}(k)$.

The SNR for the SIC receiver with MMSE may be expressed as:

$$\gamma_{sic-mmse,m}(k) = \frac{q_{mm}^l(k)}{1-q_{mm}^l(k)} P_m(k), \quad m = 1 \ldots N_S, \qquad \text{Eq. (27)}$$

where $q_{mm}^\ell(k)$ is the m-th diagonal element of $\underline{Q}_{sic}^\ell(k)$ for subband k, where $\underline{Q}_{sic}^\ell(k)$ is derived as shown in equation (21) but based on the reduced channel response matrix $\underline{H}^\ell(k)$ instead of the original matrix $\underline{H}(k)$.

In general, the SNR progressively improves for data symbol streams recovered in later stages because the interference from data symbol streams recovered in prior stages is canceled. This then allows higher rates to be used for data symbol streams recovered later.

Multi-User Steered Spatial Multiplexing Mode

The multi-user steered spatial multiplexing mode (or simply, the "multi-user steered mode") supports data transmission from a single transmitter to multiple receivers simultaneously based on "spatial signatures" of the receivers. The spatial signature for a receiver is given by a channel response vector (for each subband) between the $N_T$ transmit antennas and each receive antenna at the receiver. The transmitter may obtain the spatial signatures for the receivers as described below. The transmitter may then (1) select a set of receivers for simultaneous data transmission and (2) derive steering vectors for the data symbol streams to be transmitted to the selected receivers such that transmit stream crosstalk is adequately suppressed at the receivers.

The steering vectors for the multi-user steered mode may be derived in various manners. Two exemplary schemes are described below. For simplicity, the following description is for one subband and assumes that each receiver is equipped with one antenna.

In a channel inversion scheme, the transmitter obtains the steering vectors for multiple receivers using channel inversion. The transmitter initially selects $N_T$ single-antenna receivers for simultaneous transmission. The transmitter obtains a $1 \times N_T$ channel response row vector $\underline{h}_l(k)$ for each selected receiver and forms an $N_T \times N_T$ channel response matrix $\underline{H}_{su-s}(k)$ with the $N_T$ row vectors for the $N_T$ receivers. The transmitter then uses channel inversion to obtain a matrix $\underline{F}_{mu-s}(k)$ of $N_T$ steering vectors for the $N_T$ selected receivers, as follows:

$$\underline{F}_{mu-s}(k) = \underline{H}_{mu-s}^{-1}(k). \qquad \text{Eq. (28)}$$

The spatial processing at the transmitter for each subband for the multi-user steered mode may be expressed as:

$$\underline{x}_{mu-s}(k) = \underline{F}_{mu-s}(k)\underline{s}(k). \qquad \text{Eq. (29)}$$

where $\underline{x}_{mu-s}(k)$ is the transmit symbol vector for the multi-user steered mode.

The received symbols at the $N_T$ selected receivers for each subband may be expressed as:

$$\begin{aligned}\underline{r}_{mu-s}(k) &= \underline{H}_{mu-s}(k)\underline{x}_{mu-s}(k) + \underline{n}(k), \qquad \text{Eq. (30)} \\ &= \underline{H}_{mu-s}(k)\underline{F}_{mu-s}(k)\underline{s}(k) + \underline{n}(k), \\ &= \underline{s}(k) + \underline{i}(k) + \underline{n}(k),\end{aligned}$$

where $\underline{r}_{mu-s}(k)$ is an ($N_T \times 1$) received symbol vector for subband k at the $N_T$ selected receivers, and $\underline{i}(k)$ represents the crosstalk interference due to imperfect estimation of $\underline{F}_{mu-s}(k)$ at the transmitter.

Each selected receiver would obtain only one entry of the vector $\underline{r}_{mu-s}(k)$ for each receive antenna. If the spatial processing at the transmitter is effective, then the power in $\underline{i}(k)$ is small, and each recovered data symbol stream experiences little crosstalk from the ($N_T-1$) other data symbol streams sent to the other receivers.

The transmitter can also transmit a steered pilot to each selected receiver, as described below. Each receiver would then process its steered pilot to estimate the channel gain and phase and coherently demodulate the received symbols from its single antenna with the channel gain and phase estimates to obtain recovered data symbols.

The SNRs achieved for the multi-user steered mode are a function of the autocovariance of the channel response matrix $\underline{H}_{mu-s}(k)$. Higher SNRs can be achieved by selecting "compatible" user terminals. Different sets and/or combinations of user terminals may be evaluated, and the set/combination with the highest SNRs may be selected for data transmission.

While the channel inversion scheme is appealing in its simplicity, in general, it will provide poor performance, because preconditioning the data symbol streams with the inverse channel response matrix in equation (29) forces the transmitter to put the majority of its power in the worst eigenmodes of the MIMO channel. Also, in some channels, particularly those with large correlations among the elements of $\underline{H}_{mu-s}(k)$, the channel response matrix is less than full rank, and calculating an inverse will not be possible.

In a precoding scheme, the transmitter precodes $N_T$ data symbol streams to be sent to the $N_T$ selected receivers such that these data symbol streams experience little crosstalk at the receivers. The transmitter can form the channel response matrix $\underline{H}_{mu}(k)$ for the $N_T$ selected receivers. The transmitter then performs QR factorization on $\underline{H}_{mu}(k)$ such that $\underline{H}_{mu}(k) = \underline{F}_{trl}(k)\underline{Q}_{mu}(k)$, where $\underline{F}_{trl}(k)$ is a lower left triangular matrix and $\underline{Q}_{mu}(k)$ is a unitary matrix.

The transmitter performs a precoding operation on the data symbol vector to be transmitted, $\underline{s}(k) = [s_1(k)\ s_2(k)\ \ldots\ s_{N_T}(k)]^T$, to obtain a precoded symbol vector $\underline{a}(k) = [a_1(k)\ a_2(k)\ \ldots\ a_{N_T}(k)]^T$, as follows:

$$a_l(k) = \frac{1}{f_{ll}(k)}\left(s_l(k) - \sum_{i=1}^{l-1} f_{li}(k)a_i(k)\right) \bmod(M/2), \qquad \text{Eq. (31)}$$

for $l = 1 \ldots N_T$, where

M is the number of levels, spaced at unit intervals, in the in-phase or quadrature dimension of a square QAM signal constellation; and $f_{ij}(k)$ is the element of $\underline{F}_{trl}(k)$ in row i and column j.

The modulo (mod) operation adds a sufficient number of integer multiples of M to the argument so that the result satisfies $a_\ell(k) \in [-M/2, M/2)$. After this precoding operation, the transmit symbols are computed by processing the precoded symbol vector $\underline{a}(k)$ with the unitary steering matrix $\underline{Q}_{mu}(k)$ to generate the transmit symbol vector $\underline{x}_{mu-pc}(k) = \underline{Q}_{mu}^H(k)\underline{a}(k)$.

The receive symbol vector for the precoding scheme can be expressed as:

$$\underline{r}_{mu-pc}(k) = \underline{H}_{mu}(k)\underline{Q}_{mu}^H(k)\underline{a}(k) + \underline{n}(k) = \underline{F}_{trl}(k)\underline{a}(k) + \underline{n}(k). \qquad \text{Eq. (32)}$$

It can be shown that $\underline{F}_{rri}(k)\underline{a}(k)\bmod(M/2)=\underline{s}(k)$. Thus, the data symbol vector can be estimated as $\underline{\hat{s}}_{mu\text{-}pc}(k) = \underline{r}_{mu\text{-}pc}(k)\bmod(M/2)$. Each of the $N_T$ selected receivers only obtains one of the $N_T$ elements of $\underline{r}_{mu\text{-}pc}(k)$ and can estimate the data symbols sent to it by performing the mod(M/2) operation on its received symbols.

The transmitter can also transmit multiple data symbol streams to a multi-antenna receiver in the multi-user steered mode. The channel response matrix $\underline{H}_{mu}(k)$ would then include one row vector for each receive antenna of the multi-antenna receiver.

The multi-user steered mode also supports data transmission from multiple multi-antenna transmitters to a single receiver. Each multi-antenna transmitter performs spatial processing on its data symbol stream to steer the stream toward the receiver. Each transmitter also transmits a steered pilot to the receiver. To the receiver, each transmitter appears as a single transmission. The receiver performs spatial processing (e.g., CCMI, MMSE, and so on) to recover the steered data symbol streams from all transmitters.

Multi-User Non-Steered Spatial Multiplexing Mode

The multi-user non-steered spatial multiplexing mode (or simply, the "multi-user non-steered mode") supports simultaneous data transmission by (1) a single transmitter to multiple receivers (e.g., for the downlink) and (2) multiple transmitters to a single receiver (e.g., for the uplink).

For non-steered transmission from a single transmitter to multiple receivers, the transmitter transmits one data symbol stream from each transmit antenna for a recipient receiver. One or multiple data symbol streams may be transmitted for each recipient receiver. Each recipient receiver includes at least $N_T$ receive antennas and can perform spatial processing to isolate and recover its data symbol stream(s). Each receiver desiring data transmission estimates the SNR for each of the $N_T$ transmit antennas and sends the $N_T$ SNR estimates to the transmitter. The transmitter selects a set of receivers for data transmission based on the SNR estimates from all receivers desiring data transmission (e.g., to maximize the overall throughput).

For non-steered transmission from multiple transmitters to a single receiver, the transmitters transmit data symbol streams from their antennas (i.e., without spatial processing) such that these streams arrive approximately time-aligned at the receiver. The receiver can estimate the channel response matrix for all of the transmitters as if they were one transmitter. The receiver can recover multiple data symbol streams transmitted by these multiple transmitters using any of the techniques described above for the single-user non-steered mode (e.g., CCMI, MMSE, and SIC techniques).

Spatial Processing

Table 2 summarizes the spatial processing at the transmitter and the receiver for the four spatial multiplexing modes described above. For the non-steered modes, receiver processing techniques other than CCMI and MMSE may also be used. The last column in Table 2 indicates whether or not SIC technique may be used at the receiver.

TABLE 2

| Spatial Multiplexing Mode | Transmit F(k) | Receive M(k) | Scaling | SIC |
|---|---|---|---|---|
| Single-User Steered | V(k) | $U^H(k)$ | $\Sigma^{-1}(k)$ | no |
| Single-User Non-Steered | I | $M_{ccmi}(k)$ $M_{mmse}(k)$ | — $D_{mmse}^{-1}(k)$ | yes |
| Multi-User Steered (single transmitter to multiple receivers) | $H_{mu\text{-}s}^{-1}(k)$ | — | — | no |

TABLE 2-continued

| Spatial Multiplexing Mode | Transmit F(k) | Receive M(k) | Scaling | SIC |
|---|---|---|---|---|
| Multi-User Non-Steered (multiple transmitters to single receiver) | I | $M_{ccmi}(k)$ $M_{mmse}(k)$ | — $D_{mmse}^{-1}(k)$ | yes |

For simplicity, the spatial processing for the multi-user steered mode from multiple transmitters to a single receiver and the multi-user non-steered mode from a single transmitter to multiple receivers are not shown in Table 2.

In the following description, a wideband spatial channel can correspond to (1) a wideband eigenmode, for a steered spatial multiplexing mode, (2) a transmit antenna, for a non-steered spatial multiplexing mode, or (3) a combination of one or more spatial channels of one or more subbands. A wideband spatial channel can be used to transmit one independent data stream.

MIMO System

FIG. 1 shows a multiple-access MIMO system 100 with a number of access points (APs) 110 providing communication for a number of user terminals (UTs) 120. For simplicity, only two access points 110a and 110b are shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. A system controller 130 couples to and provides coordination and control for access points 110.

MIMO system 100 may be a time division duplex (TDD) system or a frequency division duplex (FDD) system. The downlink and uplink (1) share the same frequency band for a TDD system and (2) use different frequency bands for an FDD system. The following description assumes that MIMO system 100 is a TDD system.

MIMO system 100 utilizes a set of transport channels to transmit different types of data. The transport channels may be implemented in various manners.

Figure 2:
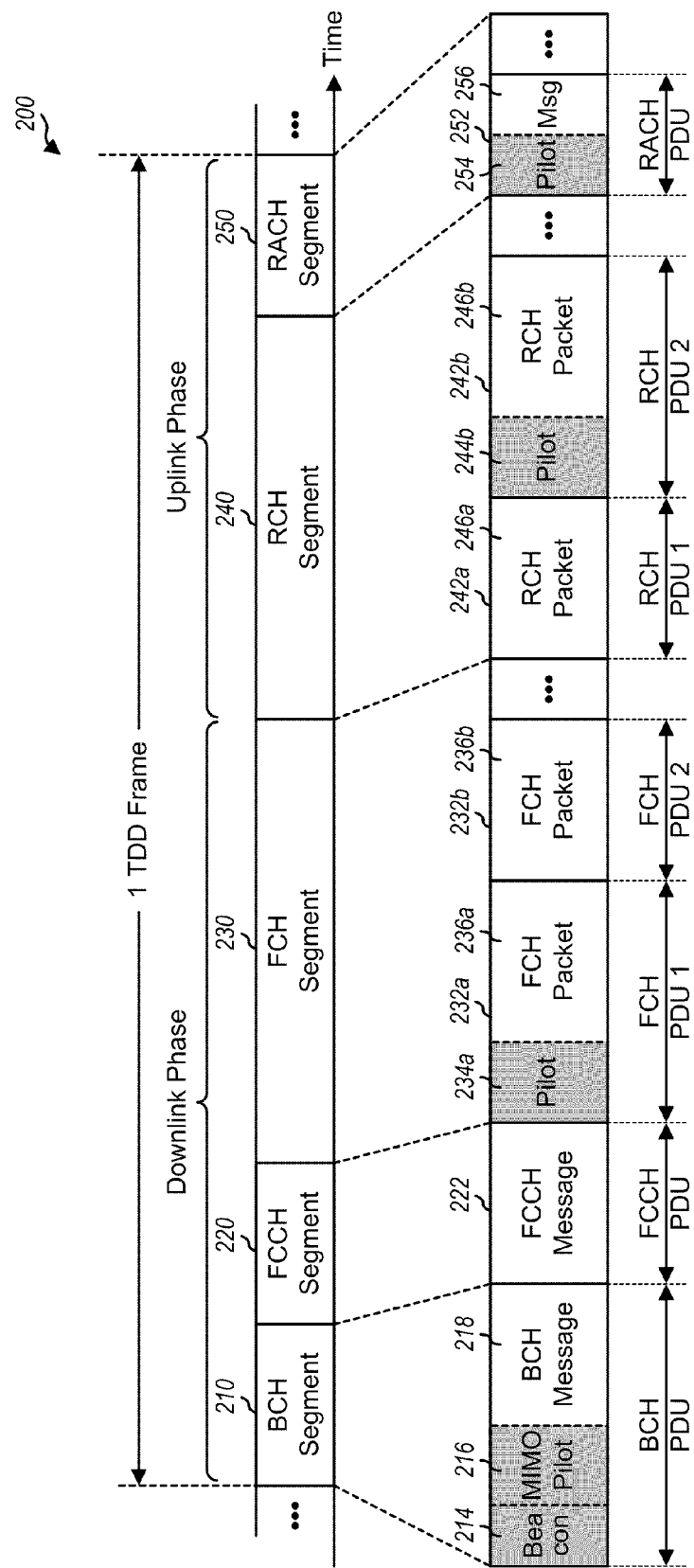
FIG. 2 shows a frame and channel structure for the MIMO system.

FIG. 2 shows an exemplary frame and channel structure 200 that may be used for MIMO system 100. Data transmission occurs in TDD frames. Each TDD frame spans a predetermined time duration (e.g., 2 msec) and is partitioned into a downlink phase and an uplink phase. Each phase is further partitioned into multiple segments 210, 220, 230, 240, and 250 for multiple transport channels.

In the downlink phase, a broadcast channel (BCH) carries a beacon pilot 214, a MIMO pilot 216, and a BCH message 218. The beacon pilot is used for timing and frequency acquisition. The MIMO pilot is used for channel estimation. The BCH message carries system parameters for the user terminals. A forward control channel (FCCH) carries scheduling information for assignments of downlink and uplink resources and other signaling for the user terminals. A forward channel (FCH) carries FCH protocol data units (PDUs) on the downlink. An FCH PDU 232a includes a pilot 234a and a data packet 236a, and an FCH PDU 232b includes only a data packet 236b. In the uplink phase, a reverse channel (RCH) carries RCH PDUs on the uplink. An RCH PDU 242a includes only a data packet 246a, and an RCH PDU 242b includes a pilot 244b and a data packet 246b. A random access channel (RACH) is used by the user terminals to gain access to the system and to send short messages on the uplink. An RACH PDU 252 sent on the RACH includes a pilot 254 and a message 256.

Figure 3:
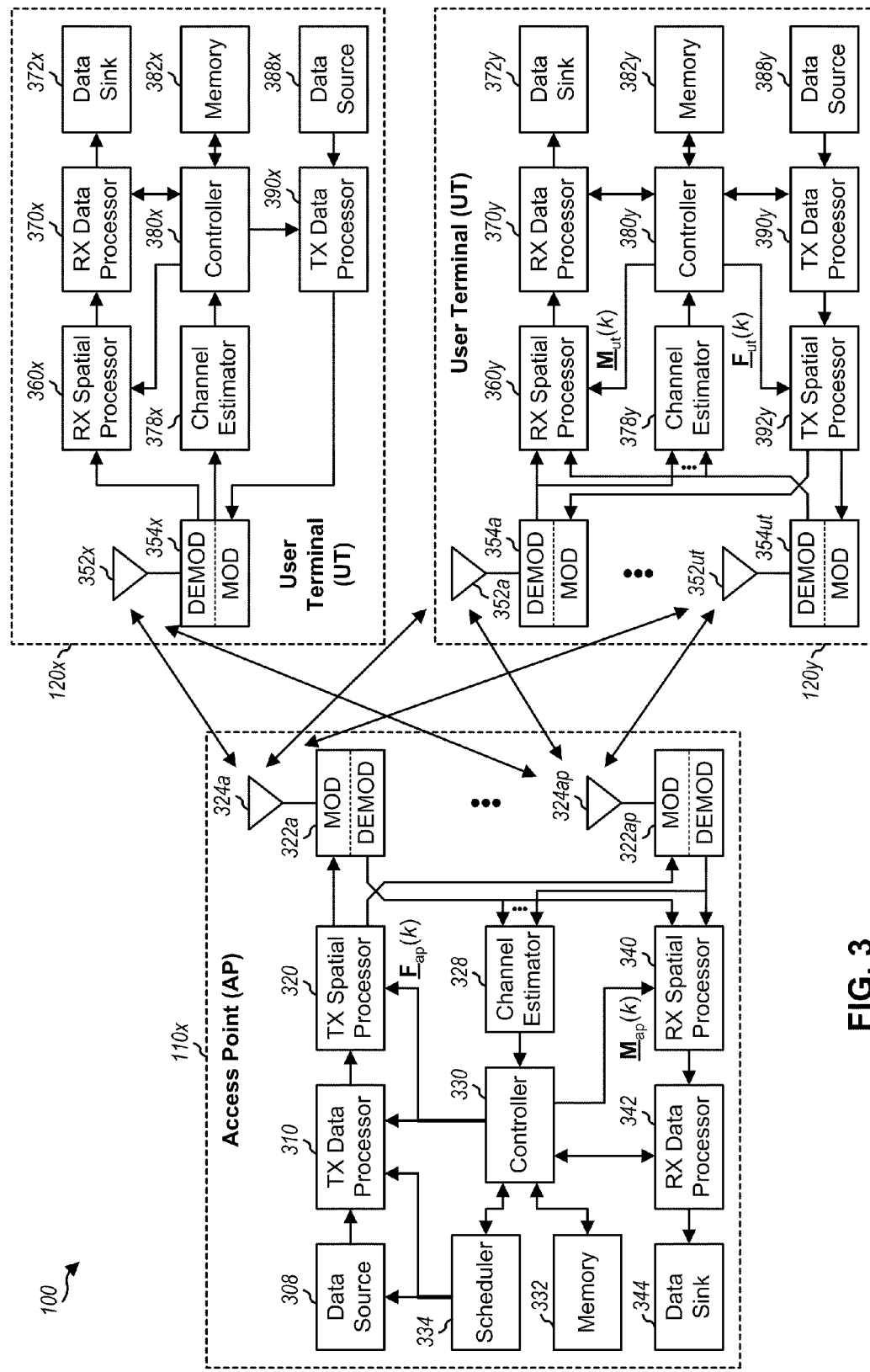
FIG. 3 shows an access point and two user terminals in the MIMO system.

FIG. 3 shows a block diagram of an access point 110x and two user terminals 120x and 120y in MIMO system 100. Access point 110x is one of the access points in FIG. 1 and is equipped with multiple ($N_{ap}$) antennas 324a through 324ap. User terminal 120x is equipped with a single antenna 352x, and user terminal 120y is equipped with multiple ($N_{ut}$) antennas 352a through 352ut.

On the downlink, at access point 110x, a TX data processor 310 receives traffic data for one or more user terminals from a data source 308, control data from a controller 330, and possibly other data from a scheduler 334. The various types of data may be sent on different transport channels. TX data processor 310 processes (e.g., encodes, interleaves, and symbol maps) the different types of data based on one or more coding and modulation schemes to obtain $N_S$ streams of data symbols. As used herein, a "data symbol" refers to a modulation symbol for data, and a "pilot symbol" refers to a modulation symbol for pilot. A TX spatial processor 320 receives the $N_S$ data symbol streams from TX data processor 310, performs spatial processing on the data symbols with matrices $\underline{F}_{ap}(k)$, for k=1 . . . $N_F$, multiplexes in pilot symbols, and provides $N_{ap}$ streams of transmit symbols for the $N_{ap}$ antennas. The matrices $\underline{F}_{ap}(k)$ are derived in accordance with the spatial multiplexing mode selected for use. The processing by TX data processor 310 and TX spatial processor 320 is described below.

Each modulator (MOD) 322 receives and processes a respective transmit symbol stream to obtain a stream of OFDM symbols, and further conditions (e.g., amplifies, filters, and frequency upconverts) the OFDM symbol stream to generate a downlink signal. $N_{ap}$ modulators 322a through 322ap provide $N_{ap}$ downlink signals for transmission from $N_{ap}$ antennas 324a through 324ap, respectively, to the user terminals.

At each user terminal 120, one or multiple antennas 352 receive the $N_{ap}$ downlink signals, and each antenna provides a received signal to a respective demodulator (DEMOD) 354. Each demodulator 354 performs processing complementary to that performed by modulator 322 and provides a stream of received symbols. For single-antenna user terminal 120x, an RX spatial processor 360x performs coherent demodulation of the received symbol stream from a single demodulator 354x and provides one stream of recovered data symbols. For multi-antenna user terminal 120y, RX spatial processor 360y performs spatial processing on $N_{ut}$ received symbol streams from $N_{ut}$ demodulators 354 with spatial filter matrices $\underline{M}_{ut}(k)$, for k=1 . . . $N_F$, and provides $N_{ut}$ streams of recovered data symbols. In any case, each recovered data symbol stream $\{\hat{s}_m\}$ is an estimate of a data symbol stream $\{s_m\}$ transmitted by access point 110x to that user terminal 120. An RX data processor 370 receives and demultiplexes the recovered data symbols to the proper transport channels. The recovered data symbols for each transport channel are then processed (e.g., demapped, deinterleaved, and decoded) to obtain decoded data for that transport channel. The decoded data for each transport channel may include recovered traffic data, control data, and so on, which may be provided to a data sink 372 for storage and/or a controller 380 for further processing.

At each user terminal 120, a channel estimator 378 estimates the downlink channel response and provides channel estimates, which may include channel gain estimates, SNR estimates, and so on. Controller 380 receives the channel estimates, derives the vectors and/or coefficients used for spatial processing on the transmit and receive paths, and determines a suitable rate for each data symbol stream on the downlink. For example, controller 380y for multi-antenna user terminal 120y may derive the spatial filter matrices $\underline{M}_{ut}(k)$ for the downlink and the matrices $\underline{F}_{ut}(k)$ of steering vectors for the uplink based on downlink channel response matrices $\underline{H}_{dn}(k)$, for k=1 . . . $N_F$. Controller 380 may also receive the status of each packet/frame received on the downlink and assemble feedback information for access point 110x. The feedback information and uplink data are processed by a TX data processor 390, spatially processed by a TX spatial processor 392 (if present at user terminal 120), multiplexed with pilot symbols, conditioned by one or more modulators 354, and transmitted via one or more antennas 352 to access point 110x.

At access point 110x, the transmitted uplink signals are received by antennas 324, demodulated by demodulators 322, and processed by an RX spatial processor 340 and an RX data processor 342 in a complementary manner to that performed at user terminals 120. The recovered feedback information is provided to controller 330 and scheduler 334. Scheduler 334 may use the feedback information to perform a number of functions such as (1) scheduling a set of user terminals for data transmission on the downlink and uplink and (2) assigning the available downlink and uplink resources to the scheduled terminals.

Controllers 330 and 380 control the operation of various processing units at access point 110x and user terminal 120, respectively. For example, controller 380 may determine the highest rates supported by the spatial channels on the downlink for user terminal 120. Controller 330 may select the rate, payload size, and OFDM symbol size for each spatial channel of each scheduled user terminal.

The processing at access point 110x and user terminals 120x and 120y for the uplink may be the same or different from the processing for the downlink. For clarity, the processing for the downlink is described in detail below.

Figure 4:
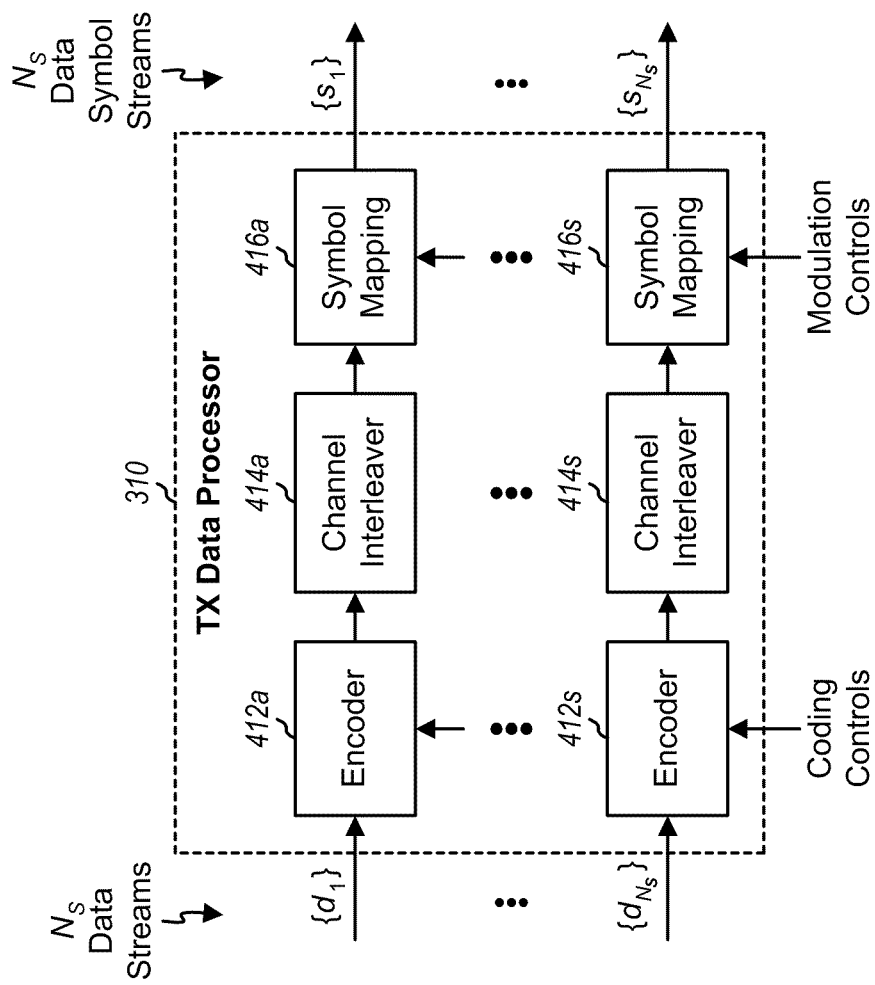
FIG. 4 shows a transmit (TX) data processor at the access point.

FIG. 4 shows a block diagram of an embodiment of TX data processor 310 at access point 110x. For this embodiment, TX data processor 310 includes one set of encoder 412, channel interleaver 414, and symbol mapping unit 416 for each of the $N_S$ data streams. For each data stream $\{d_m\}$, where m=1 . . . $N_S$, an encoder 412 receives and codes the data stream based on a coding scheme selected for that stream and provides code bits. The coding scheme may include CRC, convolutional, Turbo, low density parity check (LDPC), block, and other coding, or a combination thereof. A channel interleaver 414 interleaves (i.e., reorders) the code bits based on an interleaving scheme. A symbol mapping unit 416 maps the interleaved bits based on a modulation scheme selected for that stream and provides a stream of data symbols $\{s_m\}$. Unit 416 groups each set of B interleaved bits to form a B-bit binary value, where B≥1, and further maps each B-bit binary value to a specific data symbol based on the selected modulation scheme (e.g., QPSK, M-PSK, or M-QAM, where M=$2^B$). The coding and modulation for each data stream are performed in accordance with coding and modulation controls provided by controller 330.

Figure 5:
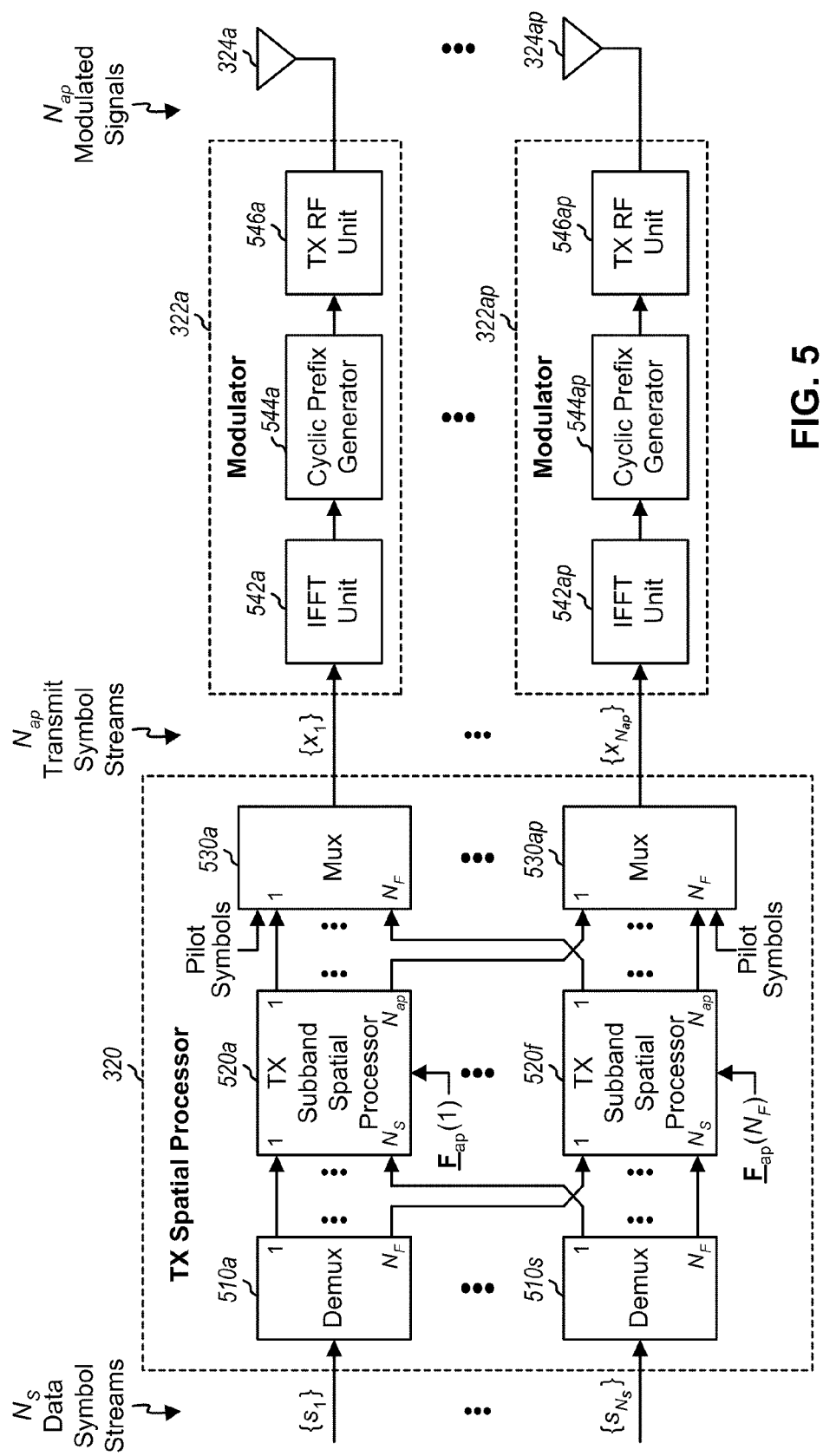
FIG. 5 shows a TX spatial processor and modulators at the access point.

FIG. 5 shows a block diagram of an embodiment of TX spatial processor 320 and modulators 322a through 322ap at access point 110x. For this embodiment, TX spatial processor 320 includes $N_S$ demultiplexers (Demux) 510a through 510s, $N_F$ TX subband spatial processors 520a through 520f, and $N_{ap}$ multiplexers (Mux) 530a through 530ap. Each demultiplexer 510 receives a respective data symbol stream $\{s_m\}$ from TX spatial processor 320, demultiplexes the stream into $N_F$ data symbol substreams for the $N_F$ subbands, and provides the $N_F$ substreams to $N_F$ spatial processors 520a through 520f. Each spatial processor 520 receives $N_S$ data symbol substreams for its subband from $N_S$ demultiplexers 510a through 510s, performs transmitter spatial processing on these substreams, and provides $N_{ap}$ transmit symbol substreams for the $N_{ap}$ access point antennas. Each spatial processor 520 multiplies a data vector $\underline{s}_{dn}(k)$ with a matrix $\underline{F}_{ap}(k)$ to obtain a transmit vector $\underline{x}_{dn}(k)$. The matrix $\underline{F}_{ap}(k)$ is equal to (1) a matrix $\underline{V}_{dn}(k)$ of right eigenvectors of $\underline{H}_{dn}(k)$ for the single-user steered mode, (2) the matrix $\underline{F}_{mu}(k)$ for the multi-user steered mode, or (3) the identity matrix $\underline{I}$ for the single-user non-steered mode.

Each multiplexer 530 receives $N_F$ transmit symbol substreams for its transmit antenna from $N_F$ spatial processors 520a through 520f, multiplexes these substreams and pilot symbols, and provides a transmit symbol stream $\{x_j\}$ for its transmit antenna. The pilot symbols may be multiplexed in frequency (i.e., on some subbands), in time (i.e., in some symbol periods), and/or in code space (i.e., with an orthogonal code). $N_{ap}$ multiplexers 530a through 530ap provide $N_{ap}$ transmit symbol streams $\{x_j\}$, for j=1 ... $N_{ap}$, for $N_{ap}$ antennas 324a through 324ap.

For the embodiment shown in FIG. 5, each modulator 322 includes an inverse fast Fourier transform (IFFT) unit 542, a cyclic prefix generator 544, and a TX RF unit 546. IFFT unit 542 and cyclic prefix generator 544 form an OFDM modulator. Each modulator 322 receives a respective transmit symbol stream $\{x_j\}$ from TX spatial processor 320 and groups each set of $N_F$ transmit symbols for the $N_F$ subbands. IFFT unit 542 transforms each set of $N_F$ transmit symbols to the time domain using an $N_F$-point inverse fast Fourier transform and provides a corresponding transformed symbol that contains $N_F$ chips. Cyclic prefix generator 544 repeats a portion of each transformed symbol to obtain a corresponding OFDM symbol that contains $N_F + N_{cp}$ chips. The repeated portion (i.e., the cyclic prefix) ensures that the OFDM symbol retains its orthogonal properties in the presence of multipath delay spread caused by frequency selective fading. TX RF unit 546 receives and conditions the OFDM symbol stream from generator 544 to generate a downlink modulated signal. $N_{ap}$ downlink modulated signals are transmitted from $N_{ap}$ antennas 324a through 324ap, respectively.

Figure 6:
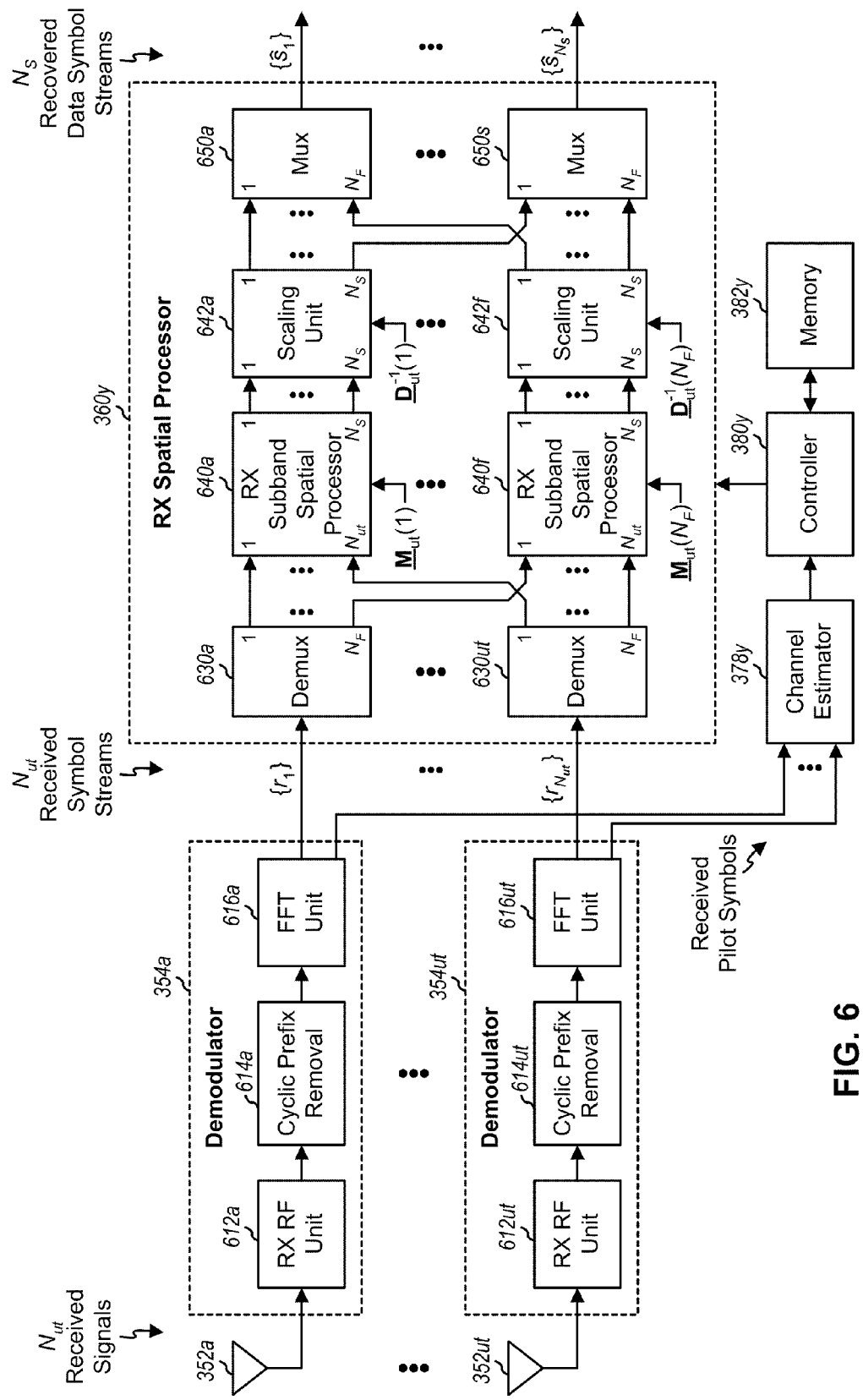
FIG. 6 shows demodulators and a receive (RX) spatial processor at a multi-antenna user terminal.

FIG. 6 shows a block diagram of an embodiment of demodulators 354a through 354ut and RX spatial processor 360y for multi-antenna user terminal 120y. At user terminal 120y, $N_{ut}$ antennas 352a through 352ut receive the $N_{ap}$ modulated signals transmitted by access point 110x and provide $N_{ut}$ received signals to $N_{ut}$ demodulators 354a through 354ut, respectively. Each demodulator 354 includes an RX RF unit 612, a cyclic prefix removal unit 614, and a fast Fourier transform (FFT) unit 616. Units 614 and 616 form an OFDM demodulator. Within each demodulator 354, RX RF unit 612 receives, conditions, and digitizes a respective received signal and provides a stream of chips. Cyclic prefix removal unit 614 removes the cyclic prefix in each received OFDM symbol to obtain a received transformed symbol. FFT unit 616 then transforms each received transformed symbol to the frequency domain with an $N_F$-point fast Fourier transform to obtain $N_F$ received symbols for the $N_F$ subbands. FFT unit 616 provides a stream of received symbols to RX spatial processor 360y and received pilot symbols to channel estimator 378y.

For the embodiment shown in FIG. 6, RX spatial processor 360y includes $N_{ut}$ demultiplexers 630a through 630ut for the $N_{ut}$ antennas at user terminal 120y, $N_F$ RX subband spatial processors 640a through 640f and $N_F$ scaling units 642a through 642f for the $N_F$ subbands, and $N_S$ multiplexers 650a through 650s for the $N_S$ data streams. RX spatial processor 360y obtains $N_{ut}$ received symbol streams $\{r_i\}$, for i=1 ... $N_{ut}$, from demodulators 354a through 354ut. Each demultiplexer 630 receives a respective received symbol stream $\{r_i\}$, demultiplexes the stream into $N_F$ received symbol substreams for the $N_F$ subbands, and provides the $N_F$ substreams to $N_F$ spatial processors 640a through 640f. Each spatial processor 640 obtains $N_{ut}$ received symbol substreams for its subband from $N_{ut}$ demultiplexers 630a through 630ut, performs receiver spatial processing on these substreams, and provides $N_S$ detected symbol substreams for its subband. Each spatial processor 640 multiplies a received vector $\underline{r}_{dn}(k)$ with a matrix $\underline{M}_{ut}(k)$ to obtain a detected symbol vector $\underline{\tilde{s}}_{dn}(k)$. The matrix $\underline{M}_{ut}(k)$ is equal to (1) a matrix $\underline{U}_{dn}^H(k)$ of left eigenvectors of $\underline{H}_{dn}(k)$ for the single-user steered mode or (2) the matrix $\underline{M}_{ccmi}(k)$, $\underline{M}_{mmse}(k)$, or some other matrix for the single-user non-steered mode.

Each scaling unit 642 receives $N_S$ detected symbol substreams for its subband, scales these substreams, and provides $N_S$ recovered data symbol substreams for its subband. Each scaling unit 642 performs the signal scaling of the detected symbol vector $\underline{\tilde{s}}_{dn}(k)$ with a diagonal matrix $\underline{D}_{ut}^{-1}(k)$ and provides the recovered data symbol vector $\underline{\hat{s}}_{dn}(k)$. Each multiplexer 650 receives and multiplexes $N_F$ recovered data symbol substreams for its data stream from $N_F$ scaling units 642a through 642f and provides a recovered data symbol stream. $N_S$ multiplexers 650a through 650s provide $N_S$ recovered data symbol streams $\{\hat{s}_m\}$, for m=1 ... $N_S$.

Figure 7:
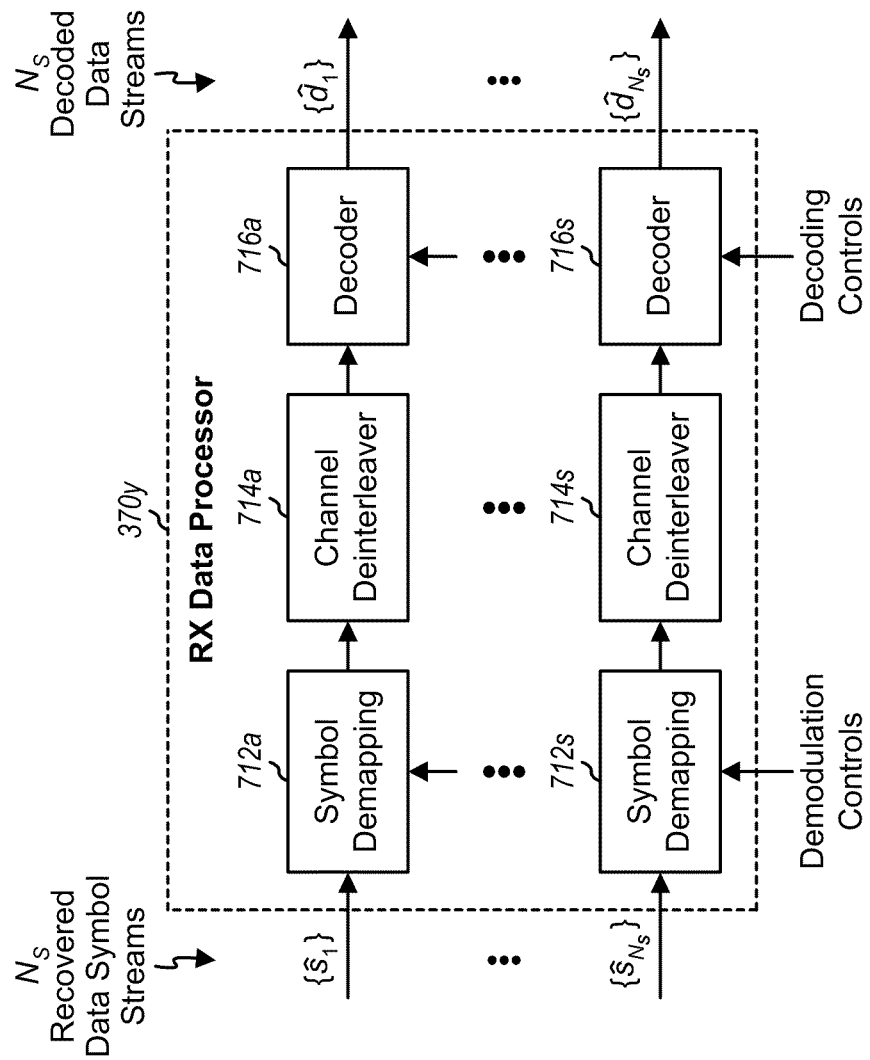
FIG. 7 shows an RX data processor at the multi-antenna user terminal.

FIG. 7 shows a block diagram of an embodiment of RX data processor 370y at user terminal 120y. RX data processor 370y includes one set of symbol demapping unit 712, channel deinterleaver 714, and decoder 716 for each of the $N_S$ data streams. For each recovered data symbol stream $\{\hat{s}_m\}$, where m=1 ... $N_S$, a symbol demapping unit 712 demodulates the recovered data symbols in accordance with the modulation scheme used for that stream and provides demodulated data. A channel deinterleaver 714 deinterleaves the demodulated data in a manner complementary to the interleaving performed on that stream by access point 110x. A decoder 716 then decodes the deinterleaved data in a manner complementary to the encoding performed by access point 110x on that stream. For example, a Turbo decoder or a Viterbi decoder may be used for decoder 716 if Turbo or convolutional coding, respectively, is performed at access point 110x. Decoder 716 provides a decoded packet for each received data packet. Decoder 716 further checks each decoded packet to determine whether the packet is decoded correctly or in error and provides the status of the decoded packet. The demodulation and decoding for each recovered data symbol stream are performed in accordance with demodulation and decoding controls provided by controller 380y.

Figure 8:
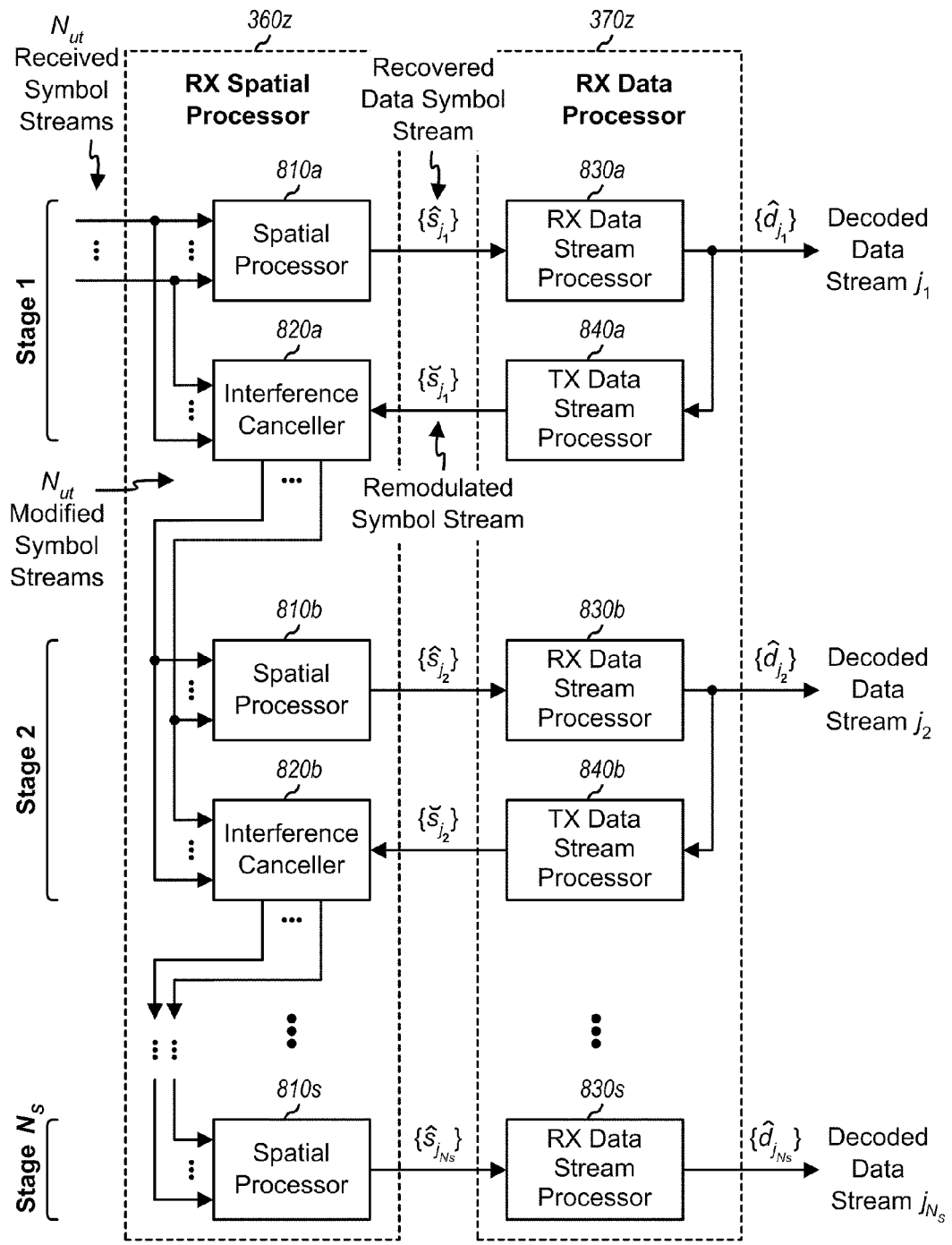
FIG. 8 shows an RX spatial processor and an RX data processor that implement a successive interference cancellation (SIC) technique.

FIG. 8 shows a block diagram of an RX spatial processor 360z and an RX data processor 370z, which implement the SIC technique. RX spatial processor 360z and RX data processor 370z implement $N_S$ successive (i.e., cascaded) receiver processing stages for $N_S$ data symbol streams. Each of stages 1 to $N_S$-1 includes a spatial processor 810, an interference canceller 820, an RX data stream processor 830, and a TX data stream processor 840. The last stage includes only a spatial processor 810s and an RX data stream processor 830s. Each RX data stream processor 830 includes a symbol demapping unit 712, a channel deinterleaver 714, and a decoder 716, as shown in FIG. 7. Each TX data stream processor 840 includes an encoder 412, a channel interleaver 414, and a symbol mapping unit 416, as shown in FIG. 4.

For stage 1, spatial processor 810a performs receiver spatial processing on the $N_{ut}$ received symbol streams and provides one recovered data symbol stream $\{\hat{s}_{j_1}\}$, where the subscript $j_1$ denotes the access point antenna used to transmit the data symbol stream $\{s_{j_1}\}$. RX data stream processor 830a demodulates, deinterleaves, and decodes the recovered data symbol stream $\{\hat{s}_{j_1}\}$ and provides a corresponding decoded data stream $\{\hat{d}_{j_1}\}$. TX data stream processor 840*a* encodes, interleaves, and modulates the decoded data stream $\{\hat{d}_{j_1}\}$ in the same manner performed by access point 110*x* for that stream and provides a remodulated symbol stream $\{\check{s}_{j_1}\}$. Interference canceller 820*a* performs spatial processing on the remodulated symbol stream $\{\check{s}_{j_1}\}$ in the same manner (if any) performed by access point 110*x* and further processes the result with the channel response matrix $\underline{H}_{dn}(k)$ to obtain $N_{ut}$ interference components due to the data symbol stream $\{s_{j_1}\}$. The $N_{ut}$ interference components are subtracted from the $N_{ut}$ received symbol streams to obtain $N_{ut}$ modified symbol streams, which are provided to stage 2.

Each of stages 2 through $N_S-1$ performs the same processing as stage 1, albeit on the $N_{ut}$ modified symbol streams from the preceding stage instead of the $N_{ut}$ received symbol streams. The last stage performs spatial processing and decoding on the $N_{ut}$ modified symbol streams from stage $N_S-1$ and does not perform interference estimation and cancellation.

Spatial processors 810*a* through 810*s* may each implement the CCMI, MMSE, or some other receiver processing technique. Each spatial processor 810 multiplies an input (received or modified) symbol vector $\underline{r}_{dn}^{\ell}(k)$ with a matrix $\underline{M}_{ut}^{\ell}(k)$ to obtain a detected symbol vector $\underline{\tilde{s}}_{dn}^{\ell}(k)$, selects and scales one of the detected symbol streams, and provides the scaled symbol stream as the recovered data symbol stream for that stage. The matrix $\underline{M}_{ut}^{\ell}(k)$ is derived based on a reduced channel response matrix $\underline{H}_{dn}^{\ell}(k)$ for the stage.

The processing units at access point 110*x* and user terminal 120*y* for the uplink may be implemented as described above for the downlink. TX data processor 390*y* and TX spatial processor 392*y* may be implemented with TX data processor 310 in FIG. 4 and TX spatial processor 320 in FIG. 5, respectively. RX spatial processor 340 may be implemented with RX spatial processor 360*y* or 360*z*, and RX data processor 342 may be implemented with data processor 370*y* or 370*z*.

For single-antenna user terminal 120*x*, RX spatial processor 360*x* performs coherent demodulation of one received symbol stream with channel estimates to obtain one recovered data symbol stream.

Channel Estimation

The channel response of the downlink and uplink may be estimated in various manners such as with a MIMO pilot or a steered pilot. For a TDD MIMO system, certain techniques may be used to simplify the channel estimation.

For the downlink, access point 110*x* can transmit a MIMO pilot to user terminals 120. The MIMO pilot comprises $N_{ap}$ pilot transmissions from $N_{ap}$ access point antennas, with the pilot transmission from each antenna being "covered" with a different orthogonal sequence (e.g., a Walsh sequence). Covering is a process whereby a given modulation symbol (or a set of L modulation symbols with the same value) to be transmitted is multiplied by all L chips of an L-chip orthogonal sequence to obtain L covered symbols, which are then transmitted. The covering achieves orthogonality among the $N_{ap}$ pilot transmissions sent from the $N_{ap}$ access point antennas and allows the user terminals to distinguish the pilot transmission from each antenna.

At each user terminal 120, channel estimator 378 "decovers" the received pilot symbols for each user terminal antenna i with the same $N_{ap}$ orthogonal sequences used by access point 110*x* for the $N_{ap}$ antennas to obtain estimates of the complex channel gain between user terminal antenna i and each of the $N_{ap}$ access point antennas. Decovering is complementary to covering and is a process whereby received (pilot) symbols are multiplied by the L chips of the L-chip orthogonal sequence to obtain L decovered symbols, which are then accumulated to obtain an estimate of the transmitted (pilot) symbol. Channel estimator 378 performs the same pilot processing for each subband used for pilot transmission. If pilot symbols are transmitted on only a subset of the $N_F$ subbands, then channel estimator 378 can perform interpolation on the channel response estimates for subbands with pilot transmission to obtain channel response estimates for subbands without pilot transmission. For single-antenna user terminal 120*x*, channel estimator 378*x* provides estimated downlink channel response vectors $\underline{\hat{h}}_{dn}(k)$, for k=1 ... $N_F$, for the single antenna 352. For multi-antenna user terminal 120*y*, channel estimator 378*y* performs the same pilot processing for all $N_{ut}$ antennas 352*a* through 352*ut* and provides estimated downlink channel response matrices $\underline{\hat{H}}_{dn}(k)$, for k=1 ... $N_F$. Each user terminal 120 can also estimate the noise variance for the downlink based on the received pilot symbols and provides the downlink noise estimate, $\hat{\sigma}_{dn}^2$.

For the uplink, multi-antenna user terminal 120*y* can transmit a MIMO pilot that can be used by access point 110*x* to estimate the uplink channel response $\underline{\hat{H}}_{up}(k)$ for user terminal 120*y*. Single-antenna user terminal 120*x* can transmit a pilot from its single antenna. Multiple single-antenna user terminals 120 can transmit orthogonal pilots simultaneously on the uplink, where orthogonality may be achieved in time and/or frequency. Time orthogonality can be obtained by having each user terminal cover its uplink pilot with a different orthogonal sequence assigned to the user terminal Frequency orthogonality can be obtained by having each user terminal transmit its uplink pilot on a different set of subbands. The simultaneous uplink pilot transmissions from multiple user terminals should be approximately time-aligned at access point 120*x* (e.g., time-aligned to within the cyclic prefix).

For a TDD MIMO system, a high degree of correlation normally exists between the channel responses for the downlink and uplink since these links share the same frequency band. However, the responses of the transmit/receive chains at the access point are typically not the same as the responses of the transmit/receive chains at the user terminal. If the differences are determined and accounted for via calibration, then the overall downlink and uplink channel responses may be assumed to be reciprocal (i.e., transpose) of each other.

Figure 9:
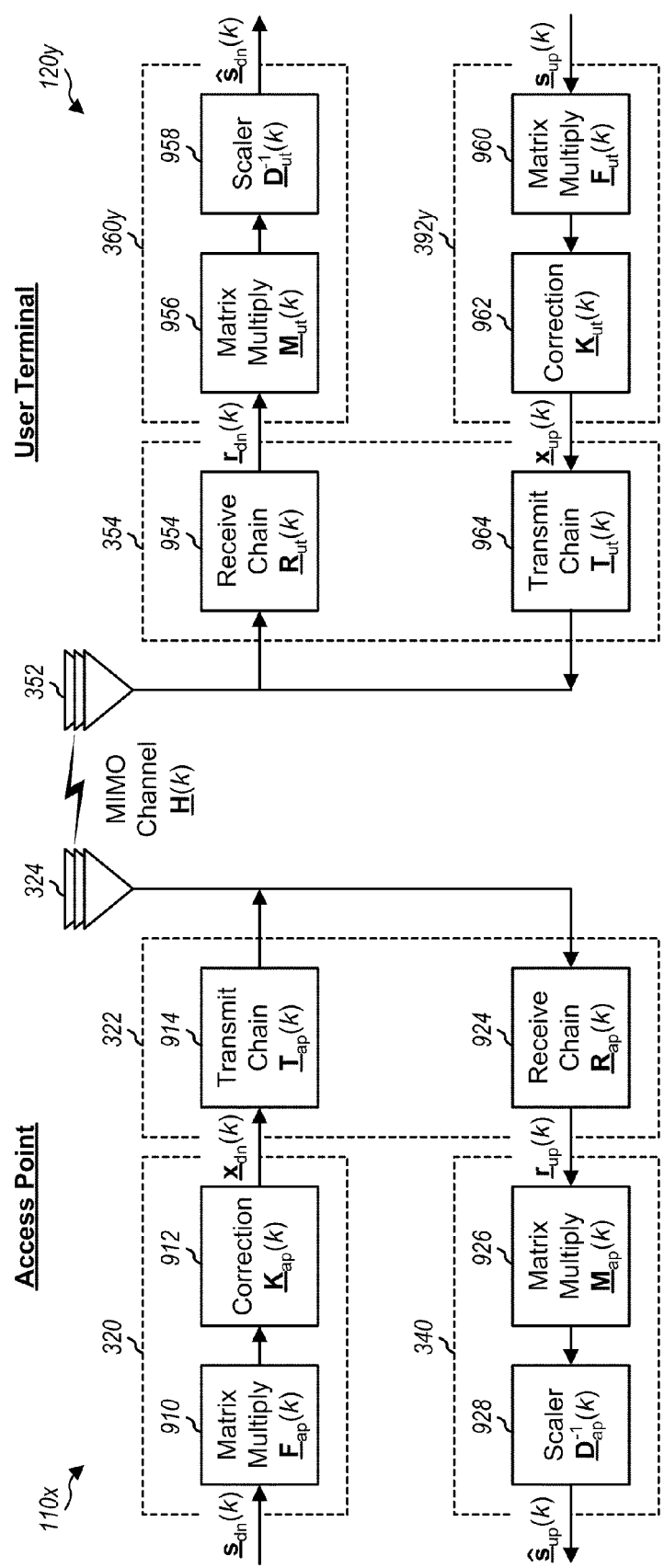
FIG. 9 shows the transmit/receive chains at the access point and user terminal.

FIG. 9 shows the transmit/receive chains at access point 110*x* and user terminal 120*y*. At access point 110*x*, the transmit path is modeled by an $N_{ap} \times N_{ap}$ matrix $\underline{T}_{ap}(k)$ and the receive path is modeled by an $N_{ap} \times N_{ap}$ matrix $\underline{R}_{ap}(k)$. At user terminal 120*y*, the receive path is modeled by an $N_{ut} \times N_{ut}$ matrix $\underline{R}_{ut}(k)$ and the transmit path is modeled by an $N_{ut} \times N_{ut}$ matrix $\underline{T}_{ut}(k)$. The received symbol vectors for the downlink and uplink for each subband may be expressed as:

$$\underline{r}_{dn}(k) = \underline{R}_{ut}(k)\underline{H}(k)\underline{T}_{ap}(k)\underline{x}_{dn}(k), \text{ and}$$

$$\underline{r}_{up}(k) = \underline{R}_{ap}(k)\underline{H}^T(k)\underline{T}_{ut}(k)\underline{x}_{ap}(k), \qquad \text{Eq. (33)}$$

where "$T$" denotes the transpose. Equation (34) assumes that the downlink and uplink are transpose of one another. The "effective" downlink and uplink channel responses, $\underline{H}_{edn}(k)$ and $\underline{H}_{eup}(k)$, for each subband include the responses of the transmit and receive chains and may be expressed as:

$$\underline{H}_{edn}(k) = \underline{R}_{ut}(k)\underline{H}(k)\underline{T}_{ap}(k) \text{ and } \underline{H}_{eup}(k) = \underline{R}_{ap}(k)\underline{H}^T(k)\underline{T}_{ut}(k). \qquad \text{Eq. (34)}$$

The effective downlink and uplink channel responses are not reciprocal of one other (i.e., $\underline{H}_{edn}(k) \neq \underline{H}_{eup}^T(k)$) if the responses of the downlink and uplink transmit/receive chains are not equal to each other.

Access point 110x and user terminal 120y can perform calibration to obtain correction matrices $\underline{K}_{ap}(k)$ and $\underline{K}_{ut}(k)$ for each subband, which may be expressed as:

$$\underline{K}_{ap}(k) = \underline{T}_{ap}^{-1}(k)\underline{R}_{ap}(k) \text{ and } \underline{K}_{ut}(k) = \underline{T}_{ut}^{-1}(k)\underline{R}_{ut}(k). \quad \text{Eq. (35)}$$

The correction matrices may be obtained by transmitting MIMO pilots on both the downlink and uplink and deriving the correction matrices using MMSE criterion or some other techniques. The correction matrices $\underline{K}_{ap}(k)$ and $\underline{K}_{ut}(k)$ are applied at access point 110x and user terminal 120y, respectively, as shown in FIG. 9. The "calibrated" downlink and uplink channel responses, $\underline{H}_{cdn}(k)$ and $\underline{H}_{cup}(k)$, are then reciprocal of one another and may be expressed as:

$$\underline{H}_{cup}(k) = \underline{H}_{up}(k)\underline{K}_{ut}(k) = (\underline{H}_{dn}(k)\underline{K}_{ap}(k))^T = \underline{H}_{cdn}^T(k). \quad \text{Eq. (36)}$$

The singular value decomposition of the calibrated uplink and downlink channel response matrices, $\underline{H}_{cup}(k)$ and $\underline{H}_{cdn}(k)$, for each subband may be expressed as:

$$\underline{H}_{cup}(k) = \underline{U}_{ap}(k)\underline{\Sigma}(k)\underline{V}_{ut}^H(k), \text{ and}$$

$$\underline{H}_{cda}(k) = \underline{V}_{ut}^*(k)\underline{\Sigma}(k)\underline{U}_{ap}^H(k). \quad \text{Eq. (37)}$$

As shown in equation set (38), the matrices $\underline{V}_{ut}^*(k)$ and $\underline{U}_{ap}^*(k)$ of left and right eigenvectors of $\underline{H}_{cdn}(k)$ are the complex conjugate of the matrices $\underline{V}_{ut}(k)$ and $\underline{U}_{ap}(k)$ of right and left eigenvectors of $\underline{H}_{cup}(k)$. The matrix $\underline{U}_{ap}(k)$ can be used by access point 110x for both transmit and receive spatial processing. The matrix $\underline{V}_{ut}(k)$ can be used by user terminal 120y for both transmit and receive spatial processing.

Because of the reciprocal nature of the MIMO channel for the TDD MIMO system, and after calibration has been performed to account for the differences in the transmit/receive chains, the singular value decomposition only needs to be performed by either user terminal 120y or access point 110x. If performed by user terminal 120y, then the matrices $\underline{V}_{ut}(k)$, for k=1 ... $N_F$, are used for spatial processing at the user terminal and the matrix $\underline{U}_{ap}(k)$, for k=1 ... $N_F$, may be provided to the access point in either a direct form (e.g., by sending entries of the matrices $\underline{U}_{ap}(k)$) or an indirect form (e.g., via a steered pilot). In actuality, user terminal 120y can only obtain $\hat{\underline{H}}_{cdn}(k)$, which is an estimate of $\underline{H}_{cdn}(k)$, and can only derive $\hat{\underline{V}}_{ut}(k)$, $\hat{\underline{\Sigma}}(k)$ and $\hat{\underline{U}}_{ap}(k)$, which are estimates of $\underline{V}_{ut}(k)$, $\underline{\Sigma}(k)$ and $\underline{U}_{ap}(k)$, respectively. For simplicity, the description herein assumes channel estimation without errors.

An uplink steered pilot sent by user terminal 120y may be expressed as:

$$\underline{x}_{up,m}(k) = \underline{K}_{ut}(k)\underline{v}_{ut,m}(k)p(k), \quad \text{Eq. (38)}$$

where $\underline{v}_{up,m}(k)$ is the m-th column of $\underline{V}_{ut}(k)$ and p(k) is the pilot symbol. The received uplink steered pilot at access point 110x may be expressed as:

$$\underline{r}_{up,m}(k) = \underline{u}_{ap,m}(k)\sigma_m p(k) + \underline{n}_{up}(k). \quad \text{Eq. (39)}$$

Equation (40) indicates that access point 110x can obtain the matrix $\underline{U}_{ap}(k)$, one vector at a time, based on the uplink steered pilot from user terminal 120y.

A complementary process may also be performed whereby user terminal 120y transmits a MIMO pilot on the uplink, and access point 110x performs singular value decomposition and transmits a steered pilot on the downlink. Channel estimation for the downlink and uplink may also be performed in other manners.

At each user terminal 120, channel estimator 378 can estimate the downlink channel response (e.g., based on a MIMO pilot or a steered pilot sent by access point 110x) and provide downlink channel estimates to controller 380. For single-antenna user terminal 120x, controller 380x can derive the complex channel gains used for coherent demodulation. For multi-antenna user terminal 120y, controller 380y can derive the matrix $\underline{M}_{ut}(k)$ used for receive spatial processing and the matrix $\underline{F}_{ut}(k)$ used for transmit spatial processing based on the downlink channel estimates. At access point 110x, channel estimator 328 can estimate the uplink channel response (e.g., based on a steered pilot or a MIMO pilot sent by user terminal 120) and provide uplink channel estimates to controller 380. Controller 380 can derive the matrix $\underline{F}_{ap}(k)$ used for transmit spatial processing and the matrix $\underline{M}_{ap}(k)$ used for receive spatial processing based on the uplink channel estimates.

FIG. 9 shows the spatial processing at access point 110x and user terminal 120y for the downlink and uplink for one subband k. For the downlink, within TX spatial processor 320 at access point 110x, the data vector $\underline{s}_{dn}(k)$ is first multiplied with the matrix $\underline{F}_{ap}(k)$ by a unit 910 and further multiplied with the correction matrix $\underline{K}_{ap}(k)$ by a unit 912 to obtain the transmit vector $\underline{x}_{dn}(k)$. The vector $\underline{x}_{dn}(k)$ is processed by a transmit chain 914 within modulators 322 and transmitted over the MIMO channel to user terminal 120y. Units 910 and 912 perform the transmit spatial processing for the downlink and may be implemented within TX subband spatial processor 520 in FIG. 5.

At user terminal 120y, the downlink signals are processed by a receive chain 954 within demodulators 354 to obtain the receive vector $\underline{r}_{dn}(k)$. Within RX spatial processor 360y, the receive vector $\underline{r}_{dn}(k)$ is first multiplied with the matrix $\underline{M}_{ut}(k)$ by a unit 956 and further scaled with the inverse diagonal matrix $\underline{D}_{ut}^{-1}(k)$ by a unit 958 to obtain the vector $\hat{\underline{s}}_{dn}(k)$, which is an estimate of the data vector $\underline{s}_{dn}(k)$. Units 956 and 958 perform the receive spatial processing for the downlink and may be implemented within RX subband spatial processor 640 in FIG. 6.

For the uplink, within TX spatial processor 392y at user terminal 120y, the data vector $\underline{s}_{up}(k)$ is first multiplied with the matrix $\underline{F}_{ut}(k)$ by a unit 960 and further multiplied with the correction matrix $\underline{K}_{ut}(k)$ by a unit 962 to obtain the transmit vector $\underline{x}_{up}(k)$. The vector $\underline{x}_{up}(k)$ is processed by a transmit chain 964 within modulators 354 and transmitted over the MIMO channel to access point 110x. Units 960 and 962 perform the transmit spatial processing for the uplink.

At access point 110x, the uplink signals are processed by a receive chain 924 within demodulators 322 to obtain the receive vector $\underline{r}_{up}(k)$. Within RX spatial processor 340, the receive vector $\underline{r}_{up}(k)$ is first multiplied with the matrix $\underline{M}_{ap}(k)$ by a unit 926 and further scaled with the inverse diagonal matrix $\underline{D}_{ap}^{-1}(k)$ by a unit 928 to obtain the vector $\hat{\underline{s}}_{up}(k)$, which is an estimate of the data vector $\underline{s}_{up}(k)$. Units 926 and 928 perform the receive spatial processing for the uplink.

Spatial Processing for TDD MIMO System

Table 3 summarizes exemplary pilot transmission and spatial processing performed by the access point and the user terminals for data transmission on the downlink and uplink for various spatial multiplexing modes in the TDD MIMO system. For the single-user steered mode, the access point transmits a MIMO pilot to allow the user terminal to estimate the downlink channel response. The user terminal transmits a steered pilot to allow the access point to estimate the uplink channel response. The access point performs transmit and receive spatial processing with $\underline{U}_{ap}(k)$. The user terminal performs transmit and receive spatial processing with $\underline{V}_{ut}(k)$.

For the single-user non-steered mode, for downlink data transmission, the access point transmits a MIMO pilot from all antennas and a data symbol stream from each antenna. The user terminal estimates the downlink channel response with the MIMO pilot and performs receiver spatial processing using the downlink channel estimates. The complementary processing occurs for uplink data transmission.

TABLE 3

| Spatial Multiplexing Mode | Downlink Data Transmission | Uplink Data Transmission |
|---|---|---|
| Single-User Steered | AP transmits MIMO pilot<br>UT transmits steered pilot<br>AP transmits data with $U_{ap}(k)$<br>UT receives data with $V_{ut}(k)$ | AP transmits MIMO pilot<br>UT transmits steered pilot<br>UT transmits data with $V_{ut}(k)$<br>AP receives data with $U_{ap}(k)$ |
| Single-User Non-Steered | AP transmits MIMO pilot<br>AP transmits data from each antenna<br>UT uses CCMI, MMSE, etc. | UT transmits MIMO pilot<br>UT transmits data from each antenna<br>AP uses CCMI, MMSE, etc. |
| Multi-User Steered | UTs transmit orthogonal pilot<br>AP transmits steered data<br>AP transmits steered pilot<br>UTs receive with steered pilot | AP transmits MIMO pilot<br>UTs transmit steered pilot<br>UTs transmit steered data<br>AP uses CCMI, MMSE, etc. |
| Multi-User Non-Steered | AP transmits MIMO pilot<br>UTs send rate for each AP antenna<br>AP transmits data from each antenna<br>UTs use CCMI, MMSE, etc. | UTs transmit orthogonal pilot<br>AP selects compatible UTs<br>UTs transmits data from each antenna AP uses CCMI, MMSE, etc. |

For the multi-user steered mode, for downlink data transmission to single-antenna and/or multi-antenna user terminals, the user terminals transmit orthogonal pilots on the uplink to allow the access point to estimate the downlink channel response. A single-antenna user terminal transmits an unsteered pilot, and a multi-antenna user terminal transmits a steered pilot. The access point derives downlink steering vectors based on the orthogonal uplink pilots, and uses the steering vectors to transmit steered pilots and steered data symbol streams to the selected user terminals. Each user terminal uses the steered pilot to receive the steered data symbol stream sent to the user terminal. For uplink data transmission from multi-antenna user terminals, the access point transmits a MIMO pilot. Each multi-antenna user terminal transmits a steered pilot and a steered data symbol stream on the uplink. The access point performs receiver spatial processing (e.g., CCMI, MMSE, and so on) to recover the data symbol streams.

For the multi-user non-steered mode, for downlink data transmission to multi-antenna user terminals, the access point transmits a MIMO pilot on the downlink. Each user terminal determines and sends back the rate it can receive from each access point antenna. The access point selects a set of user terminals and transmits data symbol streams for the selected user terminals from the access point antennas. Each multi-antenna user terminal performs receiver spatial processing (e.g., CCMI, MMSE, and so on) to recover its data symbol stream. For uplink data transmission from single-antenna and/or multi-antenna user terminals, the user terminals transmit orthogonal (unsteered) pilots on the uplink. The access point estimates the uplink channel response based on the uplink pilots and selects a set of compatible user terminals. Each selected user terminal transmits a data symbol stream from a user terminal antenna. The access point performs receiver spatial processing (e.g., CCMI, MMSE, and so on) to recover the data symbol streams.

Rate Selection

Each data stream for the downlink and uplink is transmitted on a wideband spatial channel m using one of the spatial multiplexing modes. Each data stream is also transmitted at a rate that is selected such that the target level of performance (e.g., 1 percent packet error rate (PER)) can be achieved for that stream. The rate for each data stream can be determined based on the SNR achieved at the receiver for that stream (i.e., the received SNR), where the SNR is dependent on the spatial processing performed at the transmitter and receiver, as described above.

In an exemplary rate selection scheme, the determine the rate for wideband spatial channel m, an SNR estimate, $\gamma_m(k)$, (e.g., in units of dB) for each subband k of the wideband spatial channel is first obtained, as described above. An average SNR, $\gamma_{avg}$, is then computed for wideband spatial channel m, as follows:

$$\gamma_{avg,m} = \frac{1}{N_F} \sum_{k=1}^{N_F} \gamma_m(k). \qquad \text{Eq. (40)}$$

The variance of the SNR estimates, $\sigma_{\gamma_m}^2$, is also computed as follows:

$$\sigma_{\gamma_m}^2 = \frac{1}{N_F - 1} \sum_{k=1}^{N_F} (\gamma_m(k) - \gamma_{avg,m})^2. \qquad \text{Eq. (41)}$$

An SNR back-off factor, $\gamma_{bo,m}$, is determined based on a function $F(\gamma_{avg,m}, \sigma_{\gamma_m}^2)$ of the average SNR and the SNR variance. For example, the function $F(\gamma_{avg,m}, \sigma_{\gamma_m}^2) = K_b \cdot \sigma_{\gamma_m}^2$ may be used, where $K_b$ is a scaling factor that may be selected based on one or more characteristics of the MIMO system such as the interleaving, packet size, and/or coding scheme used for the data stream. The SNR back-off factor accounts for variation in SNRs across the wideband spatial channel. An operating SNR, $\gamma_{op,m}$, for wideband spatial channel m is next computed, as follows:

$$\gamma_{op,m} = \gamma_{avg,m} - \gamma_{bo,m}. \qquad \text{Eq. (42)}$$

The rate for the data stream is then determined based on the operating SNR. For example, a look-up table (LUT) may store a set of rates supported by the MIMO system and their required SNRs. The required SNR for each rate may be determined by computer simulation, empirical measurement, and so on, and based on an assumption of an AWGN channel. The highest rate in the look-up table with a required SNR that is equal to or lower than the operating SNR is selected as the rate for the data stream sent on wideband spatial channel m.

Various other rate selection schemes may also be used.

Closed-Loop Rate Control

Closed-loop rate control may be used for each of the data streams transmitted on multiple wideband spatial channels. Closed-loop rate control may be achieved with one or multiple loops.

Figure 10:
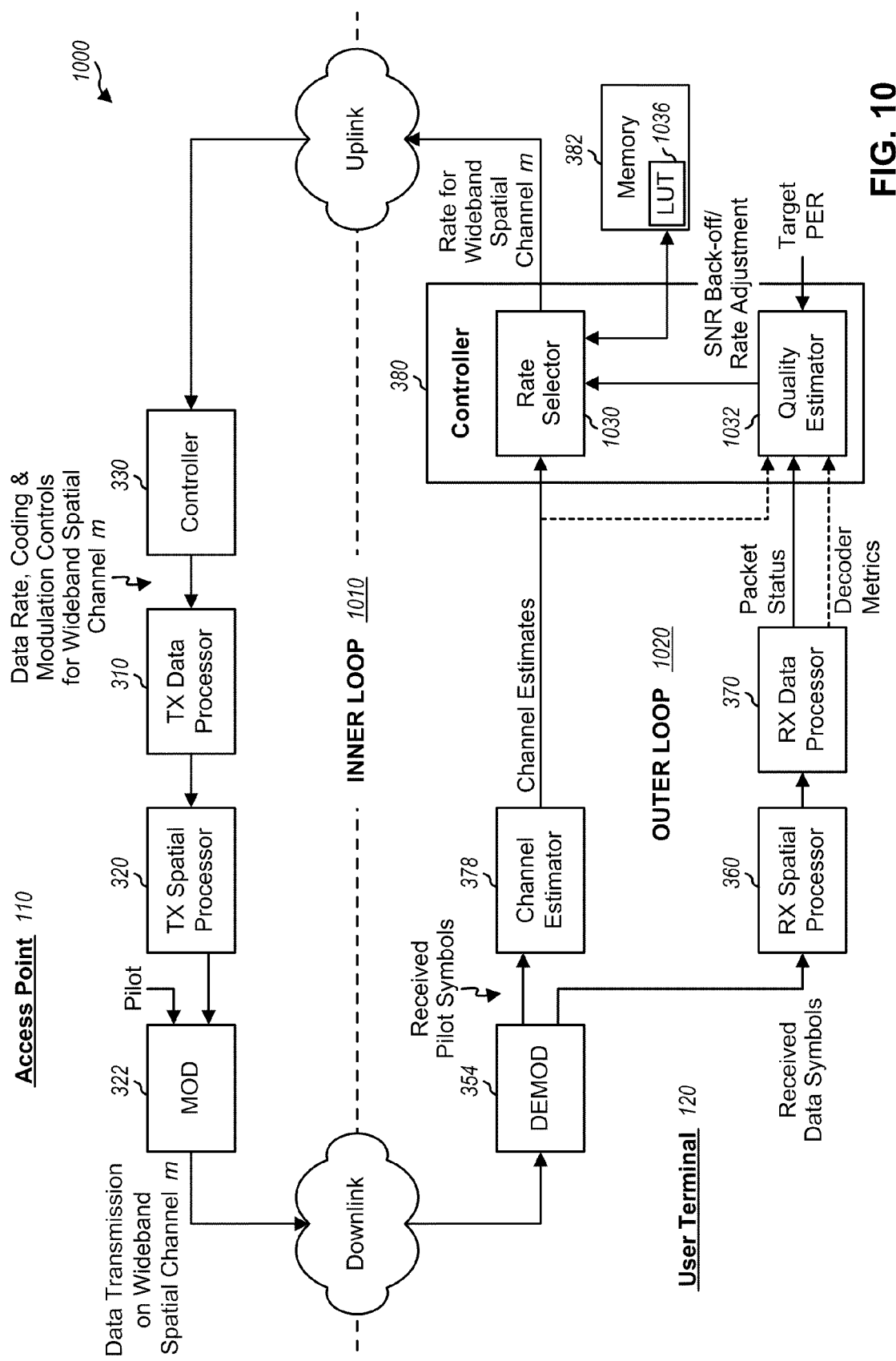
FIG. 10 shows a closed-loop rate control mechanism.

FIG. 10 shows a block diagram of an embodiment of a closed-loop rate control mechanism 1000, which comprises an inner loop 1010 that operates in conjunction with an outer loop 1020. Inner loop 1010 estimates the channel conditions and determines the rate supported by each wideband spatial channel. Outer loop 1020 estimates the quality of the data transmission received on each wideband spatial channel and adjusts the operation of the inner loop accordingly. For simplicity, the operation of loops 1010 and 1020 for one downlink wideband spatial channel m is shown in FIG. 10 and described below.

For inner loop 1010, channel estimator 378 at user terminal 120 estimates wideband spatial channel m and provides channel estimates (e.g., channel gain estimates and noise variance estimate). A rate selector 1030 within controller 380 determines the rate supported by wideband spatial channel m based on (1) the channel estimates from channel estimator 378, (2) an SNR back-off factor and/or a rate adjustment for wideband spatial channel m from a quality estimator 1032, and (3) a look-up table (LUT) 1036 of rates supported by the MIMO system and their required SNRs. The supported rate for wideband spatial channel m is sent by controller 380 to access point 110. At access point 110, controller 330 receives the supported rate for wideband spatial channel m and determines the data rate, coding, and modulation controls for the data stream to be sent on this spatial channel. The data stream is then processed in accordance with these controls by TX data processor 310, spatially processed and multiplexed with pilot symbols by TX spatial processor 320, conditioned by modulators 322, and transmitted to user terminal 120.

Outer loop 1020 estimates the quality of the decoded data steam received on wideband spatial channel m and adjusts the operation of inner loop 1010. The received symbols for wideband spatial channel m are spatially processed by RX spatial processor 360 and further processed by RX data processor 370. RX data processor 370 provides the status of each packet received on wideband spatial channel m and/or decoder metrics to quality estimator 1032. Outer loop 1020 can provide different types of information (e.g., SNR back-off factor, a rate adjustment, and so on) used to control the operation of inner loop 1010.

Closed-loop rate control described above may thus be performed independently for each downlink and uplink wideband spatial channel, which can correspond to (1) a wideband eigenmode, for the single-user steered mode, or (2) a transmit antenna, for the single-user and multi-user non-steered modes.

Scheduling User Terminals

Figure 11:
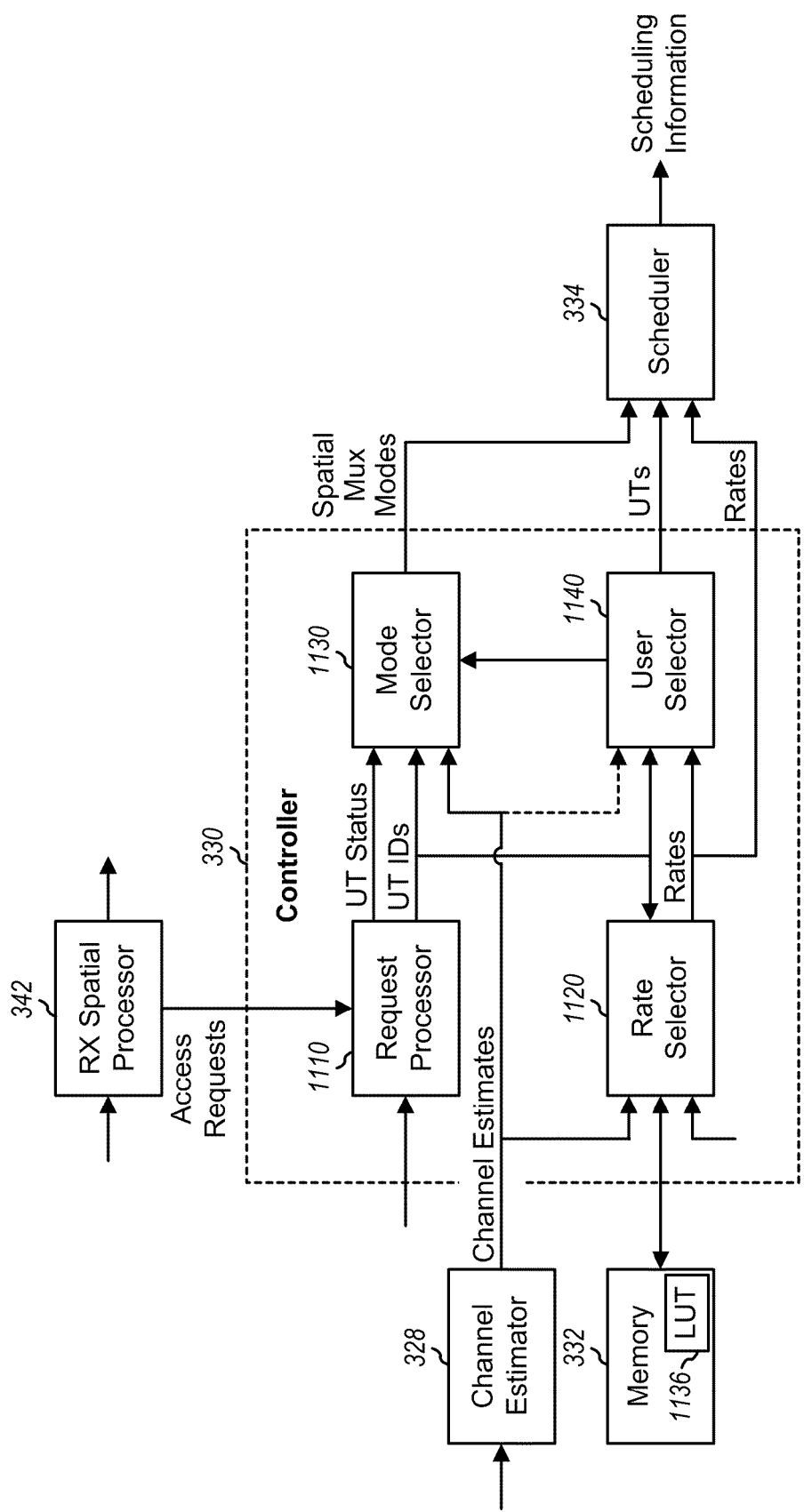
FIG. 11 shows a controller and a scheduler for scheduling user terminals.

FIG. 11 shows a block diagram of an embodiment of controller 330 and scheduler 334 for scheduling user terminals for data transmission on the downlink and uplink. Within controller 330, a request processor 1110 receives access requests transmitted by user terminal 120 on the RACH and possibly access requests from other sources. These access requests are for data transmission on the downlink and/or uplink. Request processor 1110 processes the received access requests and provides the identities (IDs) and the status of all requesting user terminals. The status for a user terminal may indicate the number of antennas available at the terminal, whether the terminal is calibrated, and so on.

A rate selector 1120 receives channel estimates from channel estimator 328 and determines the rates supported by the downlink and/or uplink wideband spatial channels for the requesting user terminals, as described above. For the downlink, each user terminal 120 can determine the rate supported by each of its wideband spatial channels, as described above. The supported rate is the maximum rate that may be used for data transmission on the wideband spatial channel to achieve the target level of performance. Each user terminal 120 can send the supported rates for all of its downlink wideband spatial channels to access point 110, e.g., via the RACH. Alternatively, access point 110 can determine the supported rates for the downlink wideband spatial channels if (1) the downlink and uplink are reciprocal and (2) access point 110 is provided with the noise variance or noise floor at user terminal 120. For the uplink, access point 110 can determine the supported rate for each wideband spatial channel for each requesting user terminal 120.

A user selector 1140 selects different sets of one or more user terminals, from among all of the requesting user terminals, for possible data transmission on the downlink and/or uplink. The user terminals may be selected based on various criteria such as system requirements, user terminal capabilities and supported rates, user priority, the amount of data to send, and so on. For the multi-user spatial multiplexing modes, the user terminals for each set may also be selected based on their channel response vectors.

A mode selector 1130 selects the particular spatial multiplexing mode to use for each set of user terminals based on the operating state and capabilities of the user terminals in the set and possibly other factors. For example, the single-user steered mode may be used for a "calibrated" multi-antenna user terminal that has performed calibration so that the channel response for one link (e.g., downlink) can be estimated based on a (e.g., steered) pilot received via the other link (e.g., uplink). The single-user non-steered mode may be used for an "uncalibrated" multi-antenna user terminal that has not performed calibration or cannot support the single-user steered mode for any reason. The multi-user steered mode may be used for downlink transmission to multiple user terminals, each of which is equipped with one or more antennas. The multi-user non-steered mode may be used for uplink transmission by multiple user terminals.

Scheduler 334 receives the sets of user terminals from user selector 1140, the selected spatial multiplexing mode for each user terminal set from mode selector 1130, and the selected rates for each user terminal set from rate selector 1120. Scheduler 334 schedules the user terminals for data transmission on the downlink and/or uplink. Scheduler 334 selects one or more sets of user terminals for data transmission on the downlink and one or more sets of user terminals for data transmission on the uplink for each TDD frame. Each set includes one or more user terminals and is scheduled for data transmission concurrently in a designated transmission interval within the TDD frame.

Scheduler 334 forms an information element (IE) for each user terminal scheduled for data transmission on the downlink and/or uplink. Each information element includes (1) the spatial multiplexing mode to use for data transmission, (2) the rate to use for the data stream sent on each wideband spatial channel, (3) the start and the duration of the data transmission, and (4) possibly other information (e.g., the type of pilot being transmitted along with the data transmission). Scheduler 334 sends the information elements for all scheduled user terminals via the FCCH. Each user terminal processes the FCCH to recover its information element, and thereafter receives a downlink transmission and/or sends an uplink transmission in accordance with the received scheduling information.

FIG. 11 shows an embodiment of the scheduling of user terminals for data transmission when multiple spatial multiplexing modes are supported. The scheduling may be performed in other manners, and this is within the scope of the invention.

Figure 12:
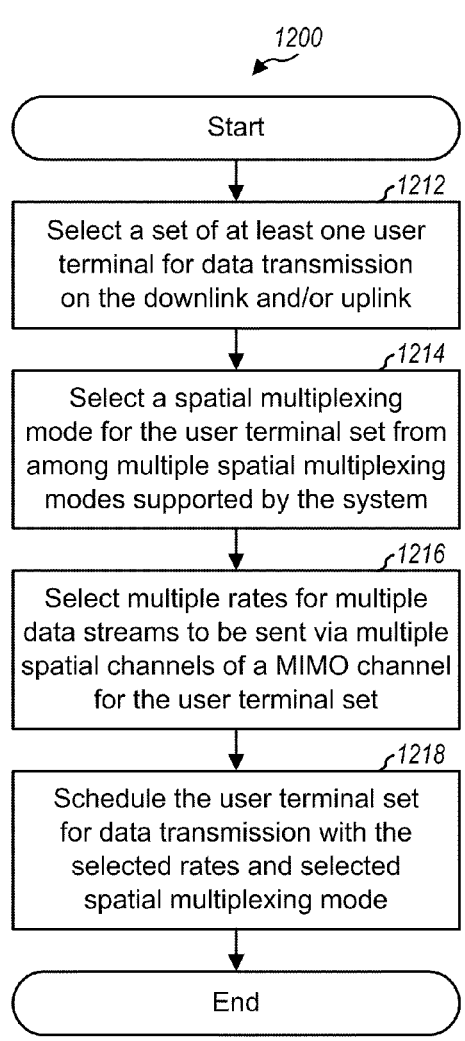
FIG. 12 shows a process for scheduling user terminals for data transmission.

FIG. 12 shows a flow diagram of a process 1200 for scheduling user terminals for data transmission in MIMO system 100. A set of least one user terminal is selected for data transmission on the downlink and/or uplink (block 1212). A spatial multiplexing mode is selected for the user terminal set from among multiple spatial multiplexing modes supported by the system (block 1214). Multiple rates are also selected for multiple data streams to be transmitted via multiple spatial channels for the user terminal set (block 1216). The user terminal set is scheduled for data transmission on the downlink and/or uplink with the selected rates and the selected spatial multiplexing mode (block 1218).

Figure 13:
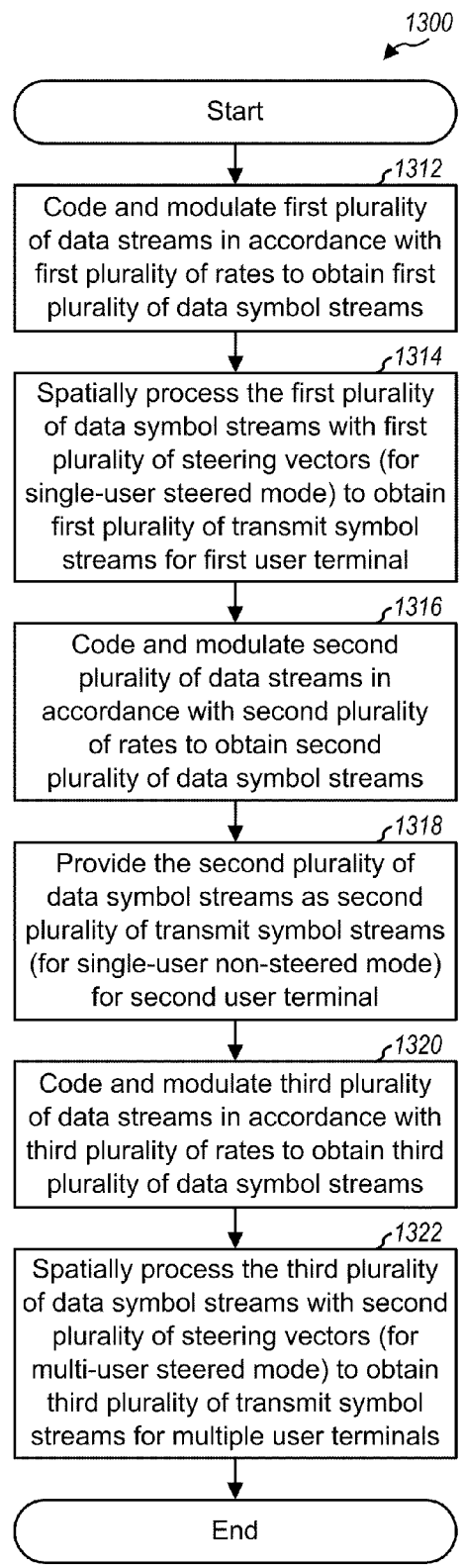
FIG. 13 shows a process for transmitting data on the downlink.

FIG. 13 shows a flow diagram of a process 1300 for transmitting data on the downlink in MIMO system 100. Process 1300 may be performed by access point 110x. A first plurality of data streams are coded and modulated in accordance with a first plurality of rates to obtain a first plurality of data symbol streams (block 1312). For the single-user steered mode, the first plurality of data symbol streams are spatially processed with a first plurality of steering vectors to obtain a first plurality of transmit symbol streams for transmission from multiple antennas to a first user terminal in a first transmission interval (block 1314). The first plurality of steering vectors are derived such that the first plurality of data streams are transmitted on orthogonal spatial channels to the first user terminal. A second plurality of data streams are coded and modulated in accordance with a second plurality of rates to obtain a second plurality of data symbol streams (block 1316). For the single-user non-steered mode, the second plurality of data symbol streams are provided as a second plurality of transmit symbol streams for transmission from the multiple antennas to a second user terminal in a second transmission interval (block 1318). A third plurality of data streams are coded and modulated to obtain a third plurality of data symbol streams (block 1320). For the multi-user steered mode, the third plurality of data symbol streams are spatially processed with a second plurality of steering vectors to obtain a third plurality of transmit symbol streams for transmission from the multiple antennas to multiple user terminals in a third transmission interval (block 1322). The second plurality of steering vectors are derived such that the third plurality of data symbol streams are received with suppressed crosstalk at the multiple user terminals.

Figure 14:
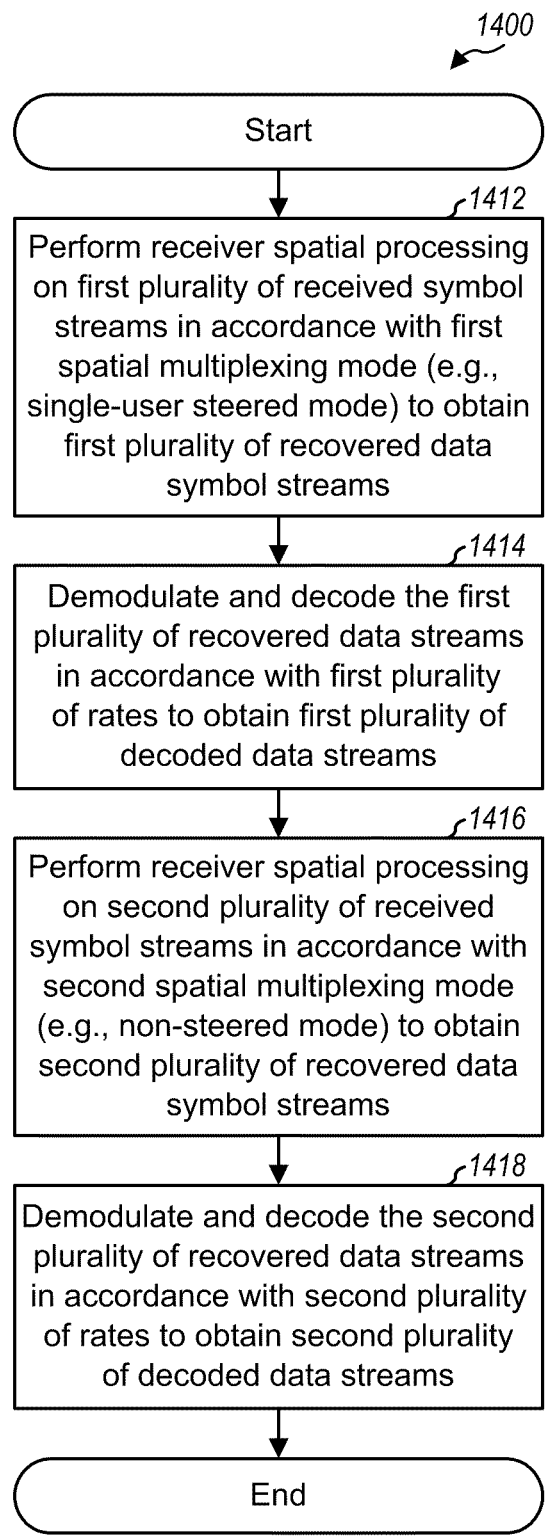
FIG. 14 shows a process for receiving data on the uplink.

FIG. 14 shows a flow diagram of a process 1400 for receiving data on the uplink in MIMO system 100. Process 1400 may also be performed by access point 110x. Receiver spatial processing is performed on a first plurality of received symbol streams in accordance with a first spatial multiplexing mode (e.g., the single-user steered mode) to obtain a first plurality of recovered data symbol streams (block 1412). The first plurality of recovered data symbol streams are demodulated and decoded in accordance with a first plurality of rates to obtain a first plurality of decoded data streams (block 1414). Receiver spatial processing is performed on a second plurality of received symbol streams in accordance with a second spatial multiplexing mode (e.g., a non-steered mode) to obtain a second plurality of recovered data symbol streams (block 1416). The second plurality of recovered data symbol streams are demodulated and decoded in accordance with a second plurality of rates to obtain a second plurality of decoded data streams, which are estimates of data streams transmitted by one or multiple user terminals (block 1418).

Each user terminal performs corresponding processes to transmit data on one or multiple uplink wideband spatial channels and to receive data on one or multiple downlink wideband spatial channels.

Data transmission with multiple spatial multiplexing modes, as described herein, may be implemented by various means. For example, the processing may be implemented in hardware, software, or a combination thereof. For a hardware implementation, the processing units used to perform data processing, spatial processing, and scheduling at the access point may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units at a user terminal may also be implemented on one or more ASICs, DSPs, and so on.

For a software implementation, the processing at the access point and user terminal for data transmission with multiple spatial multiplexing modes may be implemented with modules (e.g., procedures, functions, and so on) that perform the functions described herein. The software codes may be stored in a memory unit (e.g., memory unit 332 or 382 in FIG. 3) and executed by a processor (e.g., controller 330 or 380). The memory unit may be implemented within the processor or external to the processor.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting data in a wireless multiple-input multiple-output (MIMO) communication system, comprising:

selecting a spatial multiplexing mode to use for data transmission from among a plurality of spatial multiplexing modes supported by the system based on whether a user terminal has performed calibration so that the user terminal can estimate a channel response for a downlink based on a pilot received via an uplink, the plurality of spatial multiplexing modes comprising at least one steered spatial multiplexing mode and a non-steered spatial multiplexing mode, wherein the steered spatial multiplexing mode includes spatial processing using eigenvectors of a channel response matrix for at least one subband;

coding and modulating a plurality of data streams in accordance with a plurality of rates to obtain a plurality of data symbol streams; and using the spatial multiplexing mode, processing the plurality of data symbol streams to obtain a plurality of transmit symbol streams for transmission from a plurality of antennas.

2. The method of claim 1, wherein the selected spatial multiplexing mode is a steered spatial multiplexing mode, and wherein the plurality of data symbol streams are spatially processed with a plurality of steering vectors to transmit the plurality of data symbol streams on a plurality of orthogonal spatial channels of a MIMO channel.

3. The method of claim 2, further comprising: transmitting a steered pilot on each of the plurality of orthogonal spatial channels.

4. The method of claim 1, wherein the plurality of data symbol streams are provided as the plurality of transmit symbol streams.

5. The method of claim 1, further comprising: performing calibration so that uplink channel response is reciprocal of downlink channel response.

6. The method of claim 1, wherein:
each of the plurality of rates is selected from among a set of rates supported by the system.

7. An apparatus in a wireless multiple-input multiple-output (MIMO) communication system, comprising:
a controller operative to select a spatial multiplexing mode to use for data transmission from among a plurality of spatial multiplexing modes supported by the system based on whether a user terminal has performed calibration so that the user terminal can estimate a channel response for a downlink based on a pilot received via an uplink, the plurality of spatial multiplexing modes comprising at least one steered spatial multiplexing mode and a non-steered spatial multiplexing mode, wherein the steered spatial multiplexing mode includes spatial processing using eigenvectors of a channel response matrix for at least one subband;
a transmit data processor operative to code and modulate a plurality of data streams in accordance with a plurality of rates to obtain a plurality of data symbol streams; and
a transmit spatial processor operative to, using the spatial multiplexing mode, process the plurality of data symbol streams to obtain a plurality of transmit symbol streams for transmission from a plurality of antennas.

8. The apparatus of claim 7, wherein the selected spatial multiplexing mode is a steered spatial multiplexing mode, and wherein the plurality of data symbol streams are spatially processed with a plurality of steering vectors to transmit the plurality of data symbol streams on a plurality of orthogonal spatial channels of a MIMO channel.

9. The apparatus of claim 8, further comprising: a transmitter operative to transmit a steered pilot on each of the plurality of orthogonal spatial channels.

10. The apparatus of claim 7, wherein the plurality of data symbol streams are provided as the plurality of transmit symbol streams.

11. The apparatus of claim 7, further comprising: a calibrator operative to perform calibration so that uplink channel response is reciprocal of downlink channel response.

12. The apparatus of claim 7, wherein:
each of the plurality of rates is selected from among a set of rates supported by the system.

13. An apparatus of transmitting data in a wireless multiple-input multiple-output (MIMO) communication system, comprising:
means for selecting a spatial multiplexing mode to use for data transmission from among a plurality of spatial multiplexing modes supported by the system based on whether a user terminal has performed calibration so that the user terminal can estimate a channel response for a downlink based on a pilot received via an uplink, the plurality of spatial multiplexing modes comprising at least one steered spatial multiplexing mode and a non-steered spatial multiplexing mode, wherein the steered spatial multiplexing mode includes spatial processing using eigenvectors of a channel response matrix for at least one subband;
means for coding and modulating a plurality of data streams in accordance with a plurality of rates to obtain a plurality of data symbol streams; and
means for processing, using the spatial multiplexing mode, the plurality of data symbol streams to obtain a plurality of transmit symbol streams for transmission from a plurality of antennas.

14. The apparatus of claim 13, wherein the selected spatial multiplexing mode is a steered spatial multiplexing mode, and wherein the plurality of data symbol streams are spatially processed with a plurality of steering vectors to transmit the plurality of data symbol streams on a plurality of orthogonal spatial channels of a MIMO channel.

15. The apparatus of claim 14, further comprising: means for transmitting a steered pilot on each of the plurality of orthogonal spatial channels.

16. The apparatus of claim 13, wherein the plurality of data symbol streams are provided as the plurality of transmit symbol streams.

17. The apparatus of claim 13, further comprising: means for performing calibration so that uplink channel response is reciprocal of downlink channel response.

18. The apparatus of claim 13, wherein:
each of the plurality of rates is selected from among a set of rates supported by the system.

19. A non-transitory computer-readable medium for transmitting data in a wireless multiple-input multiple-output (MIMO) communication system, the computer-readable medium having a set of instructions stored thereon, the set of instructions being executable by one or more processors and the set of instructions comprising:
instructions for selecting a spatial multiplexing mode to use for data transmission from among a plurality of spatial multiplexing modes supported by the system based on whether a user terminal has performed calibration so that the user terminal can estimate a channel response for a downlink based on a pilot received via an uplink, the plurality of spatial multiplexing modes comprising at least one steered spatial multiplexing mode and a non-steered spatial multiplexing mode, wherein the steered spatial multiplexing mode includes spatial processing using eigenvectors of a channel response matrix for at least one subband;
instructions for coding and modulating a plurality of data streams in accordance with a plurality of rates to obtain a plurality of data symbol streams; and
instructions for processing, using the spatial multiplexing mode, the plurality of data symbol streams to obtain a plurality of transmit symbol streams for transmission from a plurality of antennas.

20. The computer-readable medium of claim 19, wherein the selected spatial multiplexing mode is a steered spatial multiplexing mode, and wherein the plurality of data symbol streams are spatially processed with a plurality of steering vectors to transmit the plurality of data symbol streams on a plurality of orthogonal spatial channels of a MIMO channel.

21. The computer-readable medium of claim 20, further comprising: instructions for transmitting a steered pilot on each of the plurality of orthogonal spatial channels.

22. The computer-readable medium of claim 19, wherein the plurality of data symbol streams are provided as the plurality of transmit symbol streams.

23. The computer-readable medium of claim 19, further comprising: instructions for performing calibration so that uplink channel response is reciprocal of downlink channel response.

24. The computer-readable medium of claim 19, wherein:
each of the plurality of rates is selected from among a set of rates supported by the system.

25. A method of receiving data in a wireless multiple-input multiple-output (MIMO) communication system, comprising:
receiving information indicating a spatial multiplexing mode to use for data transmission selected from among a plurality of spatial multiplexing modes supported by the system based on whether a user terminal has performed calibration so that the user terminal can estimate a channel response for a downlink based on a pilot received via an uplink, the plurality of spatial multiplexing modes comprising at least one steered spatial multiplexing mode and a non-steered spatial multiplexing mode, wherein the steered spatial multiplexing mode includes spatial processing using eigenvectors of a channel response matrix for at least one subband;
using the spatial multiplexing mode, processing at least one received symbol stream to obtain at least one recovered data symbol stream; and
demodulating and decoding the at least one recovered data symbol stream in accordance with at least one rate to obtain at least one decoded data stream.

26. The method of claim 25, wherein the selected spatial multiplexing mode is a steered spatial multiplexing mode, and wherein a plurality of received symbol streams are spatially processed with a plurality of eigenvectors for a plurality of spatial channels of a MIMO channel to obtain a plurality of recovered data symbol streams.

27. The method of claim 25, wherein a plurality of received symbol streams are spatially processed based on a channel correlation matrix inversion (CCMI) technique, a minimum mean square error (MMSE) technique, or a successive interference cancellation (SIC) technique to obtain a plurality of recovered data symbol streams.

28. The method of claim 25, wherein one received symbol stream is processed with channel gain estimates to obtain one recovered data symbol stream.

29. The method of claim 25, wherein:
each of the at least one rate is selected from among a set of rates supported by the system.

30. An apparatus in a wireless multiple-input multiple-output (MIMO) communication system, comprising:
a controller operative to receive information indicating a spatial multiplexing mode to use for data transmission selected from among a plurality of spatial multiplexing modes supported by the system based on whether a user terminal has performed calibration so that the user terminal can estimate a channel response for a downlink based on a pilot received via an uplink, the plurality of spatial multiplexing modes comprising at least one steered spatial multiplexing mode and a non-steered spatial multiplexing mode, wherein the steered spatial multiplexing mode includes spatial processing using eigenvectors of a channel response matrix for at least one subband;
a receive spatial processor operative to, using the spatial multiplexing mode, process at least one received symbol stream to obtain at least one recovered data symbol stream; and
a receive data processor operative to demodulate and decode the at least one recovered data symbol stream in accordance with at least one rate to obtain at least one decoded data stream.

31. The apparatus of claim 30, wherein the selected spatial multiplexing mode is a steered spatial multiplexing mode, and wherein a plurality of received symbol streams are spatially processed with a plurality of eigenvectors for a plurality of spatial channels of a MIMO channel to obtain a plurality of recovered data symbol streams.

32. The apparatus of claim 30, wherein a plurality of received symbol streams are spatially processed based on a channel correlation matrix inversion (CCMI) technique, a minimum mean square error (MMSE) technique, or a successive interference cancellation (SIC) technique to obtain a plurality of recovered data symbol streams.

33. The apparatus of claim 30, wherein one received symbol stream is processed with channel gain estimates to obtain one recovered data symbol stream.

34. The apparatus of claim 30, wherein:
each of the at least one rate is selected from among a set of rates supported by the system.

35. An apparatus of receiving data in a wireless multiple-input multiple-output (MIMO) communication system, comprising:
means for receiving information indicating a spatial multiplexing mode to use for data transmission selected from among a plurality of spatial multiplexing modes supported by the system based on whether a user terminal has performed calibration so that the user terminal can estimate a channel response for a downlink based on a pilot received via an uplink, the plurality of spatial multiplexing modes comprising at least one steered spatial multiplexing mode and a non-steered spatial multiplexing mode, wherein the steered spatial multiplexing mode includes spatial processing using eigenvectors of a channel response matrix for at least one subband;
means for processing, using the spatial multiplexing mode, at least one received symbol stream to obtain at least one recovered data symbol stream; and
means for demodulating and decoding the at least one recovered data symbol stream in accordance with at least one rate to obtain at least one decoded data stream.

36. The apparatus of claim 35, wherein the selected spatial multiplexing mode is a steered spatial multiplexing mode, and wherein a plurality of received symbol streams are spatially processed with a plurality of eigenvectors for a plurality of spatial channels of a MIMO channel to obtain a plurality of recovered data symbol streams.

37. The apparatus of claim 35, wherein a plurality of received symbol streams are spatially processed based on a channel correlation matrix inversion (CCMI) technique, a minimum mean square error (MMSE) technique, or a successive interference cancellation (SIC) technique to obtain a plurality of recovered data symbol streams.

38. The apparatus of claim 35, wherein one received symbol stream is processed with channel gain estimates to obtain one recovered data symbol stream.

39. The apparatus of claim 35, wherein:
each of the at least one rate is selected from among a set of rates supported by the system.

40. A non-transitory computer-readable medium for receiving data in a wireless multiple-input multiple-output (MIMO) communication system, the computer-readable medium having a set of instructions stored thereon, the set of instructions being executable by one or more processors and the set of instructions comprising:

instructions for receiving information indicating a spatial multiplexing mode to use for data transmission selected from among a plurality of spatial multiplexing modes supported by the system based on whether a user terminal has performed calibration so that the user terminal can estimate a channel response for a downlink based on a pilot received via an uplink, the plurality of spatial multiplexing modes comprising at least one steered spatial multiplexing mode and a non-steered spatial multiplexing mode, wherein the steered spatial multiplexing mode includes spatial processing using eigenvectors of a channel response matrix for at least one subband;

instructions for processing, using the spatial multiplexing mode, at least one received symbol stream to obtain at least one recovered data symbol stream; and instructions for demodulating and decoding the at least one recovered data symbol stream in accordance with at least one rate to obtain at least one decoded data stream.

41. The computer-readable medium of claim 40, wherein the selected spatial multiplexing mode is a steered spatial multiplexing mode, and wherein a plurality of received symbol streams are spatially processed with a plurality of eigenvectors for a plurality of spatial channels of a MIMO channel to obtain a plurality of recovered data symbol streams.

42. The computer-readable medium of claim 40, wherein a plurality of received symbol streams are spatially processed based on a channel correlation matrix inversion (CCMI) technique, a minimum mean square error (MMSE) technique, or a successive interference cancellation (SIC) technique to obtain a plurality of recovered data symbol streams.

43. The computer-readable medium of claim 40, wherein one received symbol stream is processed with channel gain estimates to obtain one recovered data symbol stream.

44. The computer-readable medium of claim 40, wherein:

each of the at least one rate is selected from among a set of rates supported by the system.

* * * * *